(12) United States Patent
Eguchi et al.

(10) Patent No.: US 7,771,314 B2
(45) Date of Patent: Aug. 10, 2010

(54) CONTROLLER OF WORK VEHICLE

(75) Inventors: Shingo Eguchi, Osaka (JP); Shuji Shiozaki, Osaka (JP); Takeshi Ouchida, Osaka (JP); Takafumi Yamada, Osaka (JP); Shigemi Hidaka, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 638 days.

(21) Appl. No.: 11/659,294

(22) PCT Filed: Dec. 2, 2005

(86) PCT No.: PCT/JP2005/022160

§ 371 (c)(1),
(2), (4) Date: Feb. 2, 2007

(87) PCT Pub. No.: WO2006/062033

PCT Pub. Date: Jun. 15, 2006

(65) Prior Publication Data

US 2009/0029826 A1    Jan. 29, 2009

(30) Foreign Application Priority Data

Dec. 7, 2004    (JP) .............................. 2004-354152

(51) Int. Cl.
*B60W 10/04* (2006.01)
(52) U.S. Cl. ...................................... 477/110; 477/109
(58) Field of Classification Search ................. 477/107, 477/108, 109, 110, 92, 165, 199, 211; 192/219
See application file for complete search history.

(56) References Cited

U.S. PATENT DOCUMENTS

| 4,768,636 | A | * | 9/1988 | Ito et al. ........................ 477/71 |
| 5,020,645 | A | * | 6/1991 | Sasa ............................. 477/34 |
| 5,875,680 | A | * | 3/1999 | Lorriette ....................... 74/335 |
| 6,723,023 | B2 | * | 4/2004 | Murakami .................. 477/210 |
| 2002/0000759 | A1 | | 1/2002 | Harada et al. |

FOREIGN PATENT DOCUMENTS

| JP | 2002-12051 | 1/2002 |
| JP | 2002-89655 | 3/2002 |
| JP | 2003-226165 | 8/2003 |
| JP | 2003-260961 | 9/2003 |
| JP | 2004-161045 | 6/2004 |

\* cited by examiner

*Primary Examiner*—David D Le
(74) *Attorney, Agent, or Firm*—Hamre, Schumann, Mueller & Larson, P.C.

(57) ABSTRACT

A control apparatus for a tractor or wheel loader includes a speed change sensor that detects the step-on amount of a speed change pedal, an actuator that regulates a swash plate angle of a hydraulic pump based on the detection value of the speed change sensor, a transmission output unit rotation sensor that detects the revolution speed of an output shaft, and a control unit. When the speed change pedal is not stepped on, a braking force is applied to travel wheels and both of a forward drive clutch and a reverse drive clutch are disengaged. When a transmission drive output detected with the transmission output unit rotation sensor is not more than a fixed forward or reverse drive switching speed, either the forward drive clutch or the reverse drive clutch is engaged as the speed change pedal is stepped on.

19 Claims, 33 Drawing Sheets

CONTROLLER OF WORK VEHICLE

TECHNICAL FIELD

The present invention relates to a work vehicle with a hydraulic stepless transmission installed thereon, such as a tractor for use in agricultural works and a wheel loader for use in civil engineering works, and more particularly to a control apparatus capable of controlling the output revolution speed from the hydraulic stepless transmission when the work vehicle is driven (forward or backward).

BACKGROUND ART

In order to increase work efficiency, contemporary work vehicles such as tractors and wheel loaders, for example, Patent document 1 discloses a configuration that is configured so that the revolution power of an engine is transferred to drive wheels via a hydrostatic stepless transmission (HST) and a gear-type sub-transmission (switching between low speed, high speed, and reverse drive) and comprises a throttle lever for setting and holding the output revolution speed of the engine and a speed change pedal for changing the output revolution speed of the hydrostatic stepless transmission, in which when the speed change pedal is stepped on, the accelerator operation section is pushed by the speed change pedal and the output revolution speed of the engine that was set and held by the throttle lever can be increased.

Furthermore, in order to enable the application to a work region in which the range (during forward drive) of the travel speed is comparatively narrow, from several km/h to ten-odd km/h, as in a work vehicle such as tractor or wheel loader, Patent document 2 discloses employing the so-called inline-type stepless transmission instead of the hydrostatic stepless transmission. In the inline-type stepless transmission, an input shaft for transferring the power from an engine and an output shaft for transferring the hydraulic transmission output to the left and right wheels are disposed concentrically, a hydraulic pump unit and a hydraulic motor unit are disposed on both sides of the cylinder block constituting the stepless transmission, and the input shaft and output shaft have a double-shaft configuration. With the inline-type stepless transmission, the power transmission efficiency is good, without leakage of work oil, and fuel consumption of the engine is low.
Patent document 1: JP-A-2003-226165
Patent document 2: JP-A-2002-89655

DISCLOSURE OF THE INVENTION

Problems to be Solved by the Invention

A work vehicle such as a tractor, in addition to an operation of pulling a work machine, also performs operations that require that the vehicle move repeatedly and alternately forward and rearward, for example, a field plowing and cultivating work, a soil breaking work, a spreading and grading work, paddy field plowing, and a multipurpose construction work, and the operations of switching between forward drive and reverse drive and travel stopping and starting have to be performed smoothly, without causing engine troubles and the like. However, in none of the conventional work vehicles such as tractors, a configuration is used in which a forward drive clutch and a reverse drive clutch are disposed at the output side of the inline-type stepless transmission described in Patent document 2 and the transmission drive output from the stepless transmission is transferred to the travel wheels via the forward drive clutch or reverse drive clutch, or the effective speed change pedal control is executed during switching between the forward drive and reverse drive.

It is an object of the present invention to provide a control apparatus for a work vehicle that can easily prevent engine troubles and the like, while executing various operations such as switching between the forward drive and reverse drive and travel stop and start by simple operations such as manipulation of the speed change pedal.

Means for Solving the Problems

In order to attain the above-described object, the invention of claim 1 provides a control apparatus for a work vehicle comprising a hydraulic stepless transmission for transmitting power from an engine mounted on a traveling body equipped with travel wheels, a speed change pedal for changing a speed change ratio of the hydraulic stepless transmission, a forward drive clutch and a reverse drive clutch that transmit a transmission drive output from the hydraulic stepless transmission to the travel wheels, and a brake for braking the travel wheels, the control apparatus comprising: a transmission sensor that detects a step-on amount of the speed change pedal; a transmission output unit rotation sensor that detects a revolution speed of the output shaft; and a controller, and the control apparatus conducting control so that any one of the forward drive clutch and reverse drive clutch is engaged in response to a step-on actuation of the speed change pedal when the transmission drive output detected by the transmission output unit rotation sensor is equal to or less than a forward-reverse drive switching speed, and conducting control to release the brake of the travel wheels when the activation of any of the forward drive clutch and reverse drive clutch is confirmed.

The invention of claim 2 provides the control apparatus for a work vehicle according to claim 1, wherein the controller performs control such that a brake is applied to the travel wheels and both the forward drive clutch and the reverse drive clutch are disengaged in a state where the speed change pedal is not stepped on.

The invention of claim 3 provides the control apparatus for a work vehicle according to claim 1, comprising: a speed change ratio setting device for setting a speed change ratio pattern of the hydraulic stepless transmission; and a pattern storage for storing a plurality of speed change ratio patterns, wherein an output revolution speed of the hydraulic stepless transmission is controlled in accordance with a speed change ratio pattern set in advance by the speed change ratio setting device correspondingly to a step-on amount of the speed change pedal.

The invention of claim 4 provides the control apparatus for a work vehicle according to claim 1 or claim 2, wherein the speed change pedal comprises a forward drive pedal and a reverse drive pedal, and control is performed so that when the reverse drive pedal is stepped on when the work vehicle moves forward, the forward drive clutch is disengaged and the reverse drive clutch is engaged substantially at the same time, when the vehicle speed is a fixed level or below.

The invention of claim 5 provides the control apparatus for a work vehicle according to claim 1 or claim 2, wherein the speed change pedal comprises a forward drive pedal and a reverse drive pedal, and control is performed so that when the forward drive pedal is stepped on during reverse drive, the reverse drive clutch is disengaged and the forward drive clutch is engaged substantially at the same time, when the vehicle speed is a fixed level or below.

The invention of claim 6 provides the control apparatus for a work vehicle according to any of claims 1 to 5, comprising:

an engine controller for maintaining revolution speed of the engine at a revolution speed set by a throttle lever; and a travel controller for controlling the revolution speed of the engine and the speed change ratio of the hydraulic stepless transmission based on the step-on amount of the speed change pedal.

The invention of claim 7 provides the control apparatus for a work vehicle according to claim 6, wherein the travel controller controls the revolution speed of the engine based on the step-on amount of the speed change pedal when the sub-transmission mechanism is switched to a high-speed side.

The invention of claim 8 provides the control apparatus for a work vehicle according to claim 6 or claim 7, wherein the travel controller controls the revolution speed of the engine based on the step-on amount of the speed change pedal when the throttle lever is in an automatic control position.

The invention of claim 9 provides the control apparatus for a work vehicle according to claim 1, wherein the speed change pedal comprises a forward drive pedal and a reverse drive pedal, the control apparatus comprising: transmission link mechanism for transmitting the pedal step-on amount of the forward drive pedal and reverse drive pedal to the speed change sensor; and a neutral position restorer provided in the transmission link mechanism.

The invention of claim 10 provides the control apparatus for a work vehicle according to claim 9, wherein the forward drive pedal and reverse drive pedal are configured so that a step-on force in at least a low-speed operation region of each pedal is determined by the neutral position restorer.

The invention of claim 11 provides the control apparatus for a work vehicle according to claim 9 or claim 10, comprising a step-on resistance changer linked to at least one pedal from among the forward drive pedal and reverse drive pedal, the control apparatus being configured so that a step-on force in a high-speed operation region of at least one pedal from among the forward drive pedal and reverse drive pedal is determined by the step-on resistance changer.

The invention of claim 12 provides the control apparatus for a work vehicle according to claim 9 or claim 11, comprising a push-pull operation mechanism for linking the forward drive pedal and reverse drive pedal to the step-on resistance changer.

Advantages of the Invention

With the invention of claim 1, various works of the tractor or wheel loader that require frequent operations of start, stop, and switching between the forward drive and reverse drive that are repeated alternately can be performed very easily and fatigue in long-term operation can be reduced. Further, reverse travel in the process of switching between forward drive and reverse drive can be prevented. For example, because the forward drive and reverse drive clutches are disposed on the transmission downstream side of the output shaft in the hydraulic stepless transmission, a main clutch that is disposed between the engine and hydraulic stepless transmission in the conventional configurations can be omitted and the structure can be simplified.

With the invention of claim 2, because the controller performs control such that a brake is applied to the travel wheels and both the forward drive clutch and the reverse drive clutch are disengaged in a state where the speed change pedal is not stepped on, various works of the tractor or wheel loader that require frequent operations of start, stop, and switching between the forward drive and reverse drive that are repeated alternately can be performed very easily and fatigue in long-term operation can be reduced.

With the invention of claim 3, because a speed change ration setting device for setting a speed change ratio pattern of the hydraulic stepless transmission and pattern storage for storing a plurality of speed change ratio patterns are provided and an output revolution speed of the hydraulic stepless transmission is controlled along a speed change ratio pattern that was set in advance by the speed change ratio setting device correspondingly to a step-on amount of the speed change pedal, after the operator has once set the speed change ratio pattern of the speed change ratio with the speed change ratio setting device, the operator can automatically control the speed change ratio to bring it automatically close to the value of the target speed change ratio at the time the actual value of the speed change ratio shifts from the value of the target speed change ratio due to changes in environment or fluctuations of travel load of the work vehicle by operating the speed change pedal, the travel operation of the work vehicle can be brought close to the travel operation of an automobile equipped with a stepless transmission mechanism and greatly simplified, and the fatigue in long-term operation can be reduced.

With the invention of claim 4, because the speed change pedal comprises a forward drive pedal and a reverse drive pedal, and control is so performed that when the reverse drive pedal is stepped on when the work vehicle moves forward, the forward drive clutch is disengaged and the reverse drive clutch is engaged substantially at the same time when the vehicle speed becomes below a fixed level, for example, in a reciprocating travel work, the ultra-low speed output (low-efficiency output region) of the hydraulic stepless transmission can be cut and switching from the forward movement to the rearward movement can be performed before the hydraulic stepless transmission produces a low-efficiency output. Therefore, travel acceleration performance can be prevented from degrading in switching from the forward movement to the rearward movement and appropriate maneuverability can be maintained.

With the invention of claim 5, because the speed change pedal comprises a forward drive pedal and a reverse drive pedal, and the control is so performed that when the forward drive pedal is stepped on during reverse drive, the reverse drive clutch is disengaged and the forward drive clutch is engaged substantially at the same time when the vehicle speed becomes below a constant level, for example, in a reciprocating travel work, the ultra-low speed output (low-efficiency output region) of the hydraulic stepless transmission can be cut and switching from the rearward movement to the forward movement can be performed before the hydraulic stepless transmission produces a low-efficiency output. Therefore, travel acceleration performance can be prevented from degrading in switching from the rearward movement to the forward movement and appropriate maneuverability can be maintained.

With the invention of claim 6, because the engine controller for maintaining the revolution speed of the engine at a revolution speed that was set by a throttle lever and travel controller for controlling the revolution speed of the engine and the speed change ratio of the hydraulic stepless transmission based on the step-on amount of the speed change pedal are provided, in a tractor or wheel loader, the operator can change the direction of the work vehicle by stepping on the speed change pedals, while holding the steering handle with both hands, and the operations of accelerating the vehicle when it is started and decelerating when it is stopped are brought close to the travel operation in an automobile equipped with a stepless transmission and can be performed in a very easy manner. Furthermore, maneuverability can be improved and fatigue in long-term operation can be reduced.

With the invention of claim 7, because the travel controller controls the revolution speed of the engine based on the step-on amount of the speed change pedal when the sub-transmission mechanism is switched to a high-speed side, in low-load operation such as travel on a road, maneuverability can be improved, and in a high-load operation such as work in a field where the sub-transmission mechanism is switched to a low-speed mode, the revolution speed of the engine can be maintained at an substantially constant level and engine troubles can be prevented.

With the invention of claim 8, because the travel controller controls the revolution speed of the engine based on the step-on amount of the speed change pedal when the throttle pedal is in an automatic control position, the ON/OFF switching of the revolution speed control of the engine can be performed very easily according to the travel conditions such as travel in the field where slipping is highly probable and travel on an asphalt road where slipping can hardly occur. Furthermore, maneuverability can be improved and fatigue in long-term operation can be reduced.

With the invention of claim 9, because the speed change pedal comprises a forward drive pedal and a reverse drive pedal and is equipped with transmission link mechanism for transmitting the pedal step-on amount of the forward drive pedal and reverse drive pedal to the speed change sensor and neutral position restorer provided in the transmission link mechanism, the forward drive pedal and rearward movement can be held in the neutral position in a simple manner and the neutral (initial) position adjustment of the forward drive pedal and reverse drive pedal that is necessary when the pedals are assembled can be simplified.

With the invention of claim 10, because the forward drive pedal and reverse drive pedal are so configured that a step-on force in at least a low-speed operation region of each pedal is determined by the neutral position restorer, for example, the step-on force of the forward drive pedal and the step-on force of the reverse drive pedal can be almost matched, the operator can step on the forward drive pedal and reverse drive pedal with almost identical feel, and step-on operability of the forward drive pedal and reverse drive pedal can be improved.

With the invention of claim 11, because step-on resistance changer linked to at least one pedal from the forward drive pedal and reverse drive pedal is provided and configured so that that a step-on force in at least a low-speed operation region of each pedal is determined by the step-on resistance changer, the step-on force of the forward drive pedal and reverse drive pedal can be changed in a stepwise manner separately in the low-speed operation region and high-speed operation region, the boundary between the low-speed operation region and high-speed operation region of the work vehicle can be easily recognized by the operator, and the step-on operability of the forward drive pedal and reverse drive pedal can be improved.

With the invention of claim 12, because a push-pull operation mechanism for linking the forward drive pedal and reverse drive pedal of the step-on resistance changer are provided, the step-on resistance changer can be used as a restorer (means for returning in the direction of initial position) of both the forward drive pedal and the reverse drive pedal and a structure for linking the forward drive pedal and reverse drive pedal to the neutral position restorer via the step-on resistance variation means can be configured in a compact manner and at a low cost.

DESCRIPTION OF THE SIGNS

Figure 1:
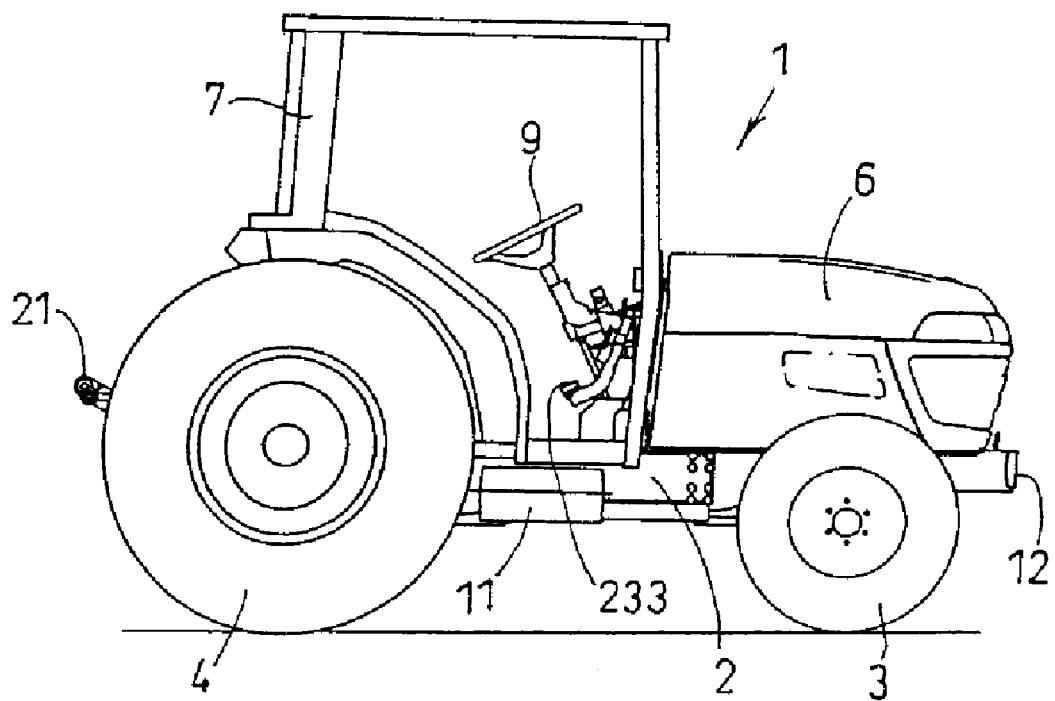
FIG. 1 is a side view of a tractor for agricultural work.

1 Tractor
3 Front wheel
4 Rear wheel
5 Engine
17 Mission case
27 Input shaft
29 Stepless transmission
30 Auxiliary transmission gear mechanism (Auxiliary transmission mechanism)

36 Output shaft
40 Clutch for forward movement
42 Clutch for reverse movement
116 Main transmission output unit rotation sensor
206 Throttle lever
213 Electric governor controller (Engine controller)
220 Speed change potentiometer (Speed change sensor)
232 Forward drive pedal (Speed change pedal)
233 reverse drive pedal (Speed change pedal)
210 Travel controller (Controller)
219 Forward movement potentiometer (Speed change sensor)
220 Reverse movement potentiometer (Speed change sensor)
221 Speed change ratio setting dial (Speed change ratio setting device)
241 Neutral position restorer
242 Step-on resistance variation means
264 Push-pull rod (Push-pull operation mechanism)
275 Transmission link mechanism
500 Hydraulic pump unit
501 Hydraulic motor unit
556 Main transmission hydraulic cylinder (Speed change actuator)

BEST MODE FOR CARRYING OUT THE INVENTION

Figure 2:
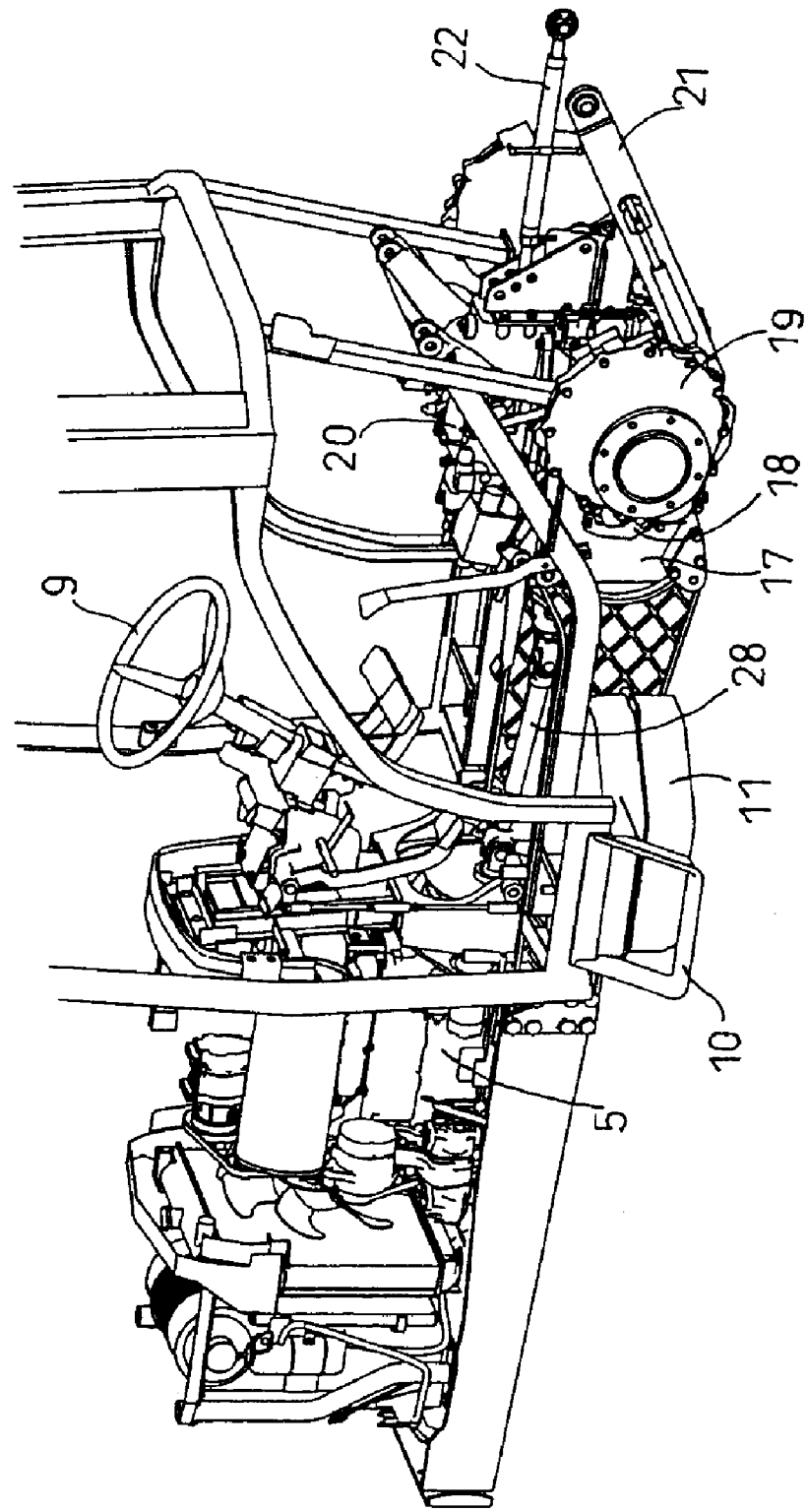
FIG. 2 is an oblique rearward perspective view of the tractor.
Figure 3:
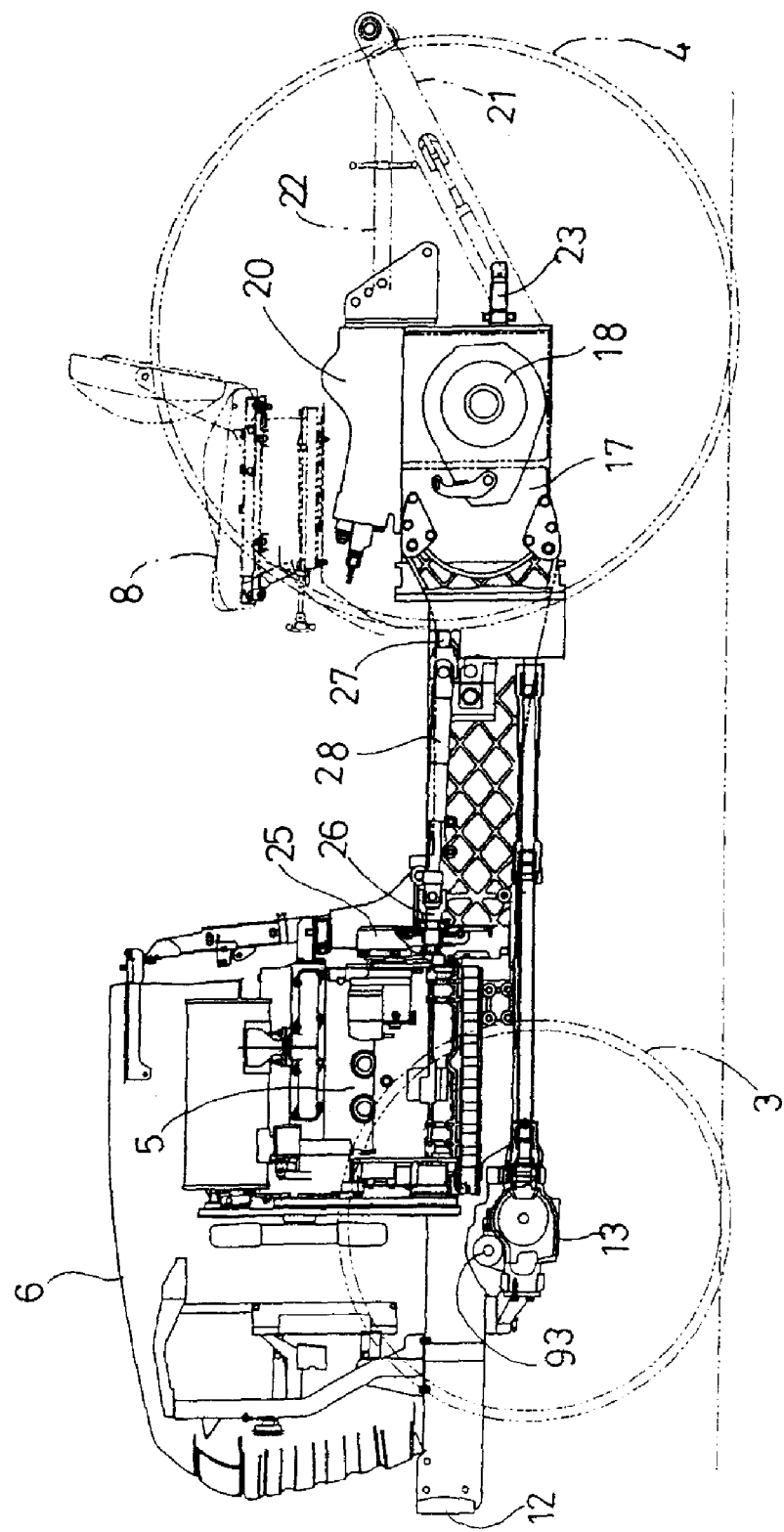
FIG. 3 is a side explanatory view of the tractor.
Figure 4:
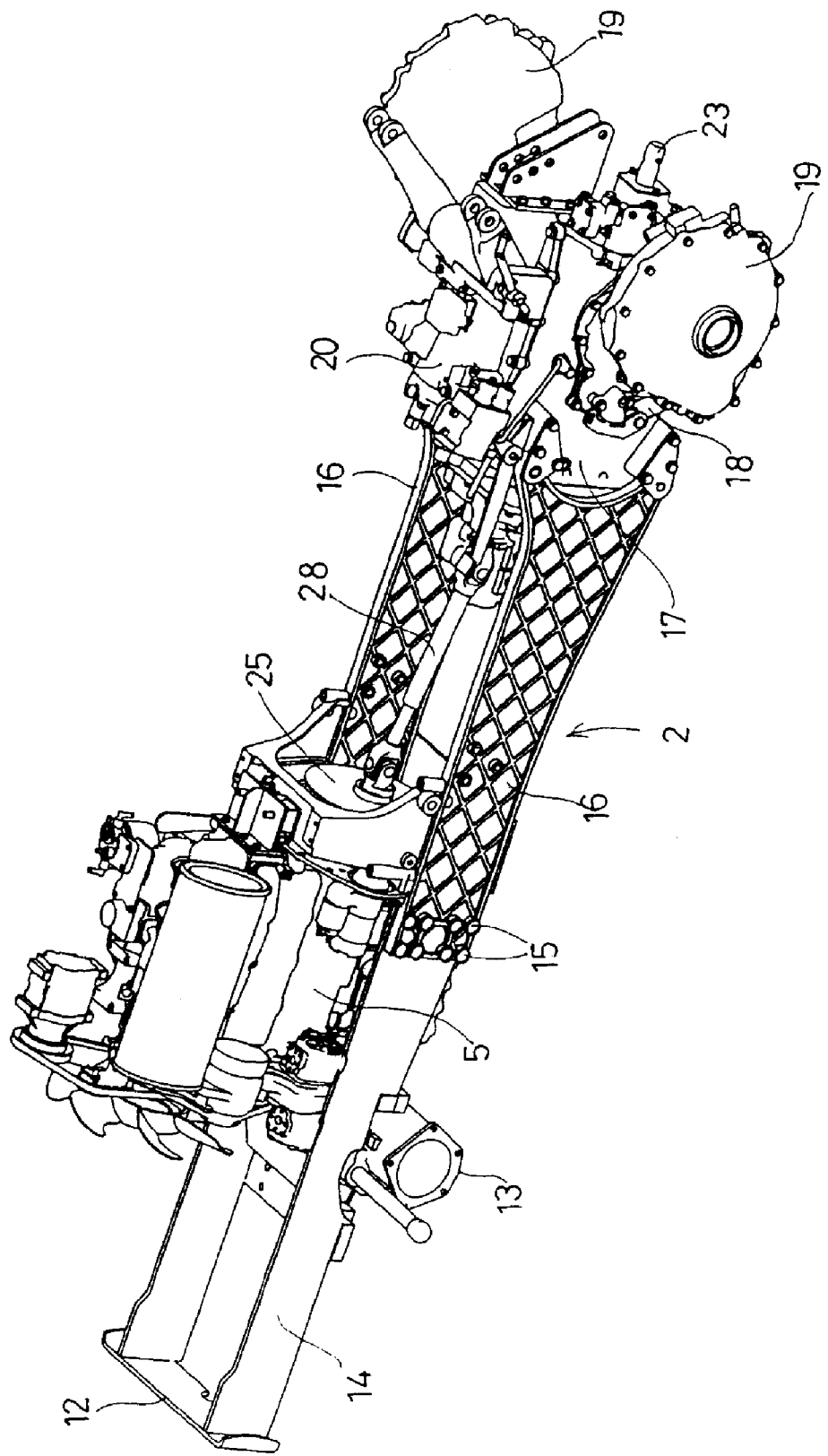
FIG. 4 is a perspective view of the tractor body.
Figure 5:
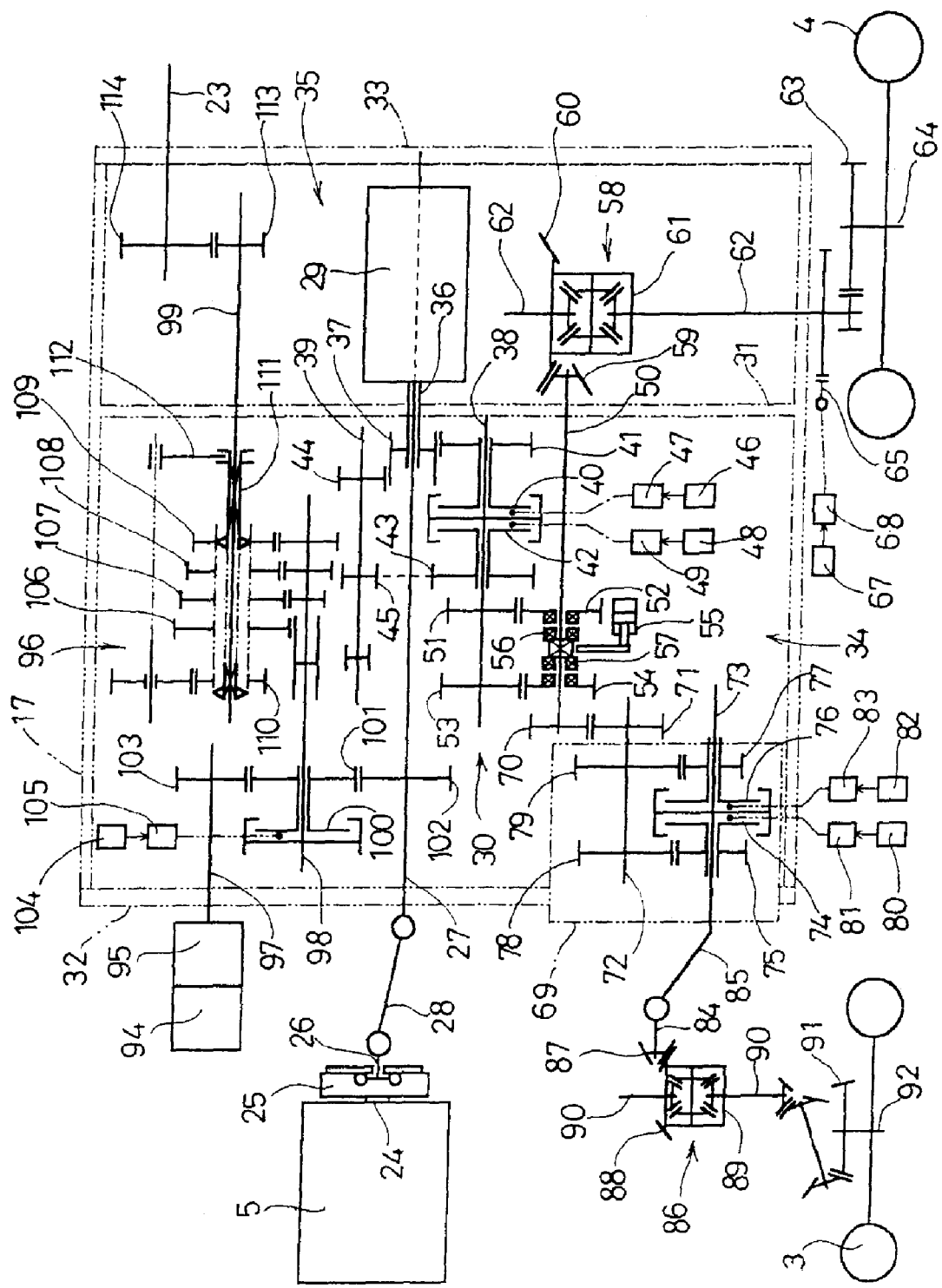
FIG. 5 is a skeleton view of power transmission.
Figure 23:
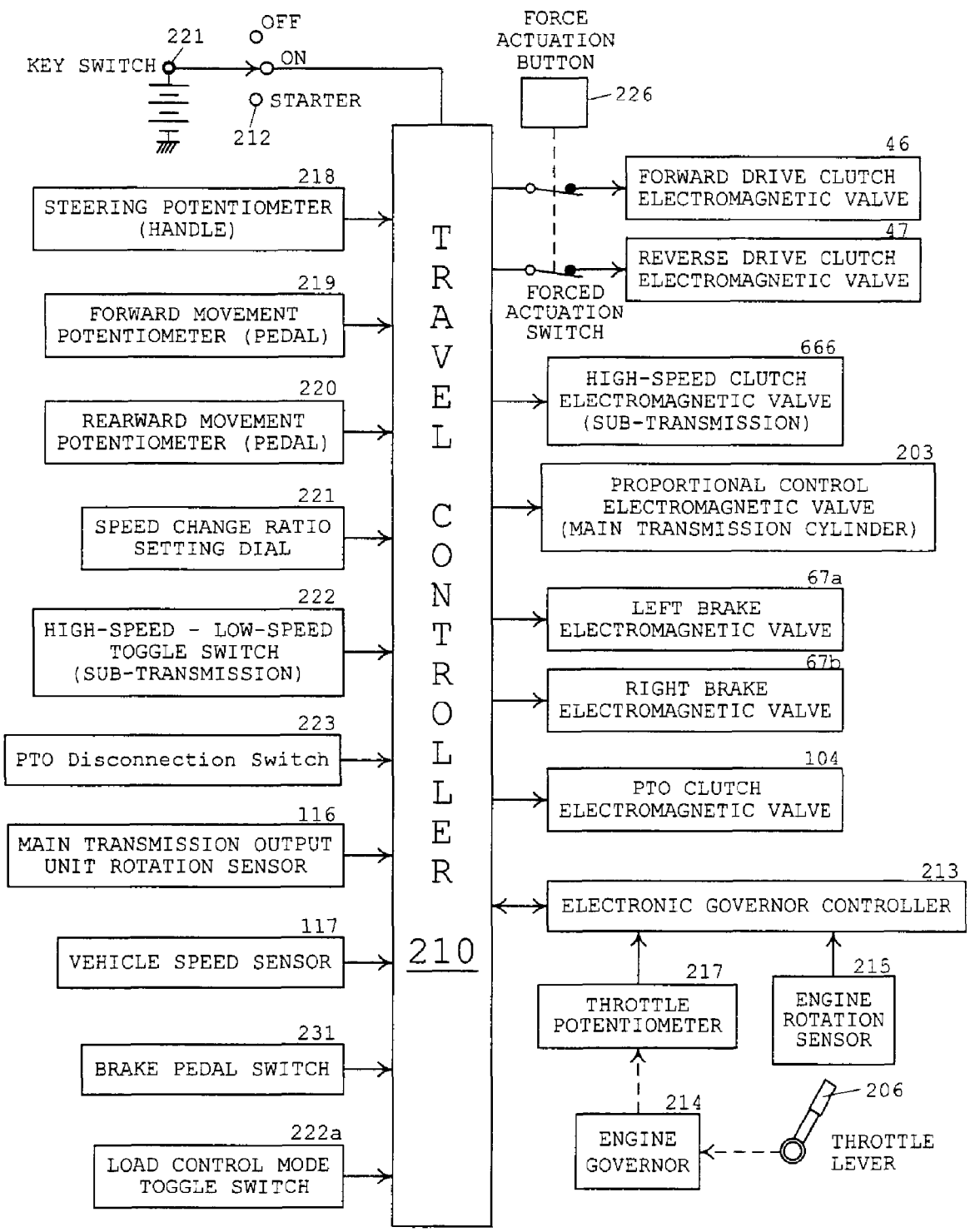
FIG. 23 is a functional block-diagram of the control means in accordance with the present invention.
Figure 24:
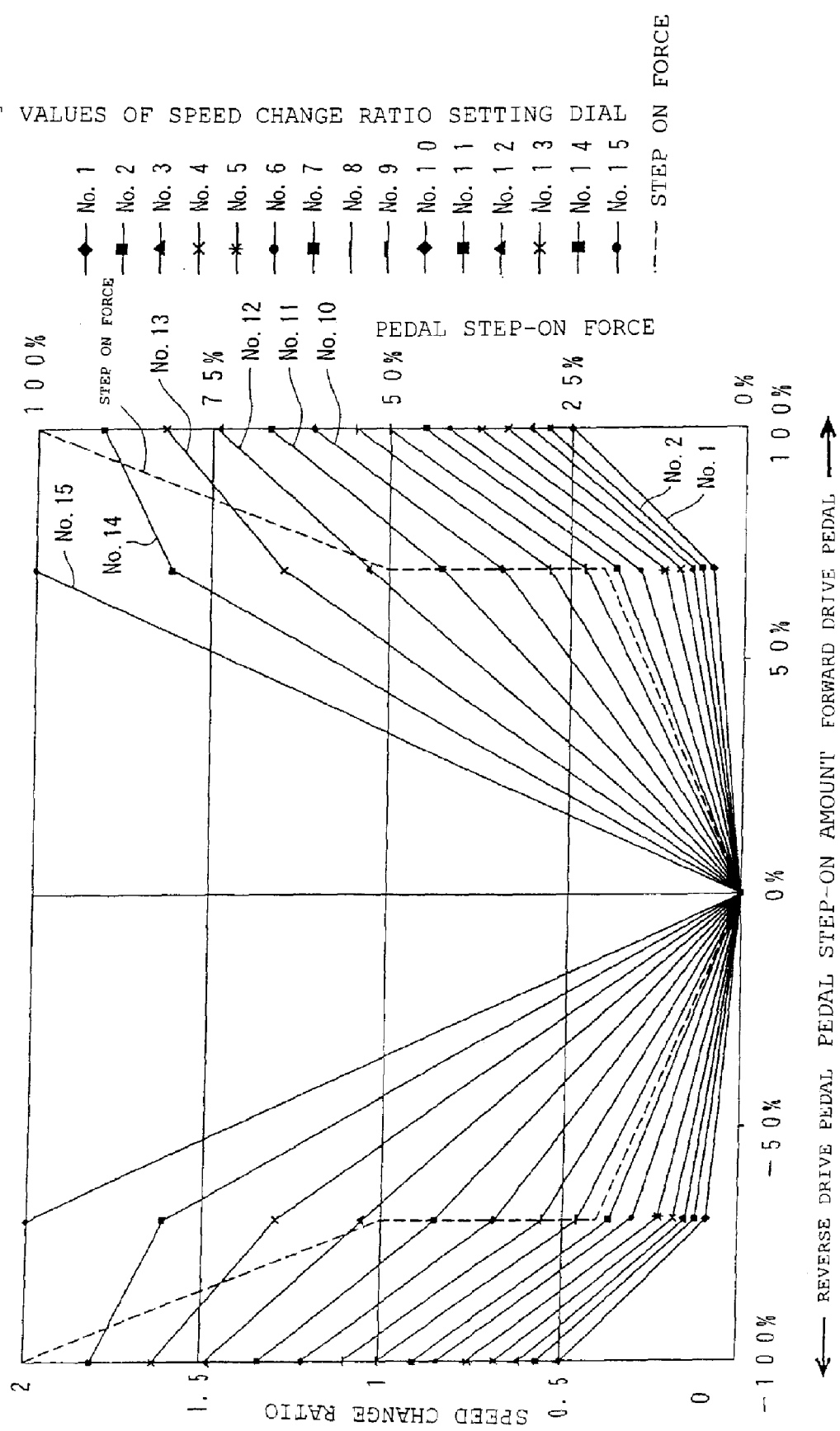
FIG. 24 is a speed change ratio diagram.
Figure 25:
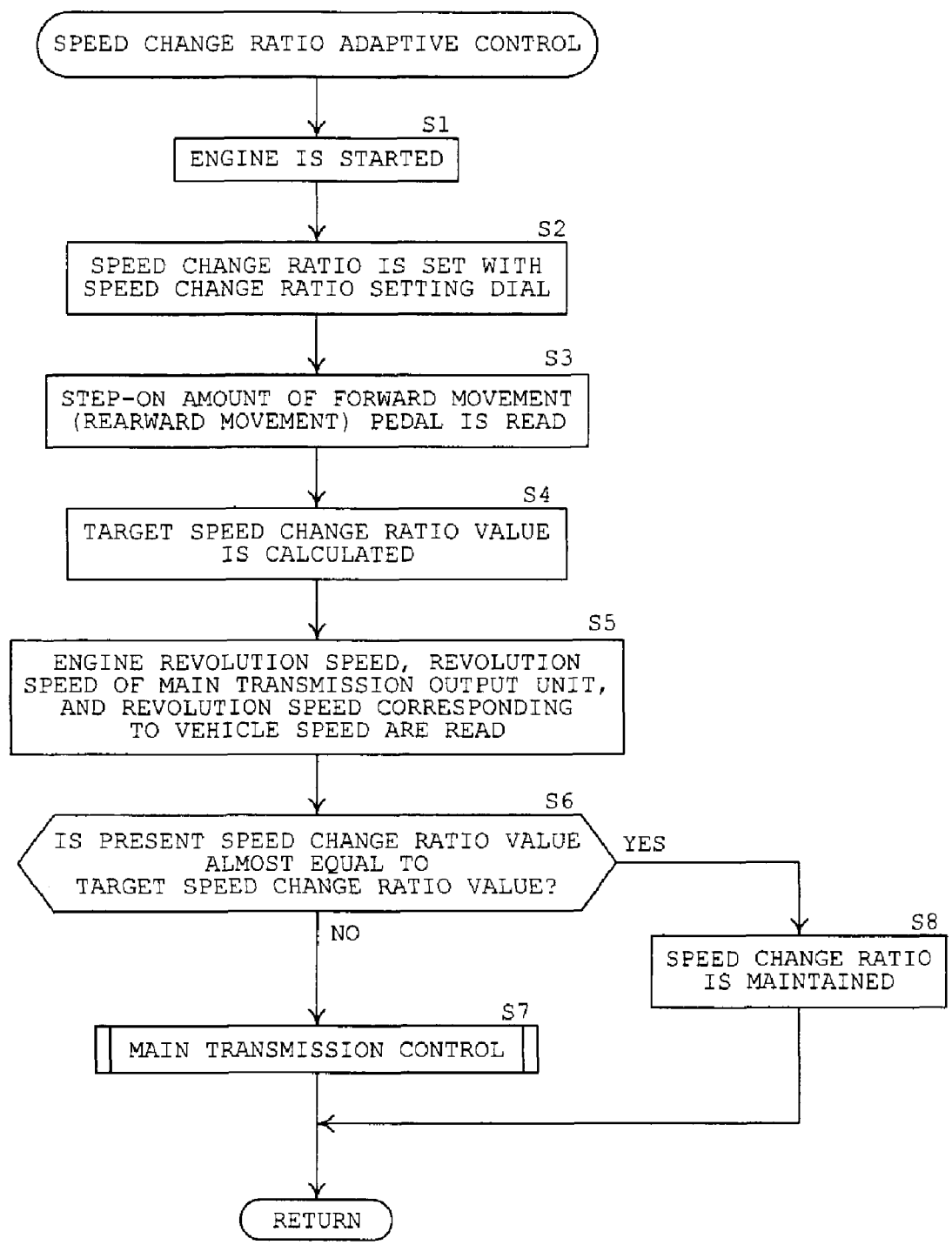
FIG. 25 is a flowchart of speed change adaptive control.
Figure 26:
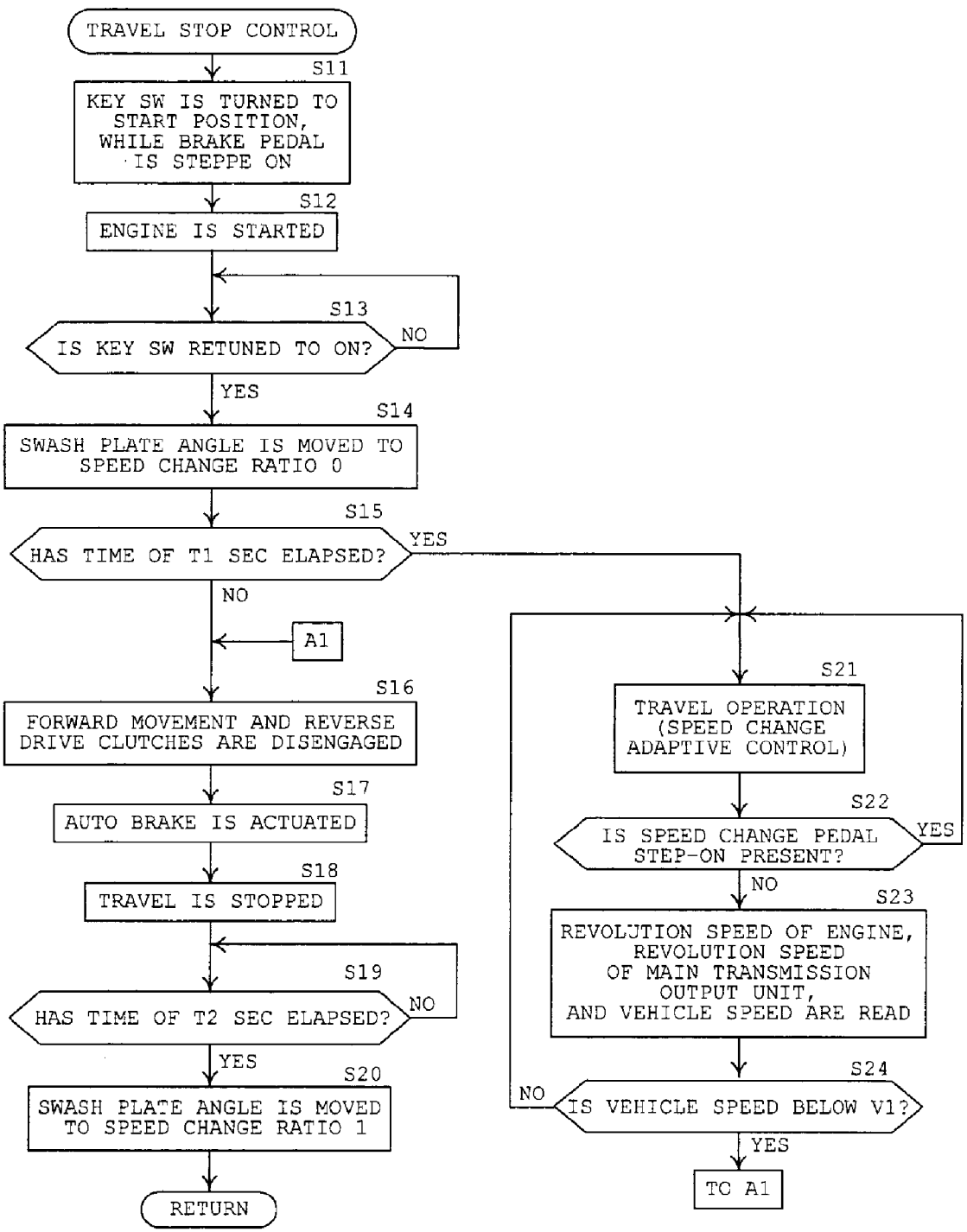
FIG. 26 is a flowchart of stop control.
Figure 27:
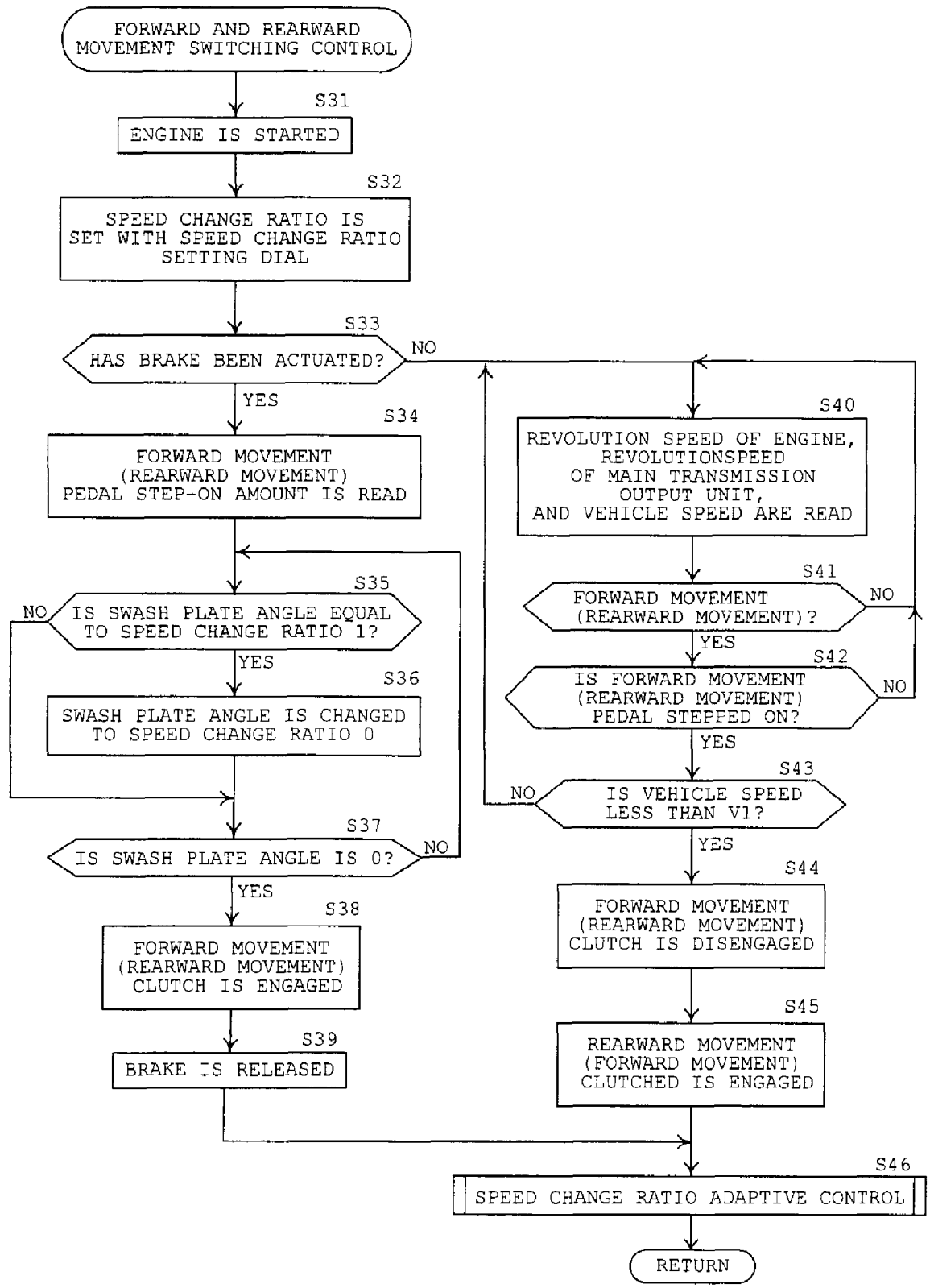
FIG. 27 is a flowchart of forward movement—rearward movement switching control.
Figure 28:
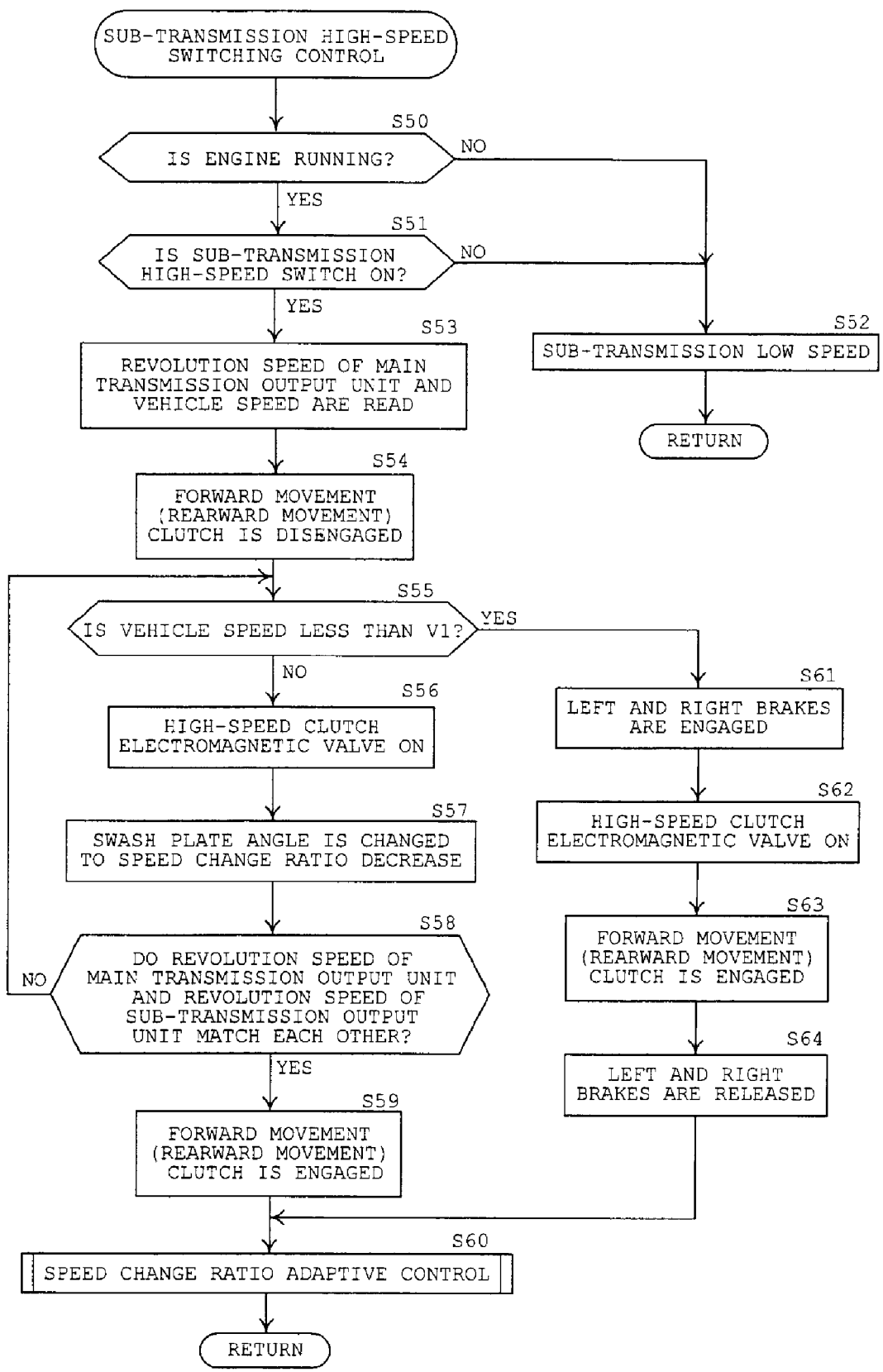
FIG. 28 is a flowchart of sub-transmission high-speed switching control.
Figure 29:
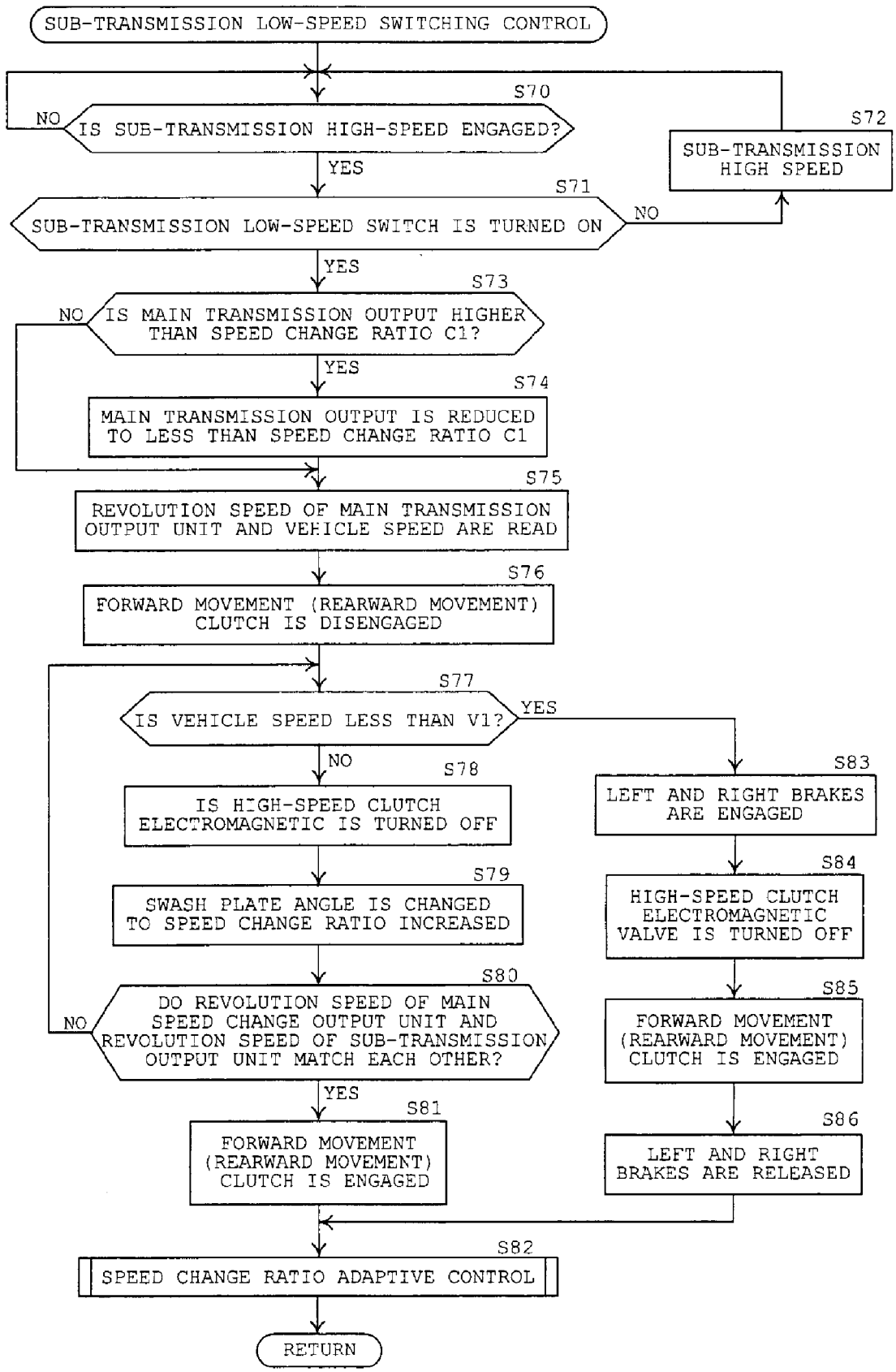
FIG. 29 is a flowchart of sub-transmission low-speed switching control.

The embodiments of the present invention will be described below with reference to the accompanying drawings illustrating the case of application of the present invention to a tractor for agricultural operations as a work vehicle. FIG. 1 is a side view of the tractor, FIG. 2 is a perspective rear view of the tractor, FIG. 3 is an explanatory drawing illustrating the side view, FIG. 4 is perspective view of the tractor body, FIG. 5 is a skeleton drawing illustrating power transmission, FIG. 23 is a functional block diagram of a control means, FIG. 24 is a speed change ratio pattern illustrating the relationship between a step-on amount of a change gear pedal and a speed change ratio, FIG. 25 is a flowchart of a speed change ratio adaptive control, FIG. 26 is a flowchart of stop control, FIG. 27 is a flowchart of a forward-reverse switching control, FIG. 28 is a flowchart of a sub-transmission high-speed switching control, and FIG. 29 is a flowchart of a sub-transmission low-speed switching control.

As shown in FIG. 1 to FIG. 4, in the tractor 1 as a work vehicle, a traveling body 2 is supported on a pair of left and right front wheels 3 and a part of left and right rear wheels 4, and the tractor is configured to travel forward or rearward when the rear wheels 4 and front wheels 3 are driven by an engine 5 installed in the front section of the traveling body 2. The engine 5 is covered with a bonnet 6. A cabin 7 is disposed at the upper surface of the traveling body 2. Disposed inside the cabin 7 are an operator seat 8 and a steering handle (round handle) 9 that is employed to move the front wheels 3 to the left and right by steering. A step 10 allowing the operator to get into and from the cabin is provided on the outer side of the cabin 7, and a fuel tank 11 for supplying the fuel to the engine 5 is provided below the bottom section of the cabin 7 on the inner side from the step 10.

Furthermore, the traveling body 2 is composed of an engine frame 14 having a front bumper 12 and a front wheel shaft case 13 and left and right body frames 16 that are fixed detachably with bolts 15 to the engine frame 14. A mission case 17 for appropriately changing the rotation speed of the engine 5 and transmitting the power to the rear wheels 4 and front wheels 3 is linked to the rear section of the body frame 16. In this case, the rear wheels 4 are attached to the mission case 17 via a rear shaft case 18 mounted to protrude outward from the outer side surface of the mission case 17 and a gear case 19 mounted to protrude rearward at the outer side end of the rear shaft case 18.

A hydraulic lifting mechanism 20 for a work machine that serves to lift a work machine (not shown in the figures) such as a plow is detachably attached to the upper surface in the rear section of the mission case 17. The work machine such as a plow is linked to the rear section of the mission case 17 via a lower link 21 and a top link 22. Furthermore, a PTO shaft 23 for the work machine such as a plow is provided to protrude rearward at the rear surface of the mission case 17.

Figure 15:
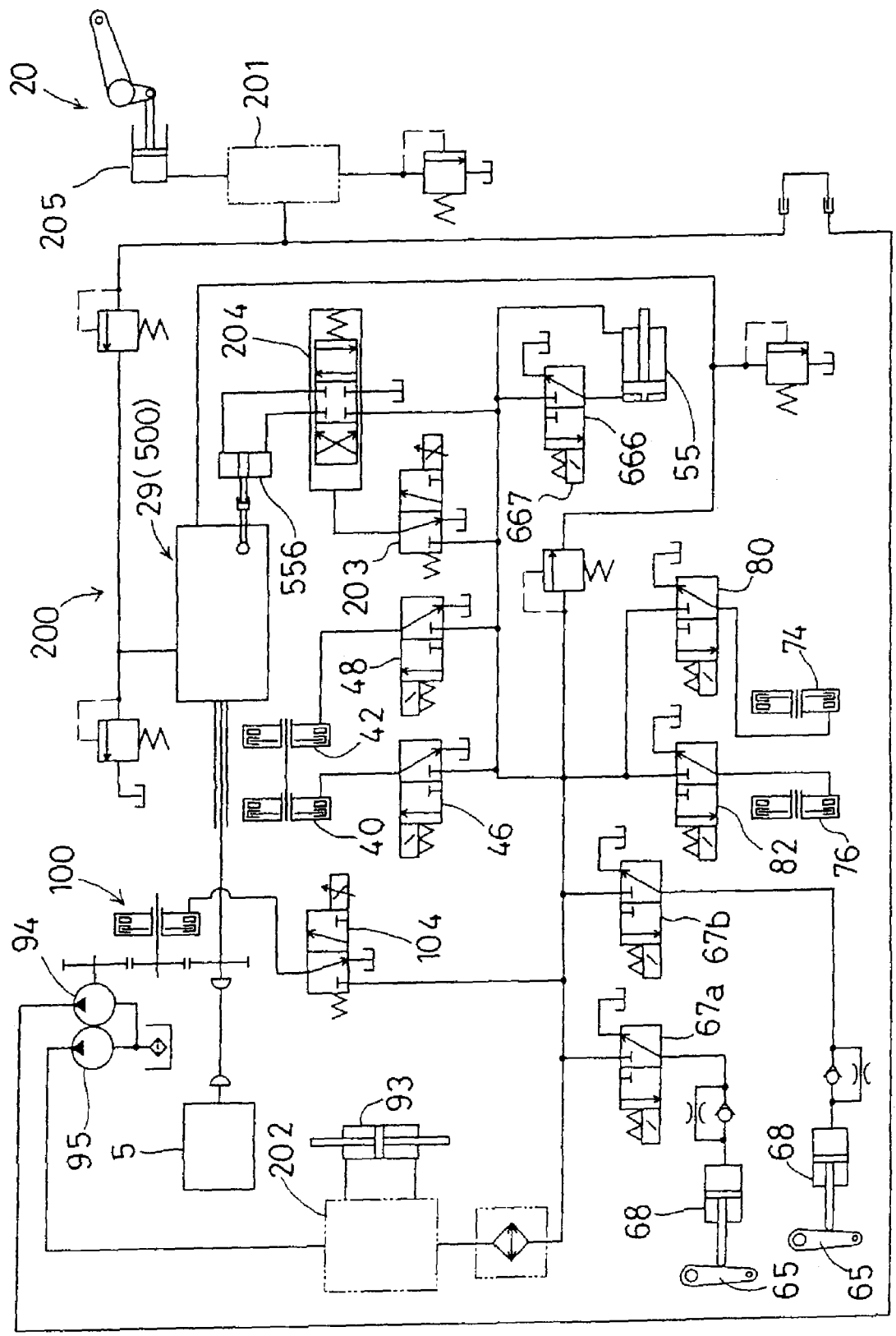
FIG. 15 is a hydraulic circuit diagram of the entire tractor in accordance with the present invention.

FIG. 15 shows a hydraulic circuit 200 of the tractor 1 of the present embodiment. As described below, the hydraulic circuit comprises a hydraulic pump 94 for a work machine and a hydraulic pump 95 for traveling that are actuated by a rotation force of the engine 5. The hydraulic pump 95 for traveling is connected to a hydraulic cylinder 93 for power steering by a round handle 9 via a control valve 202 for power steering. On the other hand, brake cylinders 68 for a pair of left and right auto brakes 65 for braking the left and right rear wheels 4 are connected to left and right auto brake electromagnetic valves 67a, 67b that are switching valves actuated by respective brake cylinders. Further, the hydraulic pump 95 for traveling is connected to a clutch hydraulic electromagnetic valve (proportional control valve) 104 of a PTO for a PTO clutch 100, a proportional control valve 203 for each transmission unit of the mission case 17, that is, the below-described main hydraulic stepless transmission 29, a switching valve 204 actuated by the proportional control valve, a speed change shift electromagnetic valve 666 of the hydraulic cylinder 55 for a travel sub-transmission, a forward drive clutch electromagnetic valve 46 and a reverse drive clutch electromagnetic valve 48 for actuating hydraulic clutches 40, 42 for switching between forward and rearward movement, a four-wheel drive hydraulic electromagnetic valve 80 for a hydraulic clutch 74 for four-wheel drive serving to drive simultaneously the front wheels 3 and rear wheels 4, and a double-speed hydraulic electromagnetic valve 82 for a double-speed hydraulic clutch 76 for switching to a double-speed drive of the front wheels 3. Furthermore, the hydraulic pump 94 for a work machine is connected to a control electromagnetic valve 201 for supplying a work oil to a single-acting hydraulic cylinder 205 in the lifting mechanism 20 for a work machine. As shown in FIG. 15, the hydraulic circuit 200 is provided with a relief valve, a flow rate regulation valve, a check valve, an oil cooler, and an oil filter.

Figure 6:
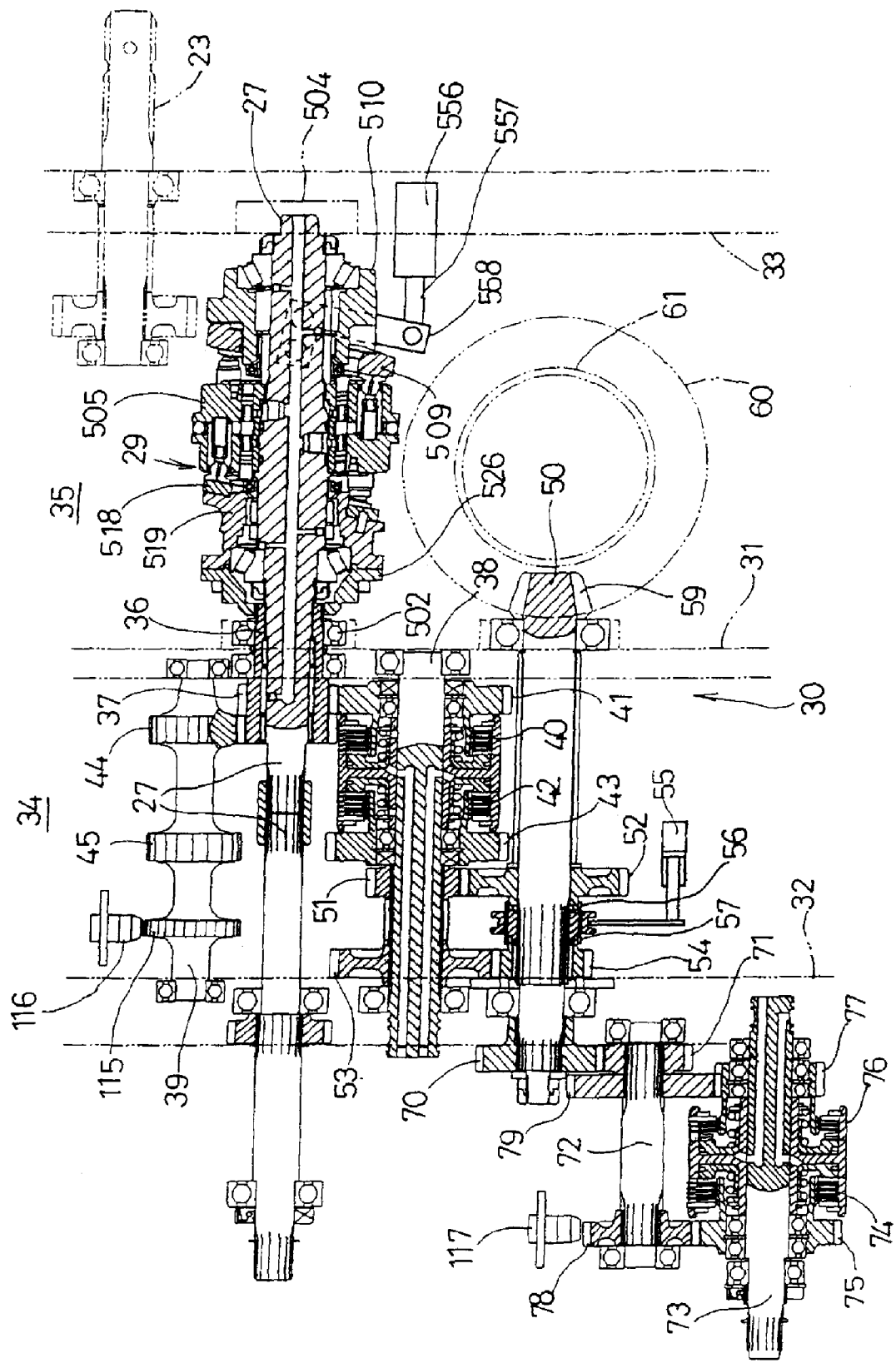
FIG. 6 is an explanatory view of a travel speed change unit of a mission case.
Figure 7:
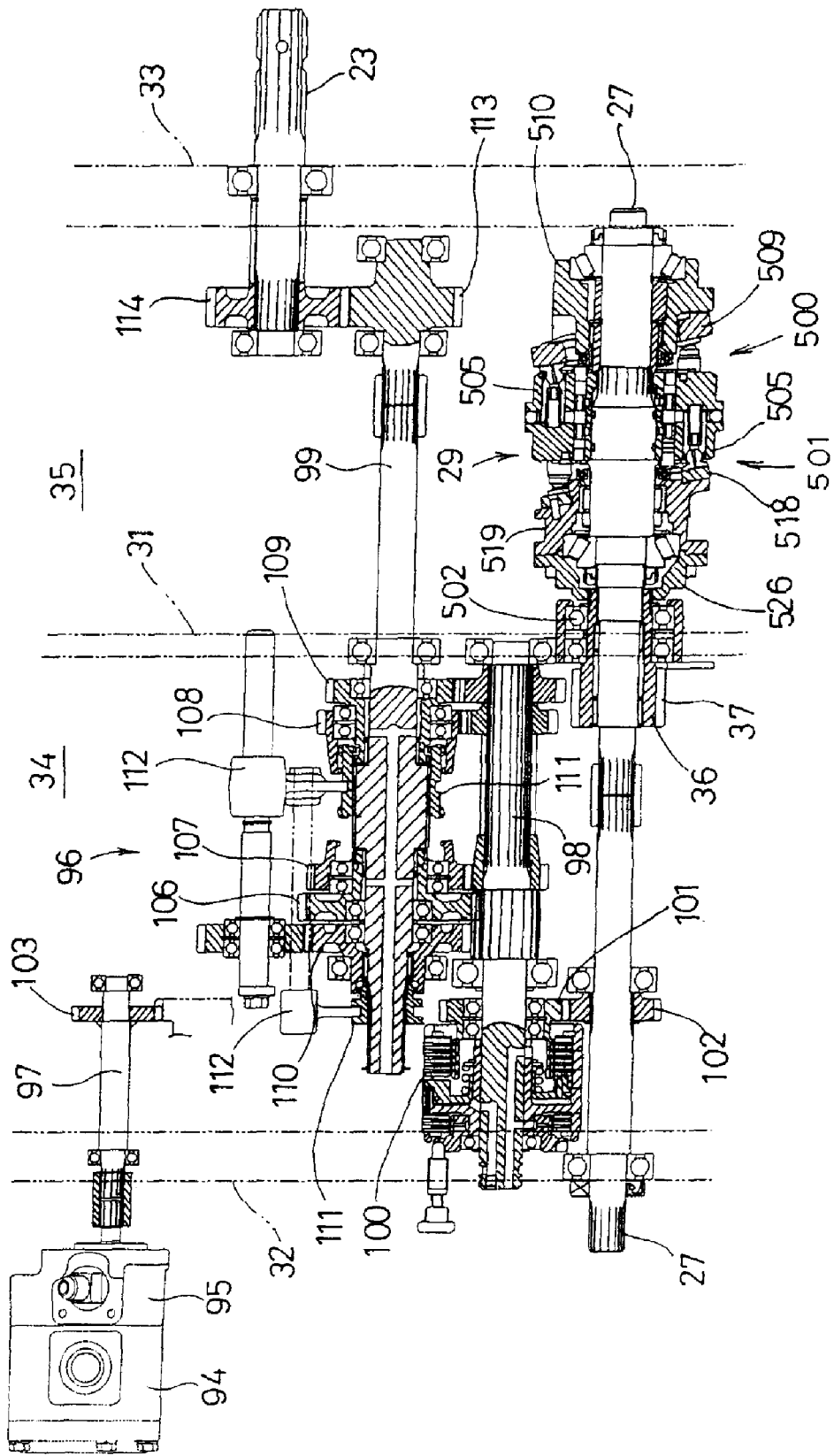
FIG. 7 is an explanatory view of a PTO speed change unit of the mission case.

FIG. 5 to FIG. 7 show the aforementioned mission case 17. The inside of the mission case 17 is divided into front and rear sections by a partition wall 31. Front wall member 32 and rear wall member 33 are detachably fixed with bolts respectively to the front side and rear side of the mission case 17. The mission case 17 is configured to have a box-like shape, and a front chamber 34 and a rear chamber 35 are formed inside the mission case 17. The front chamber 34 and rear chamber 35 are linked so that the work oil (lubricating oil) located inside thereof can move from one chamber to another.

As shown in FIG. 5, the below-described front wheel drive case 69 is provided in the front wall member 32. The below-described travel sub-transmission gear mechanism 30 and PTO transmission gear mechanism 96 are disposed in the front chamber 34. The hydraulic stepless transmission 29, which is the below-described main transmission mechanism for travel, and a differential gear mechanism 58 are disposed in the rear chamber 35.

An engine output shaft 24 is provided at the rear surface of the engine 5 to protrude rearward. A flywheel 25 is attached to the engine output shaft 24 to be linked directly thereto. A main drive shaft 26 protruding rearward from the flywheel 25 and the main transmission input shaft 27 protruding forward from the front surface of the mission case 17 are linked by a telescopic power transmission shaft 28 comprising universal shaft links at both ends. The rotation of the engine 5 is transmitted to the main transmission input shaft 27 in the mission case 17, the speed is then changed appropriately in the hydraulic stepless transmission 29 and travel auxiliary transmission gear mechanism 30, and this drive power is transmitted to the rear wheels 4 via the differential gear mechanism 58. Furthermore, the rotation of the engine 5 that was subjected to appropriate speed change in the travel auxiliary transmission gear mechanism 30 is transmitted to the front wheels 3 via the front wheel drive case 69 and differential gear mechanism 86 of the front wheel shaft case 13.

Figure 8:
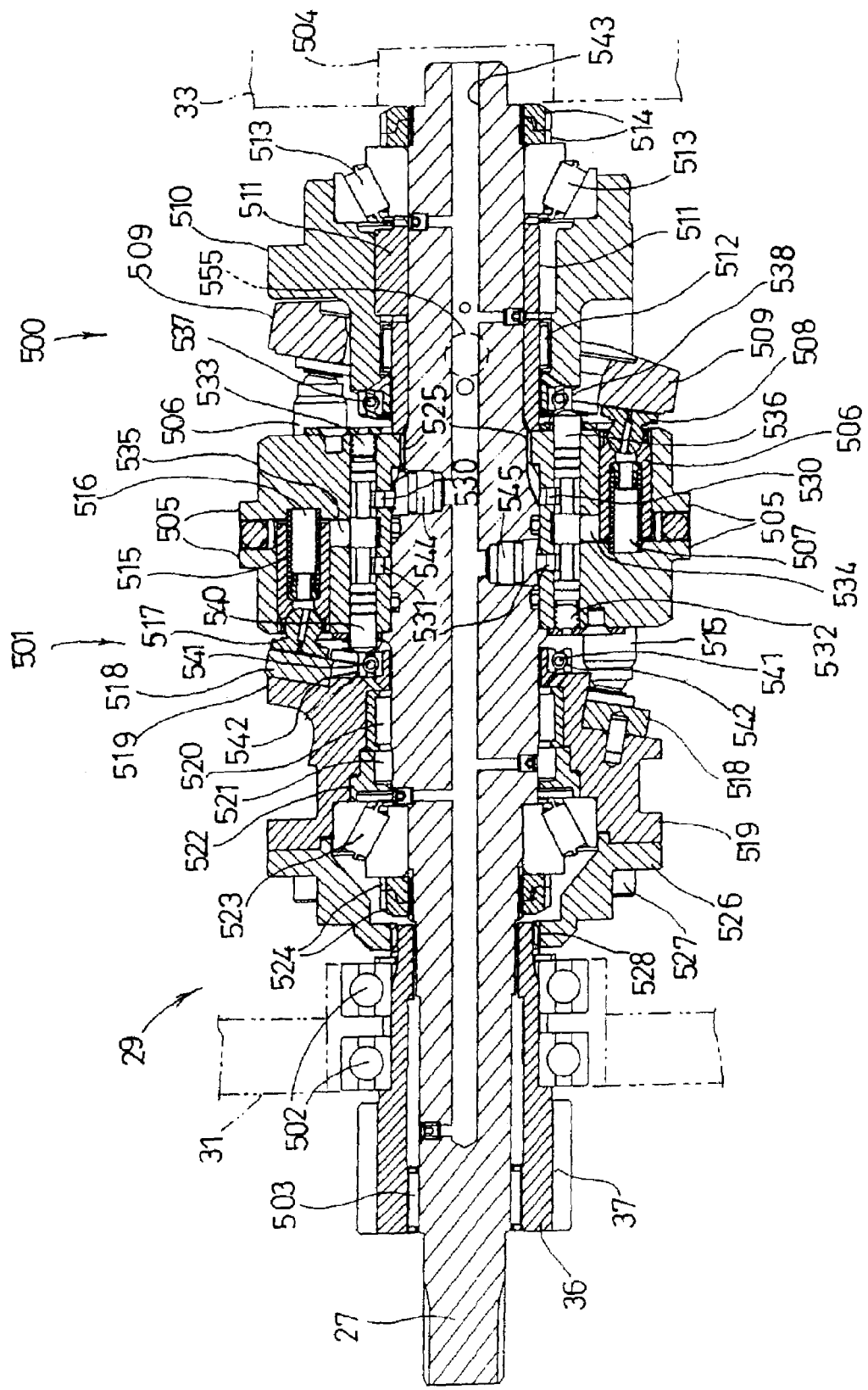
FIG. 8 is an explanatory view of a stepless transmission of the mission case.

Further, FIG. 8 shows an in-line hydraulic stepless transmission 29 in which a main transmission output shaft 36 is disposed concentrically with the main transmission input shaft 27. The hydraulic stepless transmission 29 is disposed inside the rear chamber 35 via the main transmission input shaft 27. The rear end side of the main transmission input shaft 27 that is located on the side opposite the input side (front end side) of the main transmission input shaft 27 is rotatably supported with a ball bearing 504 on the rear wall member 33.

A cylindrical main transmission output shaft 36 is fitted externally onto the front side of the hydraulic stepless transmission 29, that is, the input side of the main transmission input shaft 27. A main transmission output gear 37 for taking out the main transmission output from the hydraulic stepless transmission 29 is provided at the main transmission output shaft 36. The middle section of the main transmission output shaft 36 passes through the partition wall 31, and the front end and rear end of the shaft protrude into the front chamber 34 and rear chamber 35, respectively. The middle section of the main transmission output shaft 36 is supported rotatably on the partition wall 31 with two ball bearings 502. A main transmission output gear 37 is provided in the front end section of the main transmission output shaft 36. The input side (front end side) of the main transmission input shaft 27 is rotatably supported in the shaft hole of the main transmission output shaft 36 via a rolling bearing 503 so that the input side of the main transmission input shaft 27 protrudes forward beyond the front end of the main transmission output shaft 36 (see FIG. 8).

The hydraulic stepless transmission 29, as will be described below, comprises a hydraulic pump unit 500 of a variable capacity type for speed change and hydraulic motor unit 501 of a constant capacity type for speed change that is actuated by a high-pressure work oil discharged from the hydraulic pump unit 500. A cylinder block 505 for the hydraulic pump unit 500 and hydraulic motor unit 501 is fitted externally on the main transmission input shaft 27 in about middle section thereof between the partition wall 31 and rear wall member 33. The main transmission input shaft 27 and the cylinder block 505 are linked by a spline 525. The hydraulic pump unit 500 is disposed at one side of the cylinder block 505 on the opposite side from the input side of the main transmission input shaft 27 so that the cylinder block is located therebetween. The hydraulic motor unit 501 is disposed at the other side of the cylinder block 505 that is the input side for the main transmission input shaft 27.

A first holder 510 for fixing to an inner side surface of the mission case 17 to face the side surface of the cylinder block 505, a pump swash plate 509 disposed in the first holder 510 so that the inclination angle of the swash plate with respect to the axial line of the main transmission input shaft 27 can be changed, a shoe 508 provided so that it can slide over the pump swash plate 509, a pump plunger 506 that is linked to the shoe 508 via a spherical universal link, and a first plunger hole 507 disposed so that the pump plunger 506 can be inserted into and removed from the cylinder block 505 are provided in the hydraulic pump unit 500. One end side of the pump plunger 506 protrudes from the side surface of the cylinder block 505 in the direction (right side in FIG. 8) of the pump swash plate 509. The hydraulic pump unit 500 is composed of the cylinder block 505, pump plunger 506, shoe 508, pump swash plate 509, and first holder 510.

A sleeve 511 that is fitted externally on the main transmission input shaft 27, a roller bearing 512, and a rolling bearing 513 for radial and thrust load are introduced between the main transmission input shaft 27 and first holder 510. A nut 514 is provided to prevent the rolling bearing 513 from being pulled out rearward from the main transmission input shaft 27.

First sleeve valves 536 are provided in the cylinder block 505, the number of the valves being equal to that of the pump plungers 506. Further, a first radial bearing 537 is disposed in the first holder 510. The first radial bearing 537 provided in the first holder 510 is inclined at a fixed inclination angle with respect to the axial line of the main transmission input shaft 27. Referring to FIG. 8, the first radial bearing 537 is supported in an inclined state such that the position corresponding to rotation through an angle of about 90 degrees with respect to the pump swash plate 509 (front side as shown in FIG. 8) becomes farther from the side surface of the cylinder block 505, and the opposite side corresponding to the rotation through about 180 degrees (rear side as shown in FIG. 8) becomes close to the side surface of the cylinder block 505.

On the other hand, the hydraulic motor unit 501 is provided with a second holder 519 disposed opposite the side surface of the cylinder block 505, a motor swash plate 518 fixed to the second holder 519 to maintain a constant inclination angle with respect to the axial line of the main transmission input shaft 27, a shoe 517 provided so that it can slide over the motor swash plate 518, a motor plunger 515 linked to the shoe 517 via a spherical universal link, and a second plunger hole 516 disposed so that the motor plunger 515 can be inserted into and removed from the cylinder block 505. One end side of the motor plunger 515 protrudes from the side surface of the cylinder block 505 in the direction (left side in FIG. 8) of the motor swash plate 518.

A coupling member 526 is fixed with a bolt 527 to the second holder 519. The output shaft 36 and coupling member 526 are linked by a spline 528.

Roller bearings 520, 521 for a radial load, a sleeve 522 that is fitted externally on the main transmission input shaft 27, and a rolling bearing 523 for a radial and thrust load are introduced between the main transmission input shaft 27 and second holder 519. A nut 524 is provided to prevent the rolling bearing 523 from being pulled out from the main transmission input shaft 27.

Second sleeve valves 540 are provided in the cylinder block 505, the number of the valves being equal to that of the motor plungers 515. Further, a second radial bearing 541 is disposed in the second holder 519. The second radial bearing 541 provided in the second holder 519 is inclined at a fixed inclination angle with respect to the axial line of the main transmission input shaft 27. Referring to FIG. 8, the second radial bearing 541 is supported in an inclined state such that the position corresponding to rotation through an angle of about 90 degrees with respect to the motor swash plate 518

(front side as shown in FIG. 8) becomes close to the side surface of the cylinder block 505 and the opposite side corresponding to rotation through about 180 degrees (rear side as shown in FIG. 8) becomes farther from the side surface of the cylinder block 505. The pump plungers 506 and motor plungers 515, the number thereof being the same as that of the pump plungers 506, are disposed alternately on the same circle about the rotation center of the cylinder block 505.

A first oil chamber 530 in the form of an annular groove and a second oil chamber 531 in the form of an annular groove are formed in the shaft hole of the cylinder block 505 into which the main transmission input shaft 27 is inserted. First valve holes 532 and second valve holes 533 arranged almost equidistantly on the same circle about the rotation center of the cylinder block 505 are formed therein. The first valve holes 532 and second valve holes 533 are linked to the first oil chamber 530 and second oil chamber 531, respectively. The first plunger holes 507 is linked to the first valve hole 532 via a first oil channel 534, and the second plunger holes 516 are linked to the second valve holes 533 via the second oil chamber 531.

A first spool valve 536 is inserted into the first valve hole 532. The first spool valves 536 are arranged almost equidistantly on the same circle about the rotation center of the cylinder block 505. Under the effect of elastic pressure of a rear-pressure elastic force from the first valve hole 532, the distal end of the first spool valve 536 protrudes in the direction of the first holder 510, and the distal end of the first spool valve 536 abuts against the side surface of an outer ring 538 of the first radial bearing 537. Further, within one turn of the cylinder block 505, the first spool valve 536 moves back and forth one time and the first plunger hole 507 is linked alternately to the first oil chamber 530 or second oil chamber 531 via the first valve hole 532 and first oil channel 534.

A second spool valve 540 is inserted into the second valve hole 533. The second spool valves 540 are arranged almost equidistantly on the same circle about the rotation center of the cylinder block 505. Under the effect of elastic pressure of a rear-pressure elastic force from the second valve hole 533, the distal end of the second spool valve 540 protrudes in the direction of the second holder 519, and the distal end of the second spool valve 540 abuts against the side surface of an outer ring 542 of the second radial bearing 541. Further, within one turn of the cylinder block 505, the second spool valve 540 moves back and forth one time and the second plunger hole 516 is linked alternately to the first oil chamber 530 or second oil chamber 531 via the second valve hole 533 and second oil channel 535.

A work oil supply channel 543 is formed in the central section of the main transmission input shaft 27 in the axial direction thereof. The oil supply channel 543 is opened at the rear end surface of the main transmission input shaft 27 and linked to a discharge port of the above-described hydraulic pump 95 for travel. Further, there are provided a first charge valve 544 for supplying the work oil of the work oil supply channel 543 to the first oil chamber 530 and a second charge valve 545 for supplying the work oil of the work oil supply channel 543 to the second oil chamber 531.

The work oil is supplied from the work oil supply channel 543 via the first and second charge valves 544, 545 into a closed hydraulic circuit formed between the first and second plunger holes 507, 516 and the first and second oil chambers 530, 531. The work oil is also supplied as a lubricating oil from the work oil supply channel 543 via respective return check valves into respective rotary parts of the hydraulic pump unit 500 and motor unit 501.

Figure 13:
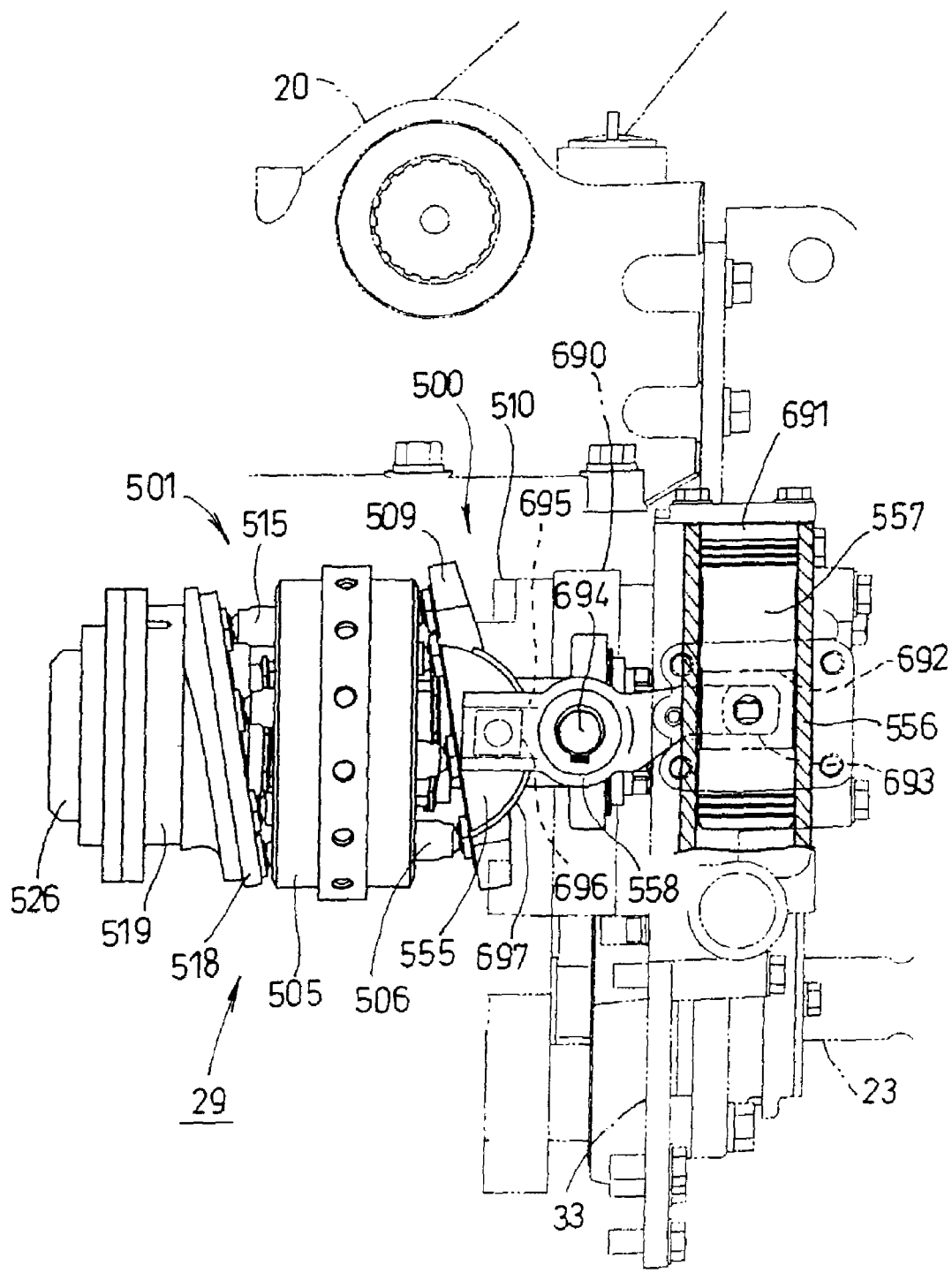
FIG. 13 is a side view illustrating the speed change operation unit of the stepless transmission.

Further, the pump swash plate 509 is disposed, as described below, on the outer periphery of a small-diameter section of the first holder 510 via an inclination angle regulation fulcrum 555 (see FIG. 13). The pump swash plate 509 is provided so that the inclination angle thereof can be adjusted with respect to the axis of the main transmission input shaft 27. There is provided a main transmission hydraulic cylinder 556 for main transmission operation that is a speed change actuator for changing the inclination angle of the pump swash plate 509 with respect to the axis of the main transmission input shaft 27 (see FIG. 13). In this configuration, the inclination angle of the pump swash plate 509 and the main transmission operation of the hydraulic stepless transmission 29 are performed in the main transmission hydraulic cylinder 556. Further, the first holder 510 is linked via a holder linking member 690 to the rear wall member 33 that is a non-rotary section of the mission case 17, to prevent the pump swash plate 509 from rotating with respect to main transmission input shaft 27 (FIG. 13).

The main transmission operation of the above-described in-line hydraulic stepless transmission 29 will be described below. The switching valve 204 is actuated by the work oil from the proportional control electromagnetic valve 203 that performs actuation proportionally to the step-on amount of a forward drive pedal 232 or a reverse drive pedal 233 that are the below-described speed change pedals, the hydraulic cylinder 556 is controlled, and the inclination angle of the pump swash plate 509 with respect to the axis of the main transmission input shaft 27 is changed.

First, when the inclination angle of the pump swash plate 509 is maintained at about zero so that the pump swash plate 509 is almost perpendicular to the axis of the main transmission input shaft 27, even if the cylinder block 505 rotates, the pump plunger 506 is maintained in an almost constant posture and does not move reciprocatingly in the first plunger hole 507 and the work oil of the first plunger hole 507 is not discharged from the first oil channel 534 in the direction of the first valve hole 532 in the discharge cycle of the pump plunger 506. Therefore, the work oil is not supplied from the first plunger hole 507 to the second plunger hole 516 and the motor plunger 515 does not move forward. Furthermore, because the work oil is not sucked into the first plunger hole 507 even in the suction cycle of the pump plunger 506, the work oil is not discharged from the second plunger hole 516 into the first plunger hole 507 and the motor plunger 515 is moved neither forward nor rearward.

Thus, when the inclination angle of the pump swash plate 509 is almost zero (speed change ratio 1), the speed change motor unit 501 is not driven by the speed change pump unit 500. As a result, a state is assumed in which the motor swash plate 518 is fixed to the cylinder block 505 via the motor plunger 515, the cylinder block 505 and motor swash plate 518 rotate in the same direction at almost the same revolution speed, the main transmission output shaft 36 rotates at almost the same revolution speed as the main transmission input shaft 27, and the rotation is transmitted to the main transmission output gear 37, without changing the rotation speed of the main transmission input shaft 27.

Then, when the pump swash plate 509 is inclined with respect to the axis of the main transmission input shaft 27, the first spool valve 536 is caused to slide back and forth by the outer ring 538 of the first radial bearing 537 due to the rotation of the cylinder block 505 that rotates integrally with the main transmission input shaft 27, and the first oil chamber 530 and second oil chamber 531 are linked alternately to the first plunger hole 507 each time the cylinder block 505 is rotated one-half revolution. Further, the second spool valve 540 is caused to slide back and forth by the outer ring 542 of the second radial bearing 541, and the first oil chamber 530 and second oil chamber 531 are linked alternately to the second plunger hole 516 each time the cylinder block 505 is rotated one-half revolution. A closed hydraulic circuit is formed between the first plunger hole 507 and second plunger hole 516 and the work oil is pumped from the first plunger hole 507 to the second plunger hole 516 in the discharge cycle of the pump plunger 506. On the other hand, in the suction cycle of the pump plunger 506, the work oil is returned from the second plunger hole 516 to the first plunger hole 507 and the axial piston pump and motor are operated.

When the pump swash plate 509 is inclined in one direction (positive inclination angle) with respect to the axis of the main transmission input shaft 27, the motor swash plate 518 rotates in the same direction as the cylinder block 505, the speed change motor 501 is caused to accelerate (positive rotation), the main transmission output shaft 36 rotates at a revolution speed higher than that of the main transmission input shaft 27, the rotation speed of the main transmission input shaft 27 is increased, and the resultant speed is transmitted to the main transmission output gear 37. Thus, the revolution speed of the speed change motor 501 driven by the speed change pump unit 500 is added to the revolution speed of the main transmission input shaft 27 and the resultant power is transmitted to the main transmission output gear 37. Accordingly, within a range of revolution speed that is higher than the revolution speed of the main transmission input shaft 27, the transmission output (travel speed) from the main transmission output gear 37 is changed proportionally to the inclination (positive inclination angle) of the pump swash plate 509, and a maximum travel speed is assumed at a maximum inclination (positive inclination angle, speed change ratio 2) of the pump swash plate 509.

Further, when the pump swash plate 509 is inclined in the other direction (negative inclination angle) with respect to the axis of the main transmission input shaft 27, the motor swash plate 518 is rotated in the direction opposite that of the cylinder block 505, the speed change motor 501 is decelerated (reverse rotation), the main transmission output shaft 36 is rotated at a revolution speed lower than that of the main transmission input shaft 27, the rotation speed of the main transmission input shaft 27 decreases, and the resultant speed is transmitted to the main transmission output gear 37.

Thus, the revolution speed of the speed change motor 501 driven by the speed change pump unit 500 is subtracted from the revolution speed of the main transmission input shaft 27 and the resultant speed is transmitted to the main transmission output gear 37. Accordingly, within a range of revolution speed that is lower than the revolution speed of the main transmission input shaft 27, the speed change output (travel speed) from the main transmission output gear 37 is changed proportionally to the inclination (negative inclination angle) of the pump swash plate 509, and a minimum travel speed is assumed at a maximum inclination (negative inclination angle, speed change ratio 0) of the pump swash plate 509. Further, in the present embodiment, when the negative inclination angle of the pump swash plate 509 is about 11 degrees, the speed change ratio becomes zero. Further, the speed change ratio is so set as to assume a maximum when the positive inclination angle is about 11 degrees; this inclination angle somewhat differs depending on the below-described speed change ratio pattern.

Further, as shown in FIG. 5 and FIG. 6, a forward movement gear 41 and a reverse movement gear 43 that perform switching of the forward movement and reverse movement and a travel sub-transmission gear mechanism 30 that performs switching of a low speed and a high speed are disposed in the front chamber 34 of the mission case 17.

Switching between the forward movement and reverse movement that is performed via the forward movement gear 41 and reverse movement gear 43 will be explained below. As shown in FIG. 6, a travel counter shaft 38 and a reverse rotation shaft 39 are installed inside the front chamber 34 where the main transmission output gear 37 is disposed. The forward movement gear 41 that is linked to a wet multi-plate hydraulic clutch 40 for forward movement and the reverse movement gear 43 that is linked to a multi-plate hydraulic clutch 42 for reverse movement are externally fitted on the travel counter shaft 38. The forward movement gear 41 is engaged with the main transmission output gear 37. The reverse rotation gear 44 provided at the reverse rotation shaft 39 is engaged with the main transmission output gear 37. A reverse rotation output gear 45 that is provided on the reverse rotation shaft 39 is engaged with the reverse movement gear 43.

When the below-described forward drive pedal 232 is stepped on, the clutch cylinder 47 is actuated by the forward drive clutch electromagnetic valve 46, the hydraulic clutch 40 for forward movement continues to be engaged, and the main transmission output gear 37 and travel counter shaft 38 are linked by the forward movement gear 41 (see FIG. 5, FIG. 6).

On the other hand, when the below-described reverse drive pedal 233 is stepped on, the clutch cylinder 49 is actuated by the reverse drive clutch electromagnetic valve 48, the hydraulic clutch 42 for reverse movement continues to be engaged, and the main transmission output gear 37 and travel counter shaft 38 are linked by the reverse movement gear 43 (see FIG. 5, FIG. 6).

In the neutral position when neither the forward drive pedal 232 nor the reverse drive pedal 233 is stepped on, the wet-type multi-plate hydraulic clutches 40, 42 for forward movement and reverse movement are disengaged, and the travel drive force from the main transmission output gear 37 that is outputted to the front wheels 3 and rear wheels 4 becomes almost zero (the state of main clutch disengagement).

Switching between a low speed and a high speed that is performed via the travel sub-transmission gear mechanism 30 will be described below. As shown in FIG. 5 and FIG. 6, the travel sub-transmission gear mechanism 30 and sub-transmission shaft 50 are disposed in the front chamber 34 of the mission case 17. Low-speed gears 51, 52 for sub-transmission and high-speed gears 53, 54 for sub-transmission are provided between the travel counter shaft 38 and sub-transmission shaft 50. Also provided are a low-speed clutch 56 and a high-speed clutch 57 that are engaged or disengaged by the sub-transmission hydraulic cylinder 55. The low-speed clutch 56 or high-speed clutch 57 is continually engaged by the sub-transmission hydraulic cylinder 55 in response to the manual operation of the below-described high speed—low speed toggle switch 222 for sub-transmission or revolution speed detection of the engine 5, the low-speed gear 52 or high-speed gear 54 is linked to the sub-transmission shaft 50, and a travel drive power is outputted from the sub-transmission shaft 50 to the front wheels 3 or rear wheels 4.

The rear end section of the sub-transmission shaft 50 passes through the partition wall 31 and extends into the rear chamber 35 of the mission case 17 (see FIG. 5). A pinion 59 is provided at the rear end section of the sub-transmission shaft 50. Further, a differential gear mechanism 58 for transferring the travel drive power to the left and right rear wheels 4 is disposed inside the rear chamber 35. A ring gear 60 that is caused to be engaged with the pinion 59 at the rear end of the sub-transmission shaft 50, a differential gear case 61 provided at the ring gear 60, and left and right differential output shafts 62 are installed in the differential gear mechanism 58. The differential output shaft 62 is linked to a rear wheel shaft 64 via the final gear 63 or the like to drive the rear wheel 4 provided at the rear wheel shaft 64 (see FIG. 5).

Figure 17:
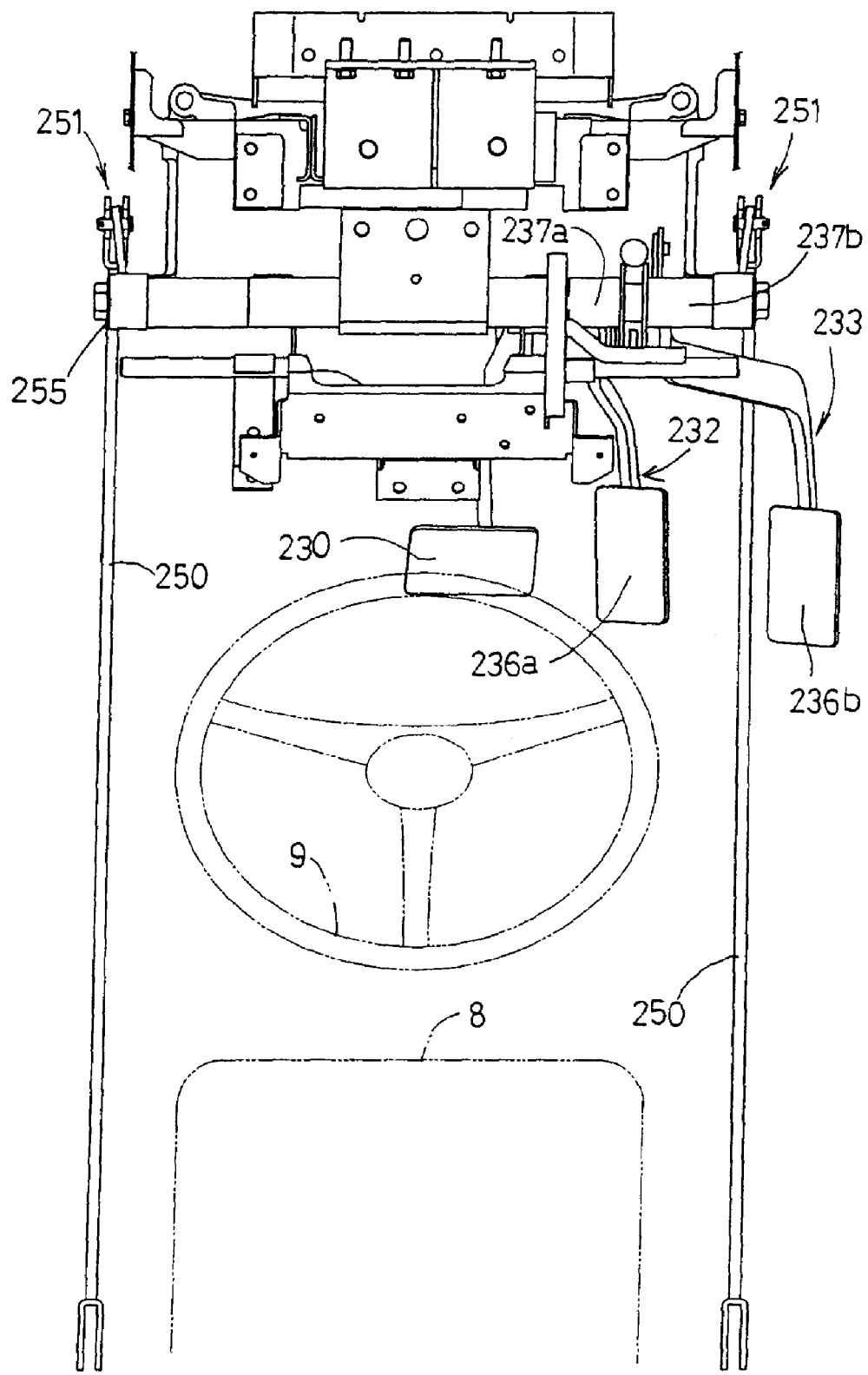
FIG. 17 is a plan view illustrating the forward movement (rearward movement) pedal unit.

Further, left and right brakes 65 are disposed at the left and right differential output shafts 62, respectively, and the left and right brakes 65 are operated by operating the below-described left and right brake pedals 230. The left and right brake pedals 230 are composed of one pedal, and the left and right brake pedals 230 and left and right brakes 65 are linked mechanically via a pair of left and right brake rods 250 and link mechanisms 251 (see FIG. 17, FIG. 25). The left and right brake pedals 230 are blocked in a brake position via a parking lever 252 and hook 253, and when the engine 5 is stopped, the left and right brakes 65 can be actuated as parking brakes (see FIG. 25). On the other hand, the steering angle detection of the handle 9, the brake cylinder 68 is actuated by left and right auto brake electromagnetic valves 67a, 67b, and any one of the left and right brakes 65 or both brakes (only one is shown in FIG. 5) are automatically operated for the tractor to make a turn, such as U-turn.

Switching between two-wheel drive and four-wheel drive of the front and rear wheels 3, 4 will be described below. As shown in FIG. 5 and FIG. 6, a front wheel drive case 69 is provided at the front wall member 32 of the mission case 17. The front wheel drive case 69 is equipped with a front wheel input shaft 72 and a front wheel output shaft 73. The front wheel input shaft 72 is linked to the sub-transmission shaft 50 by gears 70, 71. Furthermore, a four-wheel drive gear 75 that is linked by a hydraulic clutch 74 for a four-wheel drive and a low-speed gear 77 that is linked by a hydraulic clutch 76 for a low-speed drive are fitted externally on the front wheel output shaft 73. The four-wheel drive gear 75 and low-speed gear 77 are linked to the front wheel input shaft 72 by the gears 78, 79, respectively.

By setting the lever (not shown in the figure) that switches between the two-wheel drive and four-wheel drive to the four-wheel drive mode, the clutch cylinder 81 is actuated by a four-wheel drive hydraulic electromagnetic valve 80, the hydraulic clutch 74 for a four-wheel drive continues to be engaged, the front wheel input shaft 72 and front wheel output shaft 73 are linked by the four-wheel drive gear 75, and the front wheels 3 are driven together with the rear wheels 4.

Switching to the low-speed drive of the front wheels 3 will be described below. As shown in FIG. 5 and FIG. 6, when the U-turn manipulation (direction reversal on soft ground in a field) of the steering handle 9 is detected, the clutch cylinder 83 is actuated by the low-speed hydraulic electromagnetic valve 82, the hydraulic clutch 76 for a low speed continues to be engaged, the front wheel input shaft 72 and front wheel output shaft 73 are linked by the low-speed gear 77, and the front wheels 3 are driven at a high speed that is almost twice as high as the speed attained when the front wheels 3 are driven by the four-wheel drive gear 75.

As shown in FIG. 5, a front wheel input shaft 84 that protrudes rearward from the front wheel shaft case 13 and the front wheel output shaft 73 that protrudes forward from the front surface of the mission case 17 are linked via a front wheel drive shaft 85 that transmits power to the front wheels 3. Furthermore, a differential gear mechanism 86 that transmits a travel drive power to the left and right front wheels 3 is disposed inside the front wheel shaft case 13.

The differential gear mechanism 86 is equipped with a ring gear 88 that is caused to engage with a pinion 87 at the front end of the front wheel input shaft 84, a differential gear case 89 provided at the ring gear 88, and front and left differential output shafts 90. A front wheel shaft 92 is linked to the differential output shafts 90 with a final gear 91 or the like to drive the front wheels 3 provided at the front wheel shaft 92. Further, a hydraulic cylinder 93 for power steering that changes the travel direction of the front wheels to the left or right by steering the steering handle 9 is installed at the outer side surface of the front wheel shaft case 13.

As shown in FIG. 5 and FIG. 7, a hydraulic pump 94 for a work machine that serves to supply the work oil to the hydraulic lifting mechanism 20 for a work machine and a hydraulic pump 95 for travel that serves to supply the work oil to the hydraulic cylinder 93 for power steering and each speed change unit of the mission case 17 are provided at the front surface side of the front wall member 32 of the mission case 17. The mission case 17 also serves as an oil tank, and the work oil located inside the case 17 is supplied by hydraulic pumps 94, 95.

Switching of the drive speed of the PTO shaft 23 (four speeds forward, one speed reverse) will be explained below with reference to FIG. 5 and FIG. 7. A PTO speed change gear mechanism 96 for transmitting the power from the engine 5 to the PTO shaft 23 and a pump drive shaft 97 for transmitting the power from the engine 5 to the hydraulic pumps 94, 95 are provided in the front chamber 34 of the mission case 17 (see FIG. 7).

As shown in FIG. 7, a PTO speed change gear mechanism 96 that will be described below in greater detail is equipped with a PTO counter shaft 98 and a PTO speed change output shaft 99. A PTO input gear 101 linked by a hydraulic clutch 100 for PTO is fitted externally on the PTO counter shaft 98. An input gear 102 provided at the main transmission input shaft 27 and an output gear 103 of the pump drive shaft 97 are engaged with the PTO input gear 101, and the pump drive shaft 97 is linked to the main transmission input shaft 27.

By continual operation of a PTO clutch lever (not shown in the figures), a clutch cylinder 105 is actuated by the PTO clutch hydraulic electromagnetic valve 104 (see FIG. 5), the hydraulic clutch 100 for PTO continues to be engaged, and the main transmission input shaft 27 and PTO counter shaft 98 are linked by the PTO input gear 101.

A first-speed gear 106, a second-speed gear 107, a third-speed gear 108, a fourth-speed gear 109, and a reverse gear 110 for PTO output are fitted externally on the PTO speed change output shaft 99 (see FIG. 5 and FIG. 7).

In the PTO speed change output shaft 99, a speed change shifter 111 is movably supported with a spline. The gears 106, 107, 108, 109, 110 are selectively linked by the speed change shifter 111 to the PTO speed change output shaft 99. A speed change arm 112 that is linked to a PTO speed change lever 259 is joined to the speed change shifter 111. By speed change manipulation of the PTO speed change lever 259, the speed change shifter 111 is moved linearly along the axial line of the PTO speed change output shaft 99 by the speed change arm 112 and one of the gears 106, 107, 108, 109, 110 is selected and linked to the PTO speed change output shaft 99 (see FIG. 5 and FIG. 7). Therefore, the PTO speed change output of the first speed, second speed, third speed, fourth speed, or reverse is transmitted from the PTO speed change output shaft 99 to the PTO shaft 23 via the gears 113, 114.

Referring to FIG. 6, a rotation detection gear 115 provided at the reverse rotation shaft 39 and a main transmission output unit rotation sensor 116 of an electromagnetic pick-up type that detects the rotation of the main transmission output gear 37 are disposed opposite each other, and the output revolution speed of the main transmission mechanism 29 is detected by the main transmission output unit rotation sensor 116. A vehicle speed sensor 117 of an electromagnetic pick-up type that detects the rotation of the gear 78 of the front wheel input shaft 72 is also provided, and the travel speed (vehicle speed) is detected by the vehicle speed sensor 117 based on the rotation of the front wheel input shaft 72 and sub-transmission shaft 50.

As is clear from FIG. 8, in a work vehicle in which the mission case 17 is provided for transmitting power from the engine 5, an in-line stepless transmission 29 disposed on the same axial line with the input shaft 27 that transmits power from the engine 5 and the output shaft 36 that transmits hydraulic transmission power to the left and right wheels 3, 4 is installed in the mission case 17, the hydraulic pump unit 500 is disposed on one side and the hydraulic motor unit 501 is disposed on the other side to sandwich the cylinder block 505 constituting the stepless transmission 29, and the output shaft 36 is fitted externally on the input shaft 27 to obtain a double-shaft configuration, the hydraulic motor 501 unit is disposed between the input side of the input shaft 27 and the cylinder block 505, and the input side of the input shaft 27 and the output side of the output shaft 36 are disposed on the same side. Therefore, for example, even when the travel sub-transmission gear, differential gear, and PTO speed change gear are disposed inside the mission case 17, as in the power transmission structure of the tractor 1, the installation space for the hydraulic stepless transmission 29 can be easily ensured in the rear section of the mission case 17. The installation space for the PTO speed change gear or travel sub-transmission gear can be ensured in the front section of the mission case 17 that is an input side of the input shaft 27, and the mission case 17, for example of the tractor 1, can be reduced in size and weight and the production cost thereof can be decreased.

The differential gear mechanism 58 is provided with a differential lock mechanism (not shown in the figure) that stops the differential operation (the left and right differential output shafts 62 are driven at a constant speed at all times). Further, when a lock pin provided so that it can enter the differential gear case and exit therefrom is engaged with the differential gear by manipulating a differential lock lever (or pedal) that is not shown in the figure, the differential gear is fixed to the differential gear case, the differential function of the differential gear stops and the left and right differential output shafts 62 are driven at the same speed.

The structure of the main transmission hydraulic cylinder 556 that changes the speed of the hydraulic stepless transmission 29 will be described below in greater detail with reference to FIG. 9, FIG. 11, FIG. 13, and FIG. 14. A cylinder chamber 691 of the main transmission hydraulic cylinder 556 is formed in the rear wall member 33. A piston 557 of the main transmission hydraulic cylinder 556 is disposed so that it can slide in the vertical direction inside the cylinder chamber 691 of the main transmission hydraulic cylinder 556. A rectangular columnar base-end pin 693 is mated with a recess 692 formed on the outer periphery of the middle section of the piston 557. The rectangular columnar base-end pin 693 is disposed rotatably at one end side of the main transmission arm 558. The middle section of the main transmission arm 558 is supported rotatably via an arm shaft 694 on the holder linking member 690. A rectangular columnar distal-end pin 696 is slidably mated with an arm groove 695 on the other end side of the main transmission arm 558. The rectangular columnar distal-end pin 696 is rotatably supported by an inclination angle regulation fulcrum section 555 in the form of a semicircular plate of the pump swash plate 509. A rotation guide 697 for supporting the inclination angle regulation fulcrum section 555 is disposed in the first holder 510. The rotation guide 697 forms a semicylindrical surface concentric with the rotation center of the pump swash plate 509. The inclination angle of the pump swash plate 509 is changed by the guidance of the rotation guide 697.

Figure 10:
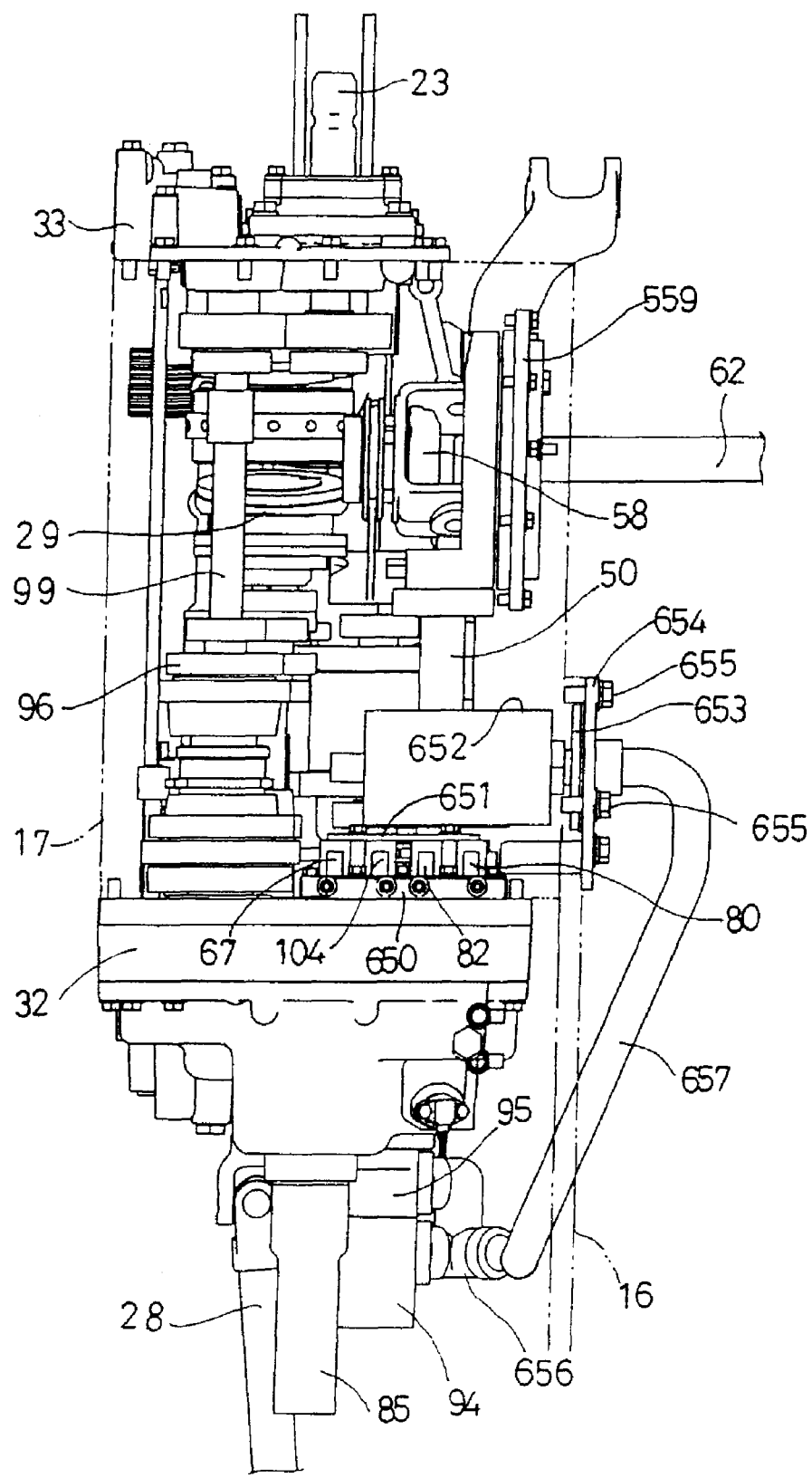
FIG. 10 is a bottom explanatory view illustrating the inside of the mission case.
Figure 11:
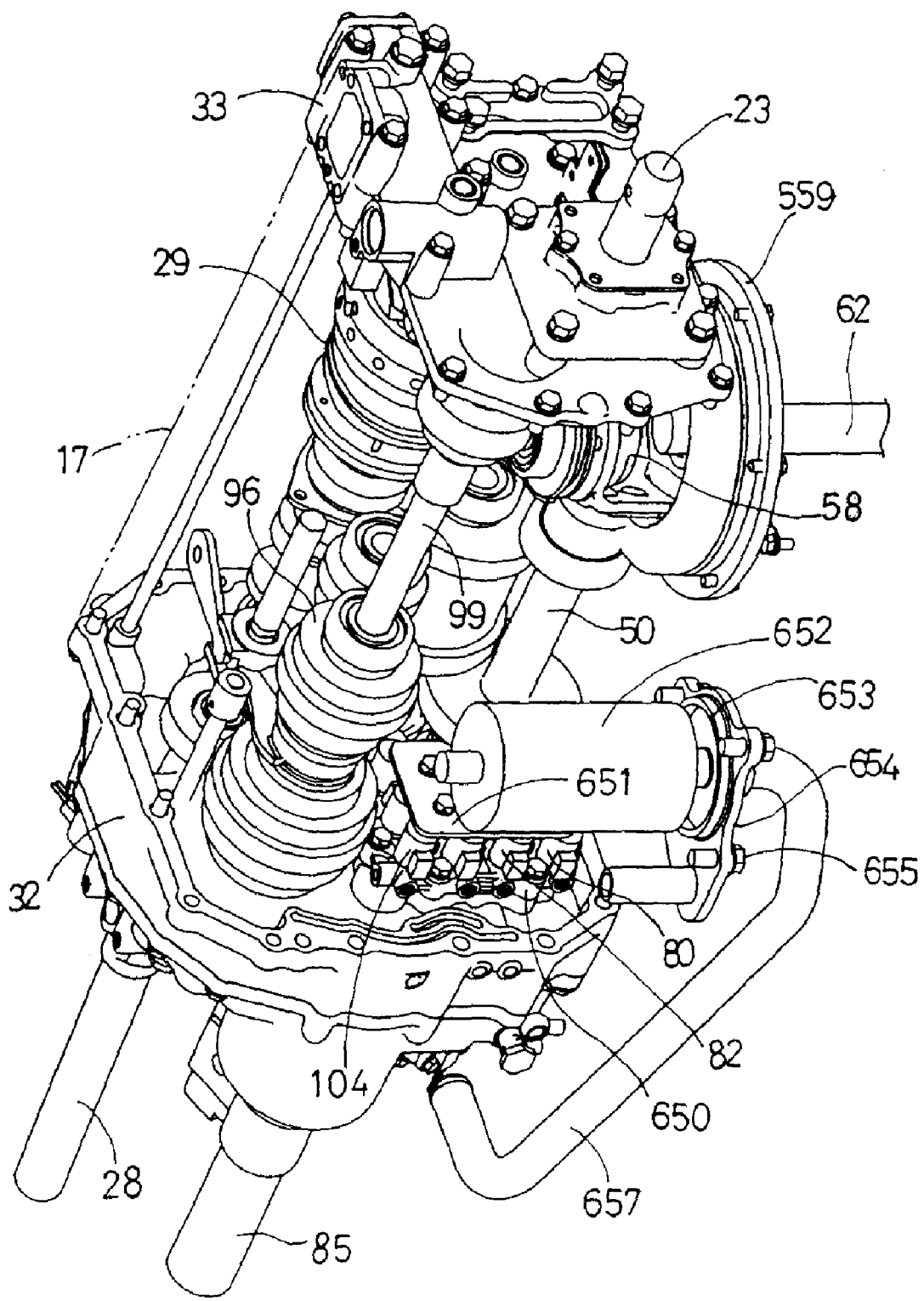
FIG. 11 is a bottom perspective view illustrating an oil filter and an electromagnetic valve.
Figure 12:
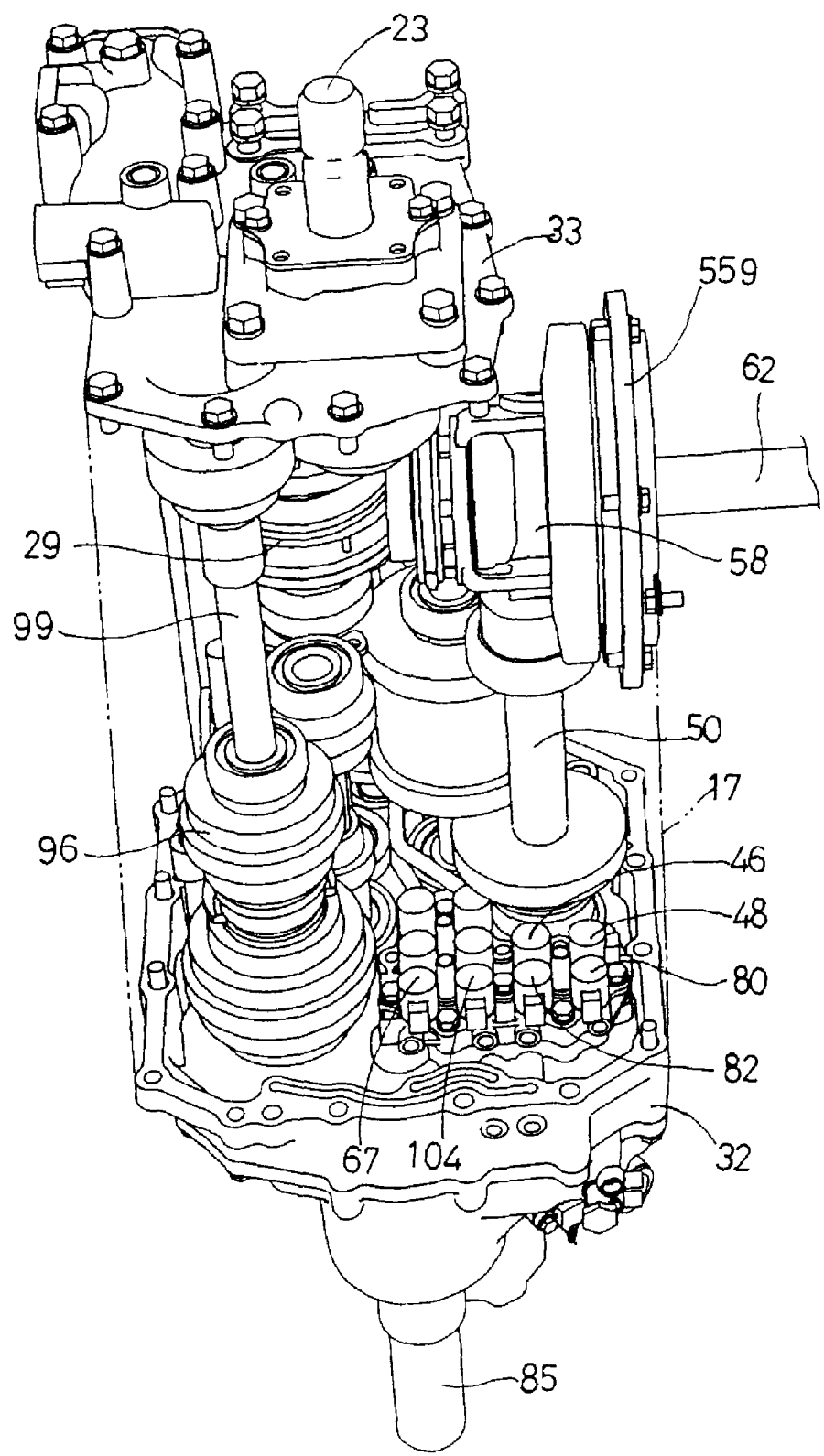
FIG. 12 is a bottom perspective view in which the oil filter is removed.
Figure 14:
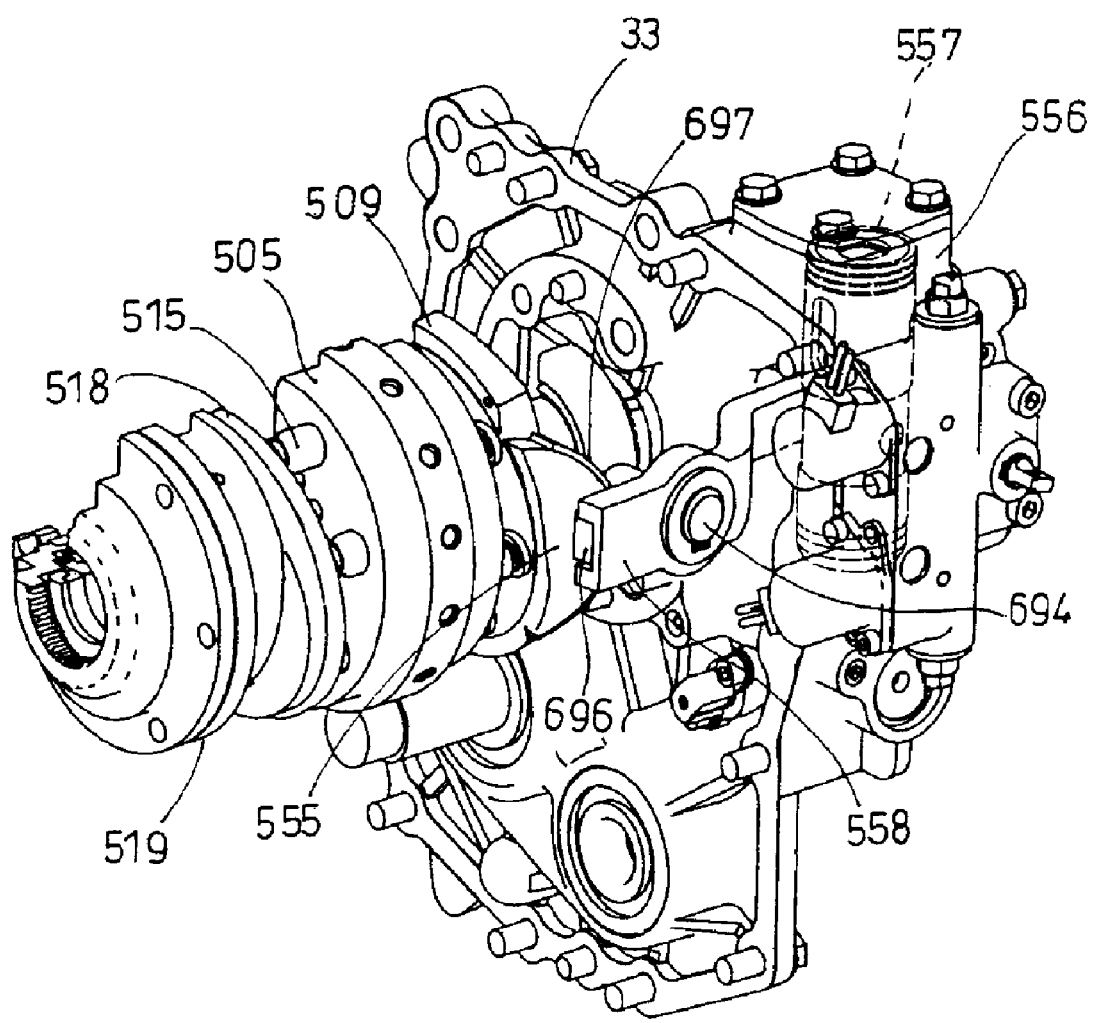
FIG. 14 is a perspective view illustrating the stepless transmission and rear wall member.

As shown in FIG. 11 and FIG. 12, the PTO shaft 23 is disposed in the center (in the left-right direction) of the mission case 17 (body of truck 1). The differential gear mechanism 58 is disposed on the right side of the PTO shaft 23 in the travel direction (FIG. 10). The hydraulic stepless transmission 29 is disposed obliquely upward on the left side of the PTO shaft 23 in the travel direction. The piston 557 is disposed on the left side of the hydraulic stepless transmission 29 in the travel direction (FIG. 14). The main transmission hydraulic cylinder 556 is disposed in the corner section obliquely upward on the left side of the rear wall member 33 in the travel direction (FIG. 14).

As shown in FIG. 13, the main transmission arm 558 and arm shaft 694 are disposed at the same height as the axial line of the stepless speed change transmission 29. As shown in FIG. 14, the main transmission arm 558 is disposed almost parallel to the axial line on the left side of the hydraulic stepless transmission 29 in the travel direction. The piston 557 is disposed almost vertically inside the rear wall member 33 to slide in the vertical direction. The piston 557 can be disposed by forming the formation section of the main transmission hydraulic cylinder 556 of the rear wall member 33 so that the formation section is slightly larger than the diameter of piston 557.

The speed change manipulation of the main transmission hydraulic cylinder 556 will be explained below. If the forward drive clutch electromagnetic valve 46 or reverse drive clutch electromagnetic valve 48 (see FIG. 5, FIG. 6, and FIG. 23) is switched by step-on manipulation of the below-described corresponding forward drive pedal 232 or reverse drive pedal 233, the main transmission hydraulic cylinder 556 is actuated. When the piston 557 moves up or down, the main transmission arm 558 rotates about the arm shaft 694, the inclination angle regulation fulcrum 555 and rotation guide 697 guide the rotation of the pump swash plate 509, the inclination angle of the pump swash plate 509 is changed, and the main transmission operation of the hydraulic stepless transmission 29 is performed. The pump swash plate 509 and first holder 510 are linked together and the first holder 510 and holder linking member 690 are linked together so that the pump swash plate 509 does not rotate with respect to the main transmission input shaft 27.

The mounting structures of the forward drive clutch electromagnetic valve 46, reverse drive clutch electromagnetic valve 48, left and right auto brake electromagnetic valves 67a, 67b, four-wheel drive hydraulic electromagnetic valve 80, double-speed hydraulic electromagnetic valve 82, and PTO clutch hydraulic electromagnetic valve 104 will be described below in greater detail with reference to FIG. 5, FIG. 10, FIG. 11, and FIG. 12.

As shown in FIG. 10 to FIG. 12, a base member 650 is disposed in a position below the sub-transmission shaft 50, differential output shaft 62, and level of the work oil 566 and fixed detachably with a bolt to the rear surface of the front wall member 32. The electromagnetic valves 46, 48, 67a, 67b, 80, 82, 104 are disposed in a state of protruding rearward at the rear surface of the base member 650. A flat lid 651 covers the rear surface of the electromagnetic valves 46, 48, 67a, 67b, 80, 82, 104. The flat lid 651 is detachably fixed with a bolt to the base member 650.

As shown in FIG. 10 and FIG. 11, an oil filter 652 for filtering the work oil is disposed inside the mission case 17 behind the flat lid 651, so that the flat lid is sandwiched between the electromagnetic valves 46, 48, 67a, 67b, 80, 82,

104 and the oil filter. The oil filter 652 is detachably fixed to a filter lid 653. The filter lid 653 is formed integrally with a tightening member 654. The tightening member 654 is detachably fixed via a bolt 655 to the outer side surface of the mission case 17. An oil supply pipe 656 of the hydraulic pump 94 for a work machine and the hydraulic pump 95 for travel passes through the filter lid 653 via the oil supply pipe 657.

The electromagnetic valves 46, 48, 80, 82, 104 are linked to the respective clutch cylinders 47, 49, 81, 83, 105 shown in FIG. 5 via oil channels of a punched hole type (not shown in the figure) formed in the front wall member 32 and base member 650. When the electromagnetic valves 46, 48, 80, 82, 104 are controlled by appropriate means, the respective clutch cylinders 47, 49, 81, 83, 105 are operated and the respective clutches 40, 42, 74, 76, 100 shown in FIG. 5 are switched.

Figure 9:
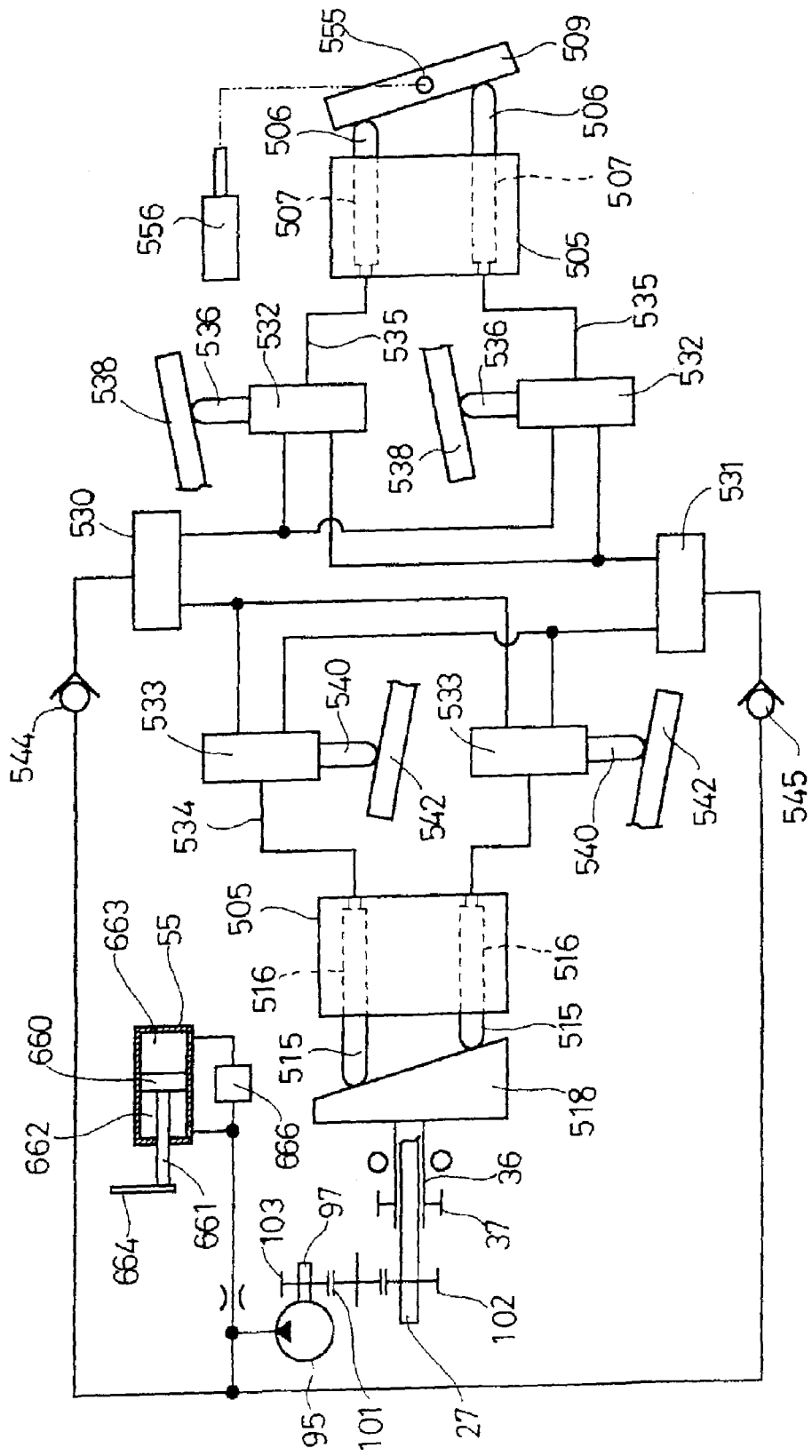
FIG. 9 is a hydraulic circuit diagram of the stepless transmission of the mission case.

The speed change structure of the sub-transmission gear mechanism 30 will be described below in grater detail with reference to FIG. 5, FIG. 6, and FIG. 9. As shown in FIG. 9, the sub-transmission hydraulic cylinder 55 is configured to have a double acting structure comprising a piston rod 661 on one side of a piston 660. A first cylinder chamber 662 provided with the piston rod 661 inside thereof and another second cylinder chamber 663 are formed in the sub-transmission hydraulic cylinder 55. A sub-transmission shifter 665 is linked via a shift arm 664 to the distal end section of the piston rod 661. The low-speed clutch 56 or high-speed clutch 57 is engaged by the sub-transmission shifter, and the sub-transmission shaft 50 is driven at a low speed or a high speed.

The first cylinder chamber 662 is directly linked to the discharge side of the hydraulic pump 95 for travel. The second cylinder chamber 663 is linked to the discharge side of the hydraulic pump 95 for travel via a speed change shift switching valve 666 of a two-position three-port type. The speed change shift switching valve 666 comprises a speed change solenoid 667. When the speed shift switching valve 666 is switched by a speed change solenoid 667 and the second cylinder chamber 663 is linked to the discharge side of the hydraulic pump 95 via the speed shift switching valve 666, the piston 660 moves in the direction of protruding the piston rod 661 by the difference in the received pressure between the two sides of the piston 660, the high-speed clutch 57 is engaged, and the sub-transmission shaft 50 is driven at a high speed (see FIG. 9).

The travel control (speed change control) of the work vehicle (traveling vehicle) of the present embodiment will be explained below. FIG. 23 is a functional block diagram of a travel control means. A travel controller 210 such as a microcomputer comprising a ROM storing a control program and a RAM storing various data is connected to a battery 254 via a key switch 211 for power supply. The key switch 211 is connected to a starter 212 for starting the engine 5.

Further, an electronic governor controller 213 for controlling the rotation of the engine 5 is connected to a travel controller 210. A governor 214 for regulating the fuel of the engine 5 and an engine revolution speed sensor 215 for detecting the revolution speed of the engine 5 are connected to the electronic governor controller 213. When the revolution position of a throttle lever 206 that is operated manually is detected by the throttle potentiometer 217 and the revolution speed of the engine 5 is set based on the detected value, the position of a fuel regulation rack (not shown in the figure) provided at the governor 214 is automatically regulated by a signal from the electronic governor controller 213 via an electromagnetic solenoid (not shown in the figure) for fuel regulation rack drive so that the set revolution speed of the throttle lever 206 and the revolution speed of the engine 5 match each other, whereby the revolution speed of the engine 5 is prevented from being changed by load fluctuations. In other words, with such configuration, the revolution speed of the engine 5 is maintained almost constant, regardless of load fluctuations.

Furthermore, as shown in FIG. 23, connected to the travel controller 210 are various sensors and switches of an input system, that is, a left steering sensor 218 serving as a left steering switch for detecting the rotation amount (left steering angle) of the round handle (steering handle) 9 to the left, a right steering sensor 219 serving as a right steering switch for detecting the rotation amount (right steering angle) of the round handle (steering handle) 9 to the right, a speed change potentiometer 220 as a forward potentiometer and a rearward potentiometer that allow the operator to change the travel speed, a speed change ratio setting dial 221, a high-speed—low-speed toggle switch 222 for switching the sub-transmission gear mechanism 30 to high speed and low speed, a main transmission output unit rotation sensor 116 for detecting the revolution speed of the main transmission output unit, a vehicle speed sensor 117 for detecting the rotation speed (travel speed) of the front and rear vehicles 3, 4, a PTO disconnection switch 223 for engaging and disengaging the PTO clutch 100 and disconnecting the output to the PTO shaft 23, a brake pedal switch 231 for detecting that the brake pedal 230 has been stepped on, an auto brake switch 245 enabling the automatic control of the left and right brake electromagnetic valves 67a, 67b, a four-wheel drive mode switch 246 enabling the automatic control of the four-wheel drive hydraulic electromagnetic valve 80, a double-speed mode switch 247 enabling the automatic control of the double-speed hydraulic electromagnetic valve 82, and a clutch switch 248 for switching off the forward drive clutch electromagnetic valve 46 and reverse drive clutch electromagnetic valve 47 prior to all other controls. The speed change potentiometer 219 is a pedal step-on position sensor that computes and determines the step-on amount of the forward drive pedal 232 or reverse drive pedal 233 are speed change pedals.

As shown in FIG. 23, connected to the travel controller 210 are various electromagnetic valves of an output system, that is, a forcible actuation switch 227 for forcibly switching OFF the forward drive clutch electromagnetic valve 46 and reverse drive clutch electromagnetic valve 48 of the main transmission mechanism by manipulating a forcible actuation button 226, the high-speed clutch electromagnetic valve 666 for switching the sub-transmission to high speed or low speed, the proportional control electromagnetic valve 203 that actuates the main transmission hydraulic cylinder 556 proportionally to the step-on amount of the below-described speed change pedal (forward drive pedal 232 and reverse drive pedal 233), left and right brake electromagnetic valves 67a, 67b, the four-wheel drive hydraulic electromagnetic valve 80, and the double-speed hydraulic electromagnetic valve 82.

Figure 16:
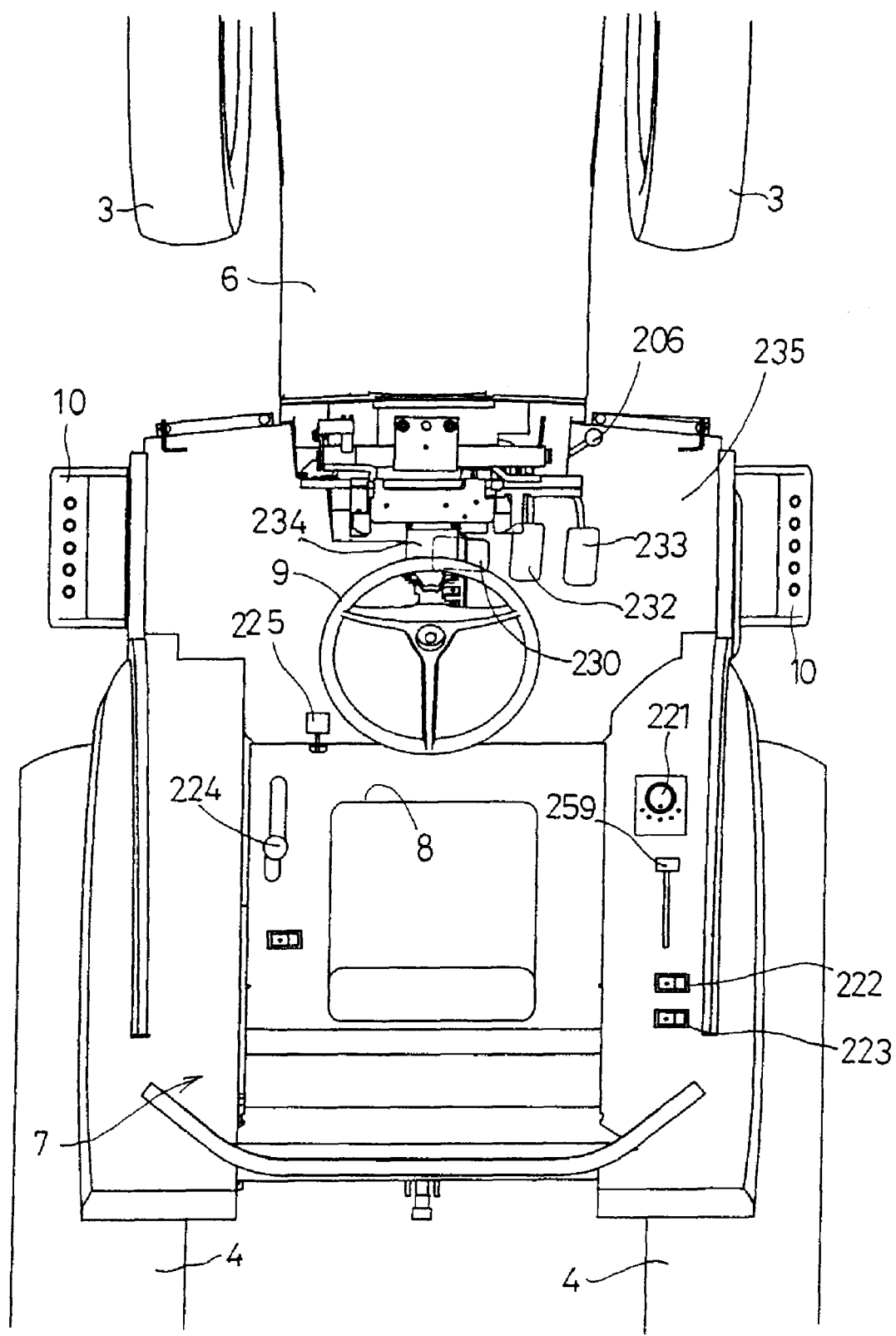
FIG. 16 is a plan view illustrating the cabin section of the tractor.

In the present embodiment, a round handle (steering handle) 9 is disposed on a steering column 234 protruding from a floor plate 235 in front of the operator seat 8 inside the operation unit (cabin) 7 shown in FIG. 16, and the brake pedal 230 is disposed below the steering column 234. The throttle lever 206 is disposed to the right from the steering column 234. Furthermore, the forward drive pedal 232 and reverse drive pedal 233 are disposed parallel to each other to the right from the steering column 234. The vehicle speed setting dial 211, work machine lifting lever 259, sub-transmission toggle switch 222, and PTO disconnection switch 223 are disposed on the right column of the steering seat 8. The PTO speed change lever 224 is disposed on the left column of the operator seat 8. A differential lock pedal 225 is disposed in front of the left column of the operator seat 8. The entire upper surface of the floor plate 235 is formed to be a flat surface.

The attachment structure of the forward drive pedal 232 and reverse drive pedal 233 will be described below with reference to FIG. 17 to FIG. 21.

Figure 19:
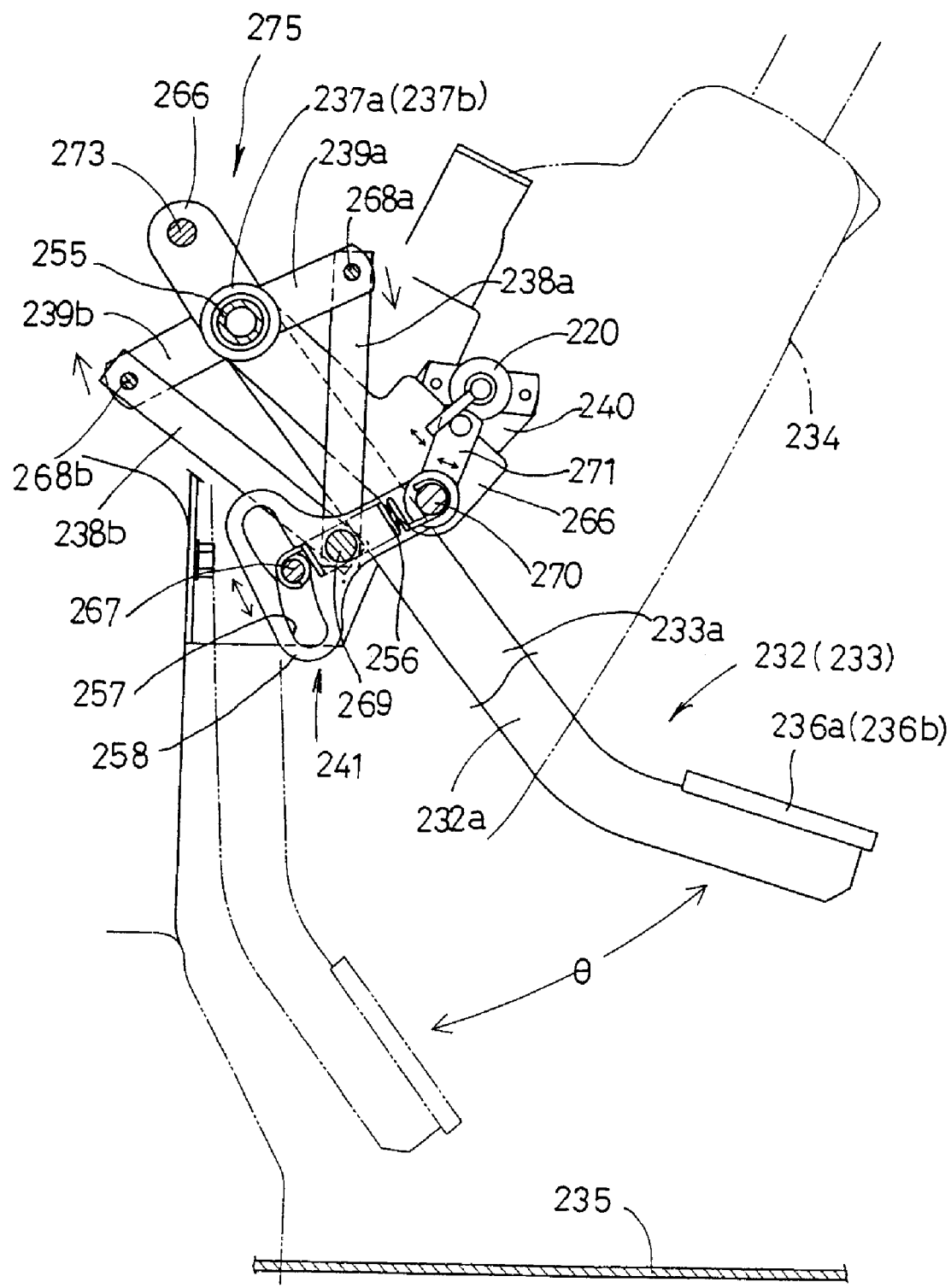
FIG. 19 is a side view illustrating a first spring unit.
Figure 21:
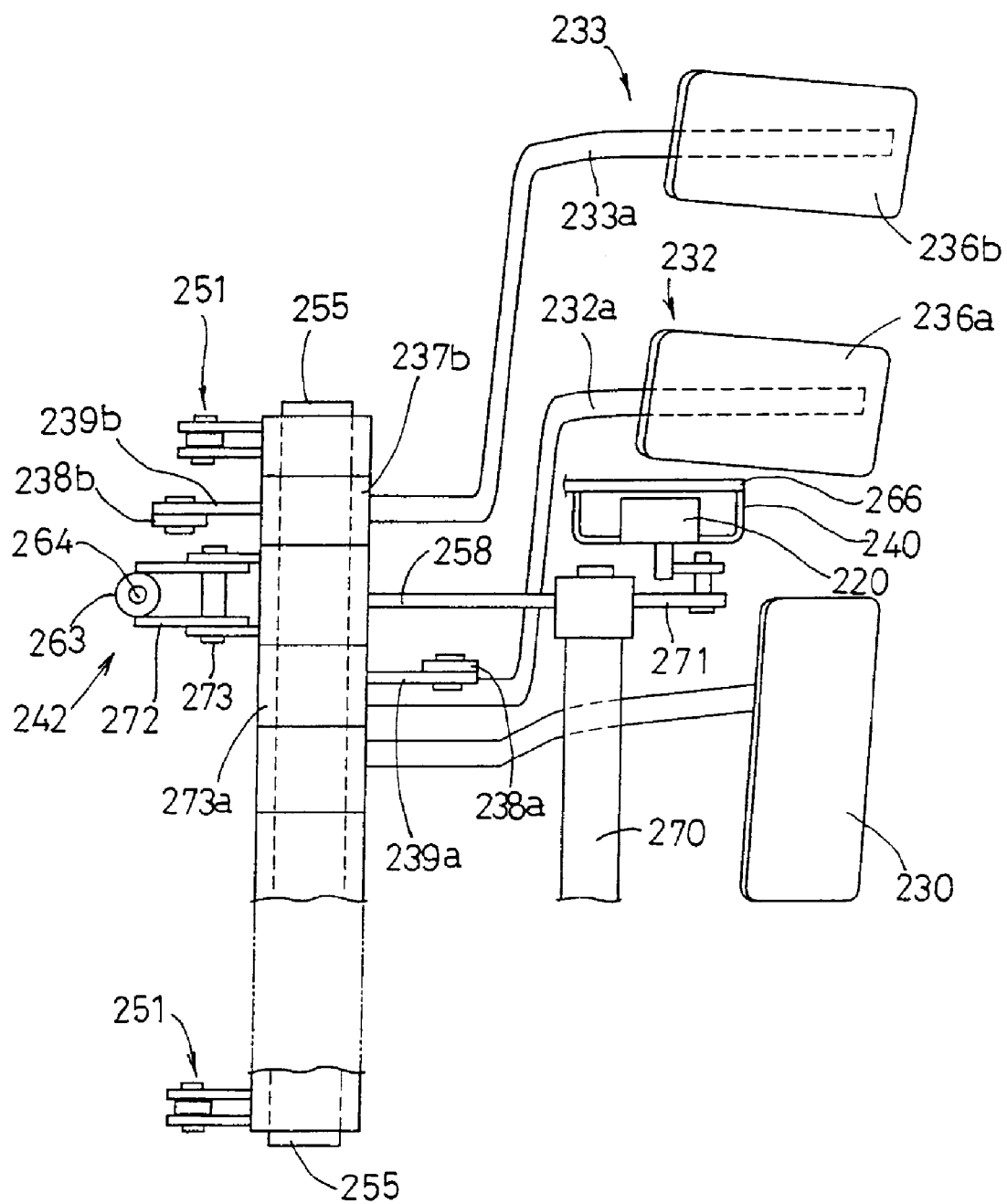
FIG. 21 is a plan view illustrating the first spring unit and second spring unit.
Figure 22:
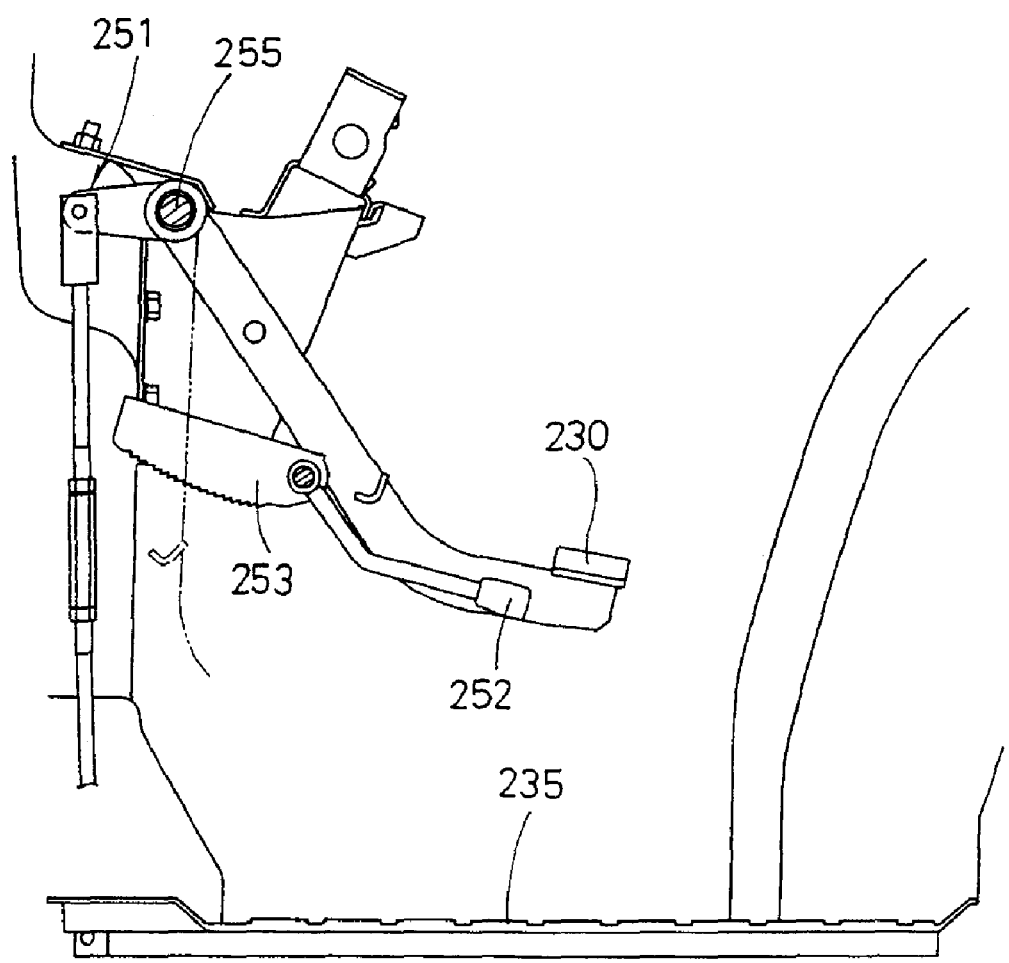
FIG. 22 is a side view illustrating the brake pedal unit.

As shown in FIG. 19 and FIG. 21, in the forward drive pedal 232 and reverse drive pedal 233, the rotation support shaft sections 237a, 237b of the distal ends of the pedal arms 232a, 233a thereof are rotatably fitted externally on the brake pedal shafts 255. Step-on plates 236a, 236b (or pedal arms 232a, 233a) of the forward drive pedal 232 and reverse drive pedal 233 are mounted so that they can be rotated obliquely downward from the initial (neutral) position at the upper surface of the floor plate 235 about the rotation support shaft sections 237a, 237b. A transmission link mechanism 275 is provided for transmitting the pedal step-on amount of the forward drive pedal and reverse drive pedal to the speed change potentiometer 220 that is a speed change sensor.

As shown in FIG. 18 to FIG. 21, the transmission link mechanism 275 comprises a pair of constraint links 238a, 238b for linking the forward drive pedal 232 and reverse drive pedal 233 to the below-described cam plate 258, neutral position restoration means 241 (first spring means) for returning the forward drive pedal 232 and reverse drive pedal 233 to the neutral position (position in which the transmission output is almost zero), and step-on resistance variation means 242 (second spring means) for increasing the pedal step-on force when the pedal step-on amount (or step-on angle θ) of the step-on pedal 236a, 236b exceeds a predetermined value. A transmission frame 266 for installing the neutral position restoration means 241 and step-on resistance variation means 242 is disposed at the mounting section of the steering column 234.

Figure 20:
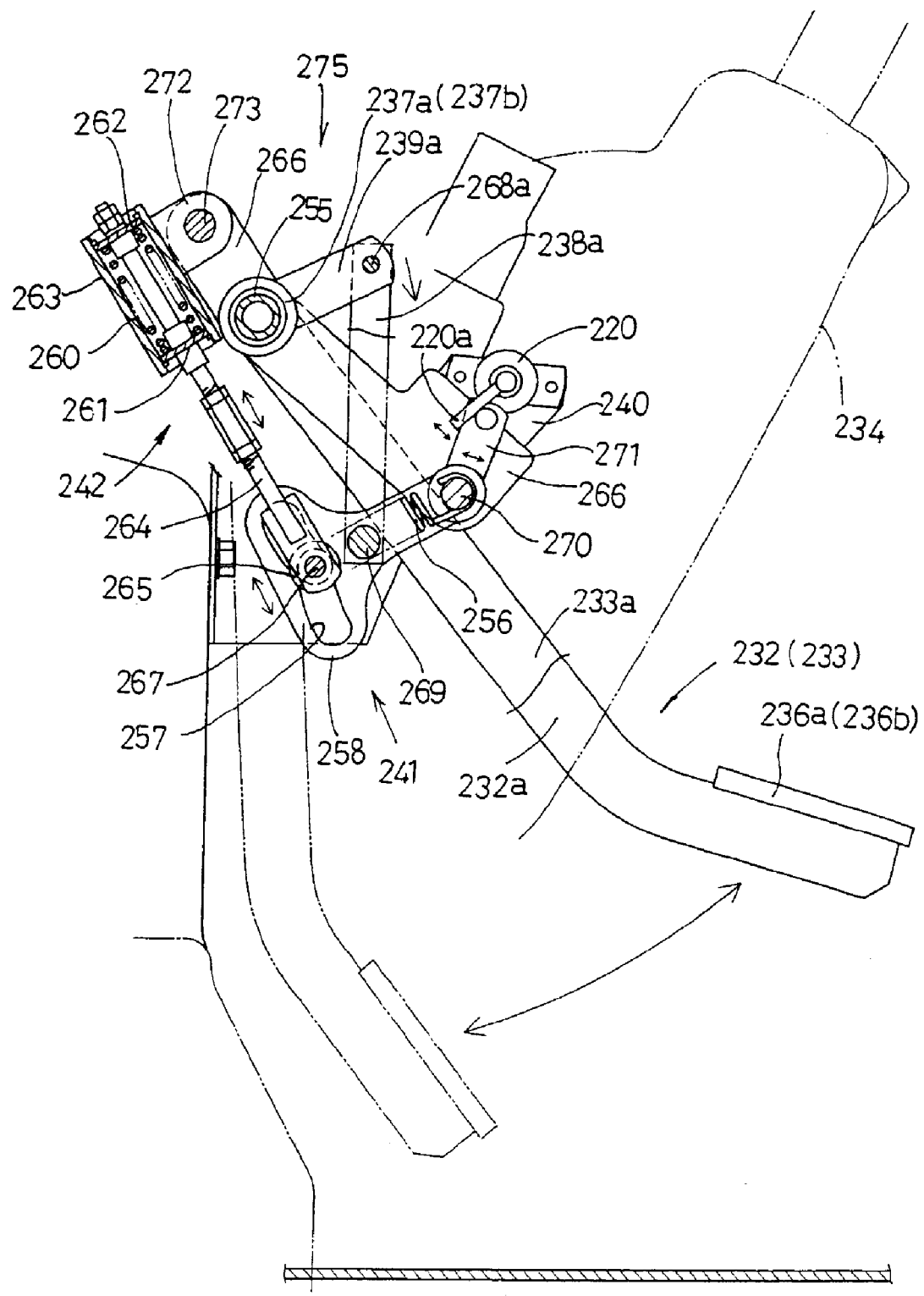
FIG. 20 is a side view illustrating a second spring unit.

As shown in FIG. 19 and FIG. 20, link arms 239a, 239b are installed at the rotation support shaft sections 237a, 237b, respectively, and one end of the constraint links 238a, 238b is rotatably linked via link shafts 268a, 268b, to the link arms 239a, 239b, respectively. The other end of the constraint links 238a, 238b is rotatably linked via a support shaft 269 to the middle section of the below-described cam plate 258. When the step-on plates 236a, 236b for both the forward movement and the rearward movement are supported in the initial (neutral) position, the constraint link 238a and link arm 239a for forward movement and the constraint link 238b and link arm 239b for rearward movement are so disposed that the respective links 238a, 238b and link arms 239a, 239b are disposed in positions (sea-saw structure) almost symmetrical with respect to the line connecting the brake pedal shaft 255 and support shaft 269. The aforementioned initial (neutral) position is a transmission neutral position in which the pedal step-on amount is almost zero, that is, a transmission neutral position in which the transmission drive output from the hydraulic stepless transmission 29 is almost zero.

Therefore, when the step-on plate 236a (236b) of any of the forward drive pedal 232 and reverse drive pedal 233 is stepped on by the operator, the step-on plate 236a (236b) that was stepped on moves in the step-on direction (forward, obliquely, and downward), whereas the other step-on plate 236b (236a) that was not stepped on moves in the direction (rearward, obliquely, and upward) opposite that of the step-on direction (forward, obliquely, and downward) of the step-on plate 236a (236b) that was stepped on.

On the other hand, when the operator simultaneously steps on the step-on plates 236a, 236b of the two pedals 232, 233 for forward drive and reverse drive, the step-on operations of the pedals 232, 233 are constrained by the link of the constraint links 238a, 238b and cam plate 258. Therefore, the two step-on plates 236a, 236 cannot be simultaneously moved in the step-on direction. Thus, even if the operator steps simultaneously on the two step-on plates 236a, 236, the two step-on plates 236a, 236b do not move simultaneously in the step-on direction (forward, obliquely, and downward), and only when the operator steps on any one step-on plate 236a (236b), one pedal 232 or 233 on the side where the step-on plate 236a or 236b was stepped on can be actuated.

As shown in FIG. 19 and FIG. 20, the neutral position restoration means 241 comprises a return spring 256 for returning the step-on plates 236a, 236b to the initial (neutral) position, a T-shaped cam plate 258 having a cam groove 257 formed in the distal end portion thereof, and a cam roller 265 that is movably accommodated inside the cam groove 257. The base end section of the cam plate 258 is movably linked via the cam shaft 270 to one end of transmission frame 266. The cam shaft 270 is disposed on the transmission frame 266. One end side of the return spring 256 is locked to the cam shaft 270. The other end side of the return spring 256 is locked to the roller shaft 267 serving to fit rotatably the cam roller 265. When the cam roller 265 is positioned in almost the central section of the cam groove 257, the roller shaft 267, support shaft 269, and cam shaft 270 are disposed on the same straight line, the return spring 256 is in a most compressed state, and the step-on plates 236a, 236b of the forward drive pedal 232 and reverse drive pedal 233 are held in respective initial (neutral) positions.

On the other hand, when the operator steps on any one step-on plate 236a, 236b for forward movement or rearward movement, the cam plate 258 rotates in the direct or reverse direction against the force of the return spring 256, the cam roller 265 moves from almost the central section of the cam groove 257 to both ends thereof, and the return spring 256 is stretched proportionally to the movement amount of the cam roller 265. The stretching force of the return spring 256 is almost equal to the pedal step-on force of the low-speed operation region that is realized when the pedals 232, 233 for forward movement or rearward movement are stepped on to cause low-speed movement.

As shown in FIG. 20 and FIG. 21, the step-on resistance variation means 242 comprises a step-on force augmentation spring 260 for increasing the step-on force of the step-on plates 236a, 236b, a spring cylinder 263 in which the step-on force augmentation spring 260 is disposed between a push spring socket 261 and a pull spring socket 262, a push-pull rod 264 that is linked at one end side to the push spring socket 261 and pull spring socket 262, and a cam roller 265 that is rotatably supported via a roller shaft 267 at the other end of the push-pull rod 264. The spring cylinder 263 has a support arm 272. The support arm 272 is rotatably linked via an arm shaft 273 to the transmission frame 266, thereby linking the spring cylinder 263 to the transmission frame 266. In this case, when the operator steps on any one of the step-on plates 236a, 236b, rotates the cam plate 258, moves the cam roller 265 to the end section of the cam groove 257, and then further steps on the step-on plate 236a, 236b and further continuously rotates the cam plate 258 in the same direction, the push-pull rod 264 moves in either the push direction or the pull direction, and either the push spring socket 261 or pull spring socket 262 moves to compress the step-on force augmentation spring 260.

The force (pedal step-on reaction force) that compresses the step-on force augmentation spring 260 acts upon any one of the forward movement or reverse drive pedal 232, 233 and becomes almost equal to the pedal step-on force in the high-speed operation region realized in movement at a high speed. Therefore, for the forward drive pedal 232 and reverse drive pedal 233, the step-on resistance force increases greatly in the middle zone of their step-on amounts. Thus, if the step-on plates 236a, 236b are stepped on in excess of the step-on amount in the low-speed movement region (the step-on amount required to more the cam roller 265 to the end section of the cam groove 257), the step-on reaction force (pedal step-on force) of the pedal 232 (233) will be increased by the step-on resistance variation means 242 in a stepwise manner, and the operator can easily decide whether the acceleration above the predetermined value is intended.

As shown in FIG. 19 and FIG. 20, the speed change potentiometer 220 such as a linear potentiometer serving as a step-in detection sensor for detecting the pedal step-on amount (or step-on angle) of the step-on plates 236a, 236b is provided between a bracket 240 and a sensor link 271. The bracket 240 is linked integrally to the transmission frame 266. The sensor link 271 is linked integrally to the cam plate 258. A sensor arm 220a of the speed change potentiometer 220 is elastically pressed at all times against the sensor link 271 by a force of a spring (not shown in the figure) contained in the speed change potentiometer 220. The sensor arm 220a rotates in response to the movement of the sensor link 271. Both the speed change potentiometer 220 and the cam plate 258 are disposed at the transmission frame 266 and the mutual arrangement of the speed change potentiometer 220 and the cam plate 258 can be determined with high accuracy.

The operation in which the operator manipulates the forward drive pedal 232 or reverse drive pedal 233 by stepping thereon and causes the tractor 1 to move forward or rearward will be described below with reference to FIG. 18 to FIG. 20.

First, the operation in which the operator manipulates the forward drive pedal 232 by stepping thereon will be described. When the operator steps on the step-on plate 236a for forward movement, the cam plate 258 is pushed down via the constraint link 238a and rotates counterclockwise as shown in FIG. 19. Due to such rotation of the cam plate 258, the cam roller 265 moves inside the cam groove 257, stretches the return spring 256, and actuates the speed change potentiometer 220 via the sensor link 271. The step-on amount (or step-on angle) of the forward drive pedal 232 is detected, and the transmission drive output (forward movement speed) from the hydraulic stepless transmission 29 is increased proportionally to the step-on amount of the forward drive pedal 232.

In a state where the step-on plate 236a for forward movement was stepped on and the cam roller 265 moved to the end section of the cam groove 257, if the operator further steps on the step-on plate 236a for forward movement and increases the transmission drive output (forward movement speed), the push-pull rod 264 is pulled down via the cam plate 258, the step-on force augmentation spring 260 is compressed via the pull spring socket 262, and the step-on force of the forward drive pedal 232 increases. The operator feels the step-on force of the forward drive pedal 232 and can move the forward drive pedal 232 from the low-speed operation region to the high-speed operation region.

Further, if the operator removes the foot from the forward drive pedal 232, the pull spring socket 262 returns to the initial position under the effect of the force of the step-on force augmentation spring 260, the cam plate 258 is returned to the neutral (initial) position by the force of the return spring 256, and the forward drive pedal 232 is returned to the initial position. Furthermore, when the forward drive pedal 232 is stepped on, the reverse drive pedal 233 moves in the direction opposite that of the step-on direction, and when the operator removes the foot from the forward drive pedal 232, the reverse drive pedal 233 also returns to the initial position.

The operation in which the operator manipulates the reverse drive pedal 233 by stepping thereon will be described below. When the operator steps on the step-on pedal 236b for rearward movement, the cam plate 258 is pulled up via the constraint link 238b and rotates clockwise as shown in FIG. 19. Due to such rotation of the cam plate 258, the cam roller 265 moves inside the cam groove 257, stretches the return spring 256, and actuates the speed change potentiometer 220 via the sensor link 271. The step-on amount (or step-on angle) of the reverse drive pedal 233 is detected, and the transmission drive output (rearward movement speed) from the hydraulic stepless transmission 29 is increased proportionally to the step-on amount of the reverse drive pedal 233.

In a state where the step-on plate 236b for rearward movement was stepped on and the cam roller 265 moved to the end section of the cam groove 257, if the operator further steps on the step-on plate 236b for rearward movement and increases the transmission drive output (rearward movement speed), the push-pull rod 264 is pushed up via the cam plate 258, the step-on force augmentation spring 260 is compressed via the push spring socket 261, and the step-on force of the reverse drive pedal 233 increases. The operator feels the step-on force of the reverse drive pedal 233 and can move the reverse drive pedal 233 from the low-speed operation region to the high-speed operation region.

Further, if the operator removes the foot from the reverse drive pedal 233, the push spring socket 261 returns to the initial position under the effect of the force of the step-on force augmentation spring 260, the cam plate 258 is returned to the initial (neutral) position by the force of the return spring 256, and the reverse drive pedal 233 is returned to the initial position. Furthermore, when the reverse drive pedal 233 is stepped on, the forward drive pedal 232 moves in the direction opposite that of the step-on direction, and when the operator removes the foot from the reverse drive pedal 233, the forward drive pedal 232 also returns to the initial position.

Further, when the forward drive pedal 232 is stepped on, the reverse drive pedal 233 moves in the direction opposite that of the step-on direction via the cam plate 258 and constraint link 238b, and when the operator removes the foot from the forward drive pedal 232, the reverse drive pedal 233 also returns to the neutral (initial) position. On the other hand, when the reverse drive pedal 233 is stepped on, forward drive pedal 232 moves in the direction opposite that of the step-on direction via the cam plate 258 and constraint link 238a, and when the operator removes the foot from the reverse drive pedal 233, the forward drive pedal 232 also returns to the initial (neutral) position.

Figure 18:
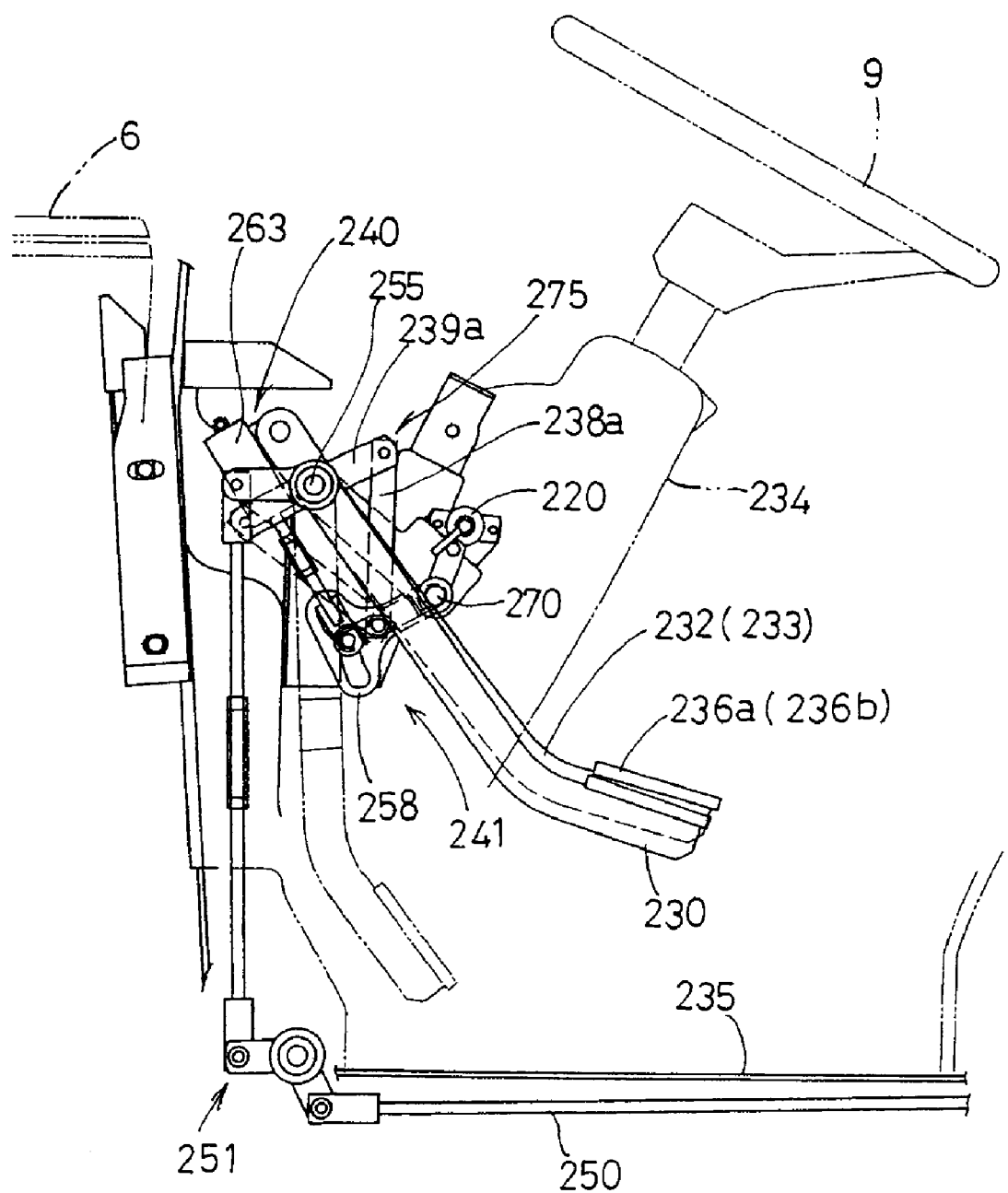
FIG. 18 is a side view illustrating the forward movement (rearward movement) pedal unit.

As is clearly shown in FIG. 18, the speed change pedal comprises the forward drive pedal 232 and reverse drive pedal 233 and is equipped with the speed change potentiometer 220 that is a speed change sensor that detects the step-on amount of the forward drive pedal 232 and reverse drive pedal 233, the transmission output unit rotation sensor 116 that detects the transmission drive output revolution speed of the hydraulic stepless transmission 29, and the travel controller 210 that is control means for speed change controlling the hydraulic stepless transmission 29. Therefore, the forward drive pedal 232 and reverse drive pedal 233 can be step-on manipulated, the transmission drive output revolution speed of the hydraulic stepless transmission 29 can be changed, and the hydraulic stepless transmission 29 can be speed change controlled. The speed change output of the hydraulic stepless transmission 29 can be smoothly switched in both the forward movement mode and the rearward movement mode, for example, the repeatedly performed operation of switching between the forward movement mode and rearward movement mode in the tractor 1 or a wheel loader can be performed in a very easy manner, maneuverability can be improved, and fatigue in long-term operation can be reduced.

As is clear from FIG. 19, because there are provided the transmission link mechanism 275 that transmits the pedal step-on amount of the forward drive pedal 232 and reverse drive pedal 233 to the speed change potentiometer 220 that is a speed change sensor and neutral position restoration means 241 provided in the transmission link mechanism 275, the forward drive pedal 232 and reverse drive pedal 233 can be held in the neutral position in a simple manner and the neutral (initial) position adjustment of the forward drive pedal 232 and reverse drive pedal 233 that is necessary when the pedals are assembled can be simplified.

As is clear from FIG. 19, because the forward drive pedal 232 and reverse drive pedal 233 are configured so that the step-on force in at least the low-speed operation region thereof is determined by the neutral position restoration means 241, the operator can approximately match, for example, the step-on force of the forward drive pedal 232 and the step-on force of the reverse drive pedal 233, the forward drive pedal 232 and reverse drive pedal 233 can be stepped on with approximately the same feel, and the step-on operability of the forward drive pedal 232 and reverse drive pedal 233 can be improved.

As is clear from FIG. 20, because, the step-on resistance variation means 242 is provided for linking at least any one of the forward drive pedal 232 and reverse drive pedal 233 and the configuration is such that the step-on force in the high-speed operation region of at least any one of the forward drive pedal 232 and reverse drive pedal 233 is determined by the step-on resistance variation means 242, the step-on force of the forward drive pedal 232 and reverse drive pedal 233 can be changed in a stepwise manner separately in the low-speed operation region and high-speed operation region. The boundary between the low-speed operation region and high-speed operation region of the work vehicle 1 can be easily recognized by the operator and the step-on operability of the forward drive pedal 232 and reverse drive pedal 233 can be improved.

Because the push-pull rod 264, which is a push-pull mechanism for linking the forward drive pedal 232 and reverse drive pedal 233 to the step-on resistance variation means 242 is provided as clearly shown in FIG. 20, the step-on resistance variation means 242 can be used as a restoration means (means for returning to the initial position) of both the forward drive pedal 232 and the reverse drive pedal 233. A structure for linking the forward drive pedal 232 and reverse drive pedal 233 to the neutral position restoration means 241 via the step-on resistance variation means 242 can be configured in a compact manner and at a low cost.

As is clear from FIG. 19, because the cam plate 258 is provided that is a constraint mechanism preventing the forward drive pedal 232 and reverse drive pedal 233 from being simultaneously actuated by the step-on manipulation by the operator and because the forward drive pedal 232 and reverse drive pedal 233 are linked to the neutral position restoration means 241 via the constraint mechanism 258, for example, even when the operator steps simultaneously on the forward drive pedal 232 and reverse drive pedal 233, the step-on manipulation thereof is prevented by the constraint mechanism 258 and the erroneous operation of the speed change sensor 220 or control means 210 can be prevented in a simple manner. The mounting structure of the forward drive pedal 232 and reverse drive pedal 233 or the installation structure of the speed change sensor 220 can be configured in a compact manner and at a low cost.

A constant speed change ratio control (speed change ratio adaptive control) will be explained below. The speed change ratio as referred to herein is defined as the ratio of revolution speed of the output shaft 36 of the hydraulic stepless transmission 29 to the revolution speed of the engine 5. The same definition also holds below.

In the work vehicle comprising the hydraulic stepless transmission 29 in which the input shaft 27 that receives the power transmitted from the engine 5 is disposed inside the mission case 17 carried on the traveling body 2 and the input shaft 27, hydraulic pump unit 500 for speed change, and the output shaft 36 of the hydraulic motor unit 501 are disposed on the same axial line and configured so that at least the travel drive force is transmitted from the output shaft 36 via the hydraulic motor unit 501, the actual (real) speed change ratio sometimes does not coincide with the preset target speed change ratio due to changes in environment or external disturbances (mainly, a load relating to the travel). Accordingly, the control in which the actual (real) revolution speed of the engine 5 and the revolution speed of the output shaft 36 are returned by feedback to the electronic governor controller 213 and the speed change ratio is brought close to or matched with the target speed change ratio is termed a constant speed change ratio control (speed change ratio adaptive control). In other words, the proportional electromagnetic valve 203 is controlled to control the revolution speed of the engine 5 to hold this revolution speed at an almost constant value, regardless of load fluctuations, and to control the speed change ratio of the hydraulic stepless transmission 29 so that the actual (real) speed change ratio is within the predetermined number of percents of the target speed change ratio. For this purpose, the speed change pattern of the speed change ratio of the revolution speed of the output shaft 36 of the hydraulic stepless transmission 29 to the revolution speed of the engine 5 is stored in a RAM (memory enabling the writing and reading of data at all times) as a pattern storage means in the travel controller 210.

The speed change ratio pattern is a pattern in which the speed change ratio increases proportionally to the increase in the step-on amount of the speed change pedal (forward drive pedal 232 and reverse drive pedal 233), and the proportional function thereof may be of a first-order function or a function represented by a second-order curve. In the pattern storage means, a plurality of speed change ratio patterns are stored in the functional table format or map format (see the speed change ratio diagram shown in FIG. 24). In the embodiment illustrated by FIG. 24, a total of 15 speed change ratio patterns (speed change ratio lines) are prepared and stored in advance in the pattern storage means according to the type of the agricultural work or field conditions (ground properties, paddy field, farmland, etc.). If the operator selects a scale of the speed change ratio setting dial 221, then any one pattern can be set (indicated) from among a plurality of speed change ratio patterns. In other words, the speed change ratio setting device (setting dial) 221 serves to change (regulate and set) the variation rate of the speed change ratio corresponding to the step-on amount of the speed change pedal (forward drive pedal 232, reverse drive pedal 233).

Further, in the embodiment illustrated by FIG. 24, the speed change ratio pattern is presented by a diagram in which the pedal step-on amount (in % with respect to the maximum step-on amount; data on the right side relate to the forward drive pedal and data on the left side relate to a reverse drive pedal) is plotted against the abscissa and the speed change ratio [(revolution speed of the output shaft 36)/(revolution speed of the engine 5)=0 to 2] of the revolution speed of the output shaft 36 in the hydraulic stepless transmission 29 related to the revolution speed of the engine 5 is plotted against the ordinate. The lines are numbered from No. 1 to No. 15 from the lower line in FIG. 24, and the speed change ratio pattern for forward movement and the speed change ratio pattern for rearward pattern are set identically (left-right symmetry). Furthermore, a diagram (shown by a broken line) demonstrating the variation of the pedal step-on force related to the pedal step-on amount is also shown in FIG. 24. Thus, the pedal step-on force (represented in % to the maximum value) is plotted against the right ordinate.

In the present embodiment, in the middle zone (for example, in the position at about 70% of the total step-on amount) of the step-on amount of the forward drive pedal 232 (or reverse drive pedal 233), the step-on force of the pedal is rapidly increased by the second spring means 242 of the above-described configuration. Thus, when the pedal step-on amount is from 0% to about 70%, the pedal step-on force increases linearly and proportionally with a low gradient against the impelling force of the first spring means 241. In the position with the pedal step-on amount of about 70%, because the resistance force of the second spring means 242 is applied, the pedal step-on force rapidly changes from about 20% to about 50% of the maximum value, and in a subsequent range of the pedal step-on amount from about 70% to 100%, the pedal step-on force increases almost linearly and proportionally with a high gradient.

Each speed change ratio pattern (speed change ratio line) also differs between the region below the position where the aforementioned pedal step-on amount is about 70% and the region above this position. In the embodiment shown in FIG. 24, in the lines No. 1 to No. 11 (No. 1 to No. 11 when counted sequentially from the lower line in FIG. 24), the settings are made such that the gradient of the speed change ratio lines in a region below the position where the pedal step-on amount is about 70% is small, whereas in the region above the position in which the pedal step-on amount is about 70%, the gradient of the speed change ratio lines becomes high. In the case the speed change ratio lines are employed, when the operator intends to accelerate the vehicle and steps on the pedals 232, 233 in excess of the usual pedal step-on amount range (within about 70%), the acceleration can be realized by the rapid increase in the pedal step-on force. Furthermore, as will be described below, when the operator wishes to increase the speed to a level that was set by the speed change ratio setting dial 221 or to a higher level in response to changes in the environment or external disturbances, the operator can avoid the trouble of changing the settings of the speed change ratio setting dial 221 and can achieve acceleration in a simple manner by stepping on the pedals 232, 233 above the predetermined amount.

In the line No. 12 (twelfth line from the lower line in FIG. 24), the speed change ratio line is set almost linearly for the pedal step-on amount of 0% to 100%.

In the lines No. 13 and No. 14 (No. 13 and No. 14 as counted from the lower line in FIG. 24), the gradient of the speed change ratio line in a region above the position in which the pedal step-on amount is about 70% is set lower than the gradient in the region below the position in which the pedal step-on amount is 70%. The speed change ratio line No. 15 is a line that corresponds to the speed change ratio 2 in the position where the pedal step-on amount is about 70% (immediately before the pedal comes into contact with the second spring means 242).

The speed change ratio adaptive control mode will be described below with reference to a flowchart (FIG. 25) of speed change ratio control. As described above, the proportional control electromagnetic valve 203 is actuated proportionally to the step-on amount of the forward drive pedal 232 (or reverse drive pedal 233), the main transmission hydraulic cylinder 556 is driven by the work oil from the proportional control electromagnetic valve, and the discharged amount of the oil pumped by the hydraulic pump unit 500 of the hydraulic stepless transmission 29, which is the main transmission mechanism, is controlled. This control is an automatic control executed by adapting the final target value of the speed change ratio that was set by the setting dial 221 or the maintained target to the changes in environment. More specifically, the step-on amount of the speed change pedals 232, 233 is auto-monitored and automatic control is performed to trace the target line of the speed change ratio that was set by the speed change ratio setting dial 221 according to the changes in the step-on amount. The revolution speed of the main transmission output shaft 36 can be thereby changed and regulated in a stepless manner.

Therefore, in the speed change ratio adaptive control, the engine is started (S1), then in the speed change ratio setting dial 221, the operator selects and determines the desired speed change ratio pattern according to the work type (S2) and reads the speed change ratio pattern that was stored in the RAM (memory that can be read at all times) of the travel controller 210.

When the operator steps on the forward drive pedal 232 (reverse drive pedal 233) to advance the tractor 1 forward (rearward), the pedal step-on amount is read from the forward movement potentiometer 219 (rearward movement potentiometer 220) of the travel controller 210 (S3). In the operation unit of the travel controller 210, the target speed change ratio value corresponding to the pedal step-on amount of the aforementioned selected speed change ratio pattern is calculated based on the numerical value that was read (S4).

On the other hand, in the travel controller 210, the engine revolution speed is read out from the engine revolution sensor 206 in each constant time interval (sampling time interval) over the entire period during the travel, and the main transmission output unit revolution speed is detected and read by the main transmission output unit rotation sensor 116 (S5). The present speed change ratio value is computed from the ratio of the main transmission output unit revolution speed (numerator) and the engine revolution speed (denominator) in the sampling interval (present) and it is judged whether the present speed change ratio value is almost equal to the target speed change ratio value (S6).

When the present speed change ratio value differs from the target speed change ratio value by no less than the predetermined number of percents (S6: no), the speed controller 210 corrects the applied voltage value of the proportional control electromagnetic valve 203, thereby changing and regulating the swash plate angle of the hydraulic pump unit 500, controlling the discharge amount of work oil into the hydraulic motor unit 501, and executing the main transmission operation, that is, increasing or decreasing the revolution speed of the main transmission output shaft 36 (S7) If the present speed change ratio value is almost equal to the target speed change ratio value (the case where the present speed change ratio value is within the predetermined number of percents (±)) (S6: yes), the revolution speed of the main transmission output shaft 36 is maintained (S8).

The feedback control is thus performed so that the present speed change ratio value approaches (or matches) the target speed change ratio value. Obviously in those cases, for example, when the output torque fluctuation of the engine 5 is insufficient due to external disturbances such as the increase of a travel load occurring when the tractor 1 moves from a dry land zone to a zone where the ground contains a large amount of water, or when the revolution speed of the engine 5 shifts from the predetermined value due to changes in environment, the electronic governor controller 213 is actuated and the control is performed to maintain the revolution speed of the engine 5 at the predetermined level.

If such speed change ratio adaptive control is employed, after the operator has once set the speed change ratio pattern of the speed change ratio with the speed change ratio setting dial 221, the operator can automatically control the speed change ratio to bring it automatically close to the value of the target speed change ratio at the time the actual value of the speed change ratio shifts from the value of the target speed change ratio due to changes in environment or fluctuations of travel load of the work vehicle by manipulating the forward drive pedal 232 or reverse drive pedal 233, which is the speed change pedal, the travel operation of the work vehicle can be brought close to the travel operation of an automobile equipped with a stepless transmission mechanism and greatly simplified, and the fatigue in long-term operation can be reduced.

Furthermore, because the automatic control is executed by correcting the operation of the proportional control electromagnetic valve 203, the resultant effect is that fine and rapid control can be performed. Further, because the tractor is equipped with the electronic governor 214 for controlling the revolution speed of the engine 5 by the load, the operator is not required to regulate the engine throttle by manual operations, the engine revolution speed control and the angle control of the pump swash plate 509 can be performed such that both the revolution speed of the engine 5 and the output of the hydraulic stepless transmission 29 are maintained with a high efficiency, the travel operation of the work vehicle can be brought close to the travel operation of the automobile equipped with a stepless transmission mechanism and greatly simplified, and the fatigue in long-term operation can be decreased. Further, computing the speed change ratio by detecting the vehicle speed (revolution speed of wheels) instead of detecting the revolution speed of the main transmission unit, can be employed with the equivalent result.

In one embodiment of the revolution speed map of the engine 5 of the present embodiment, the revolution speed pattern of the revolution speed of the engine 5 related to the pedal step-on amount of the forward and reverse drive pedals 232, 233 is stored in a RAM (memory enabling the writing and reading of data at all times) as a pattern storage means in the travel controller 210.

In this revolution speed pattern, the revolution speed of the engine 5 increased proportionally to the increase in the step-on amount of the speed change pedal (forward drive pedal 232 and reverse drive pedal 233), and the proportionality function thereof may be a first-order function or a function represented by a second-order curve. The pattern storage means stores the revolution speed pattern in a functional table format or a map format (see the revolution speed diagram such as shown in FIG. 31).

Figure 31:
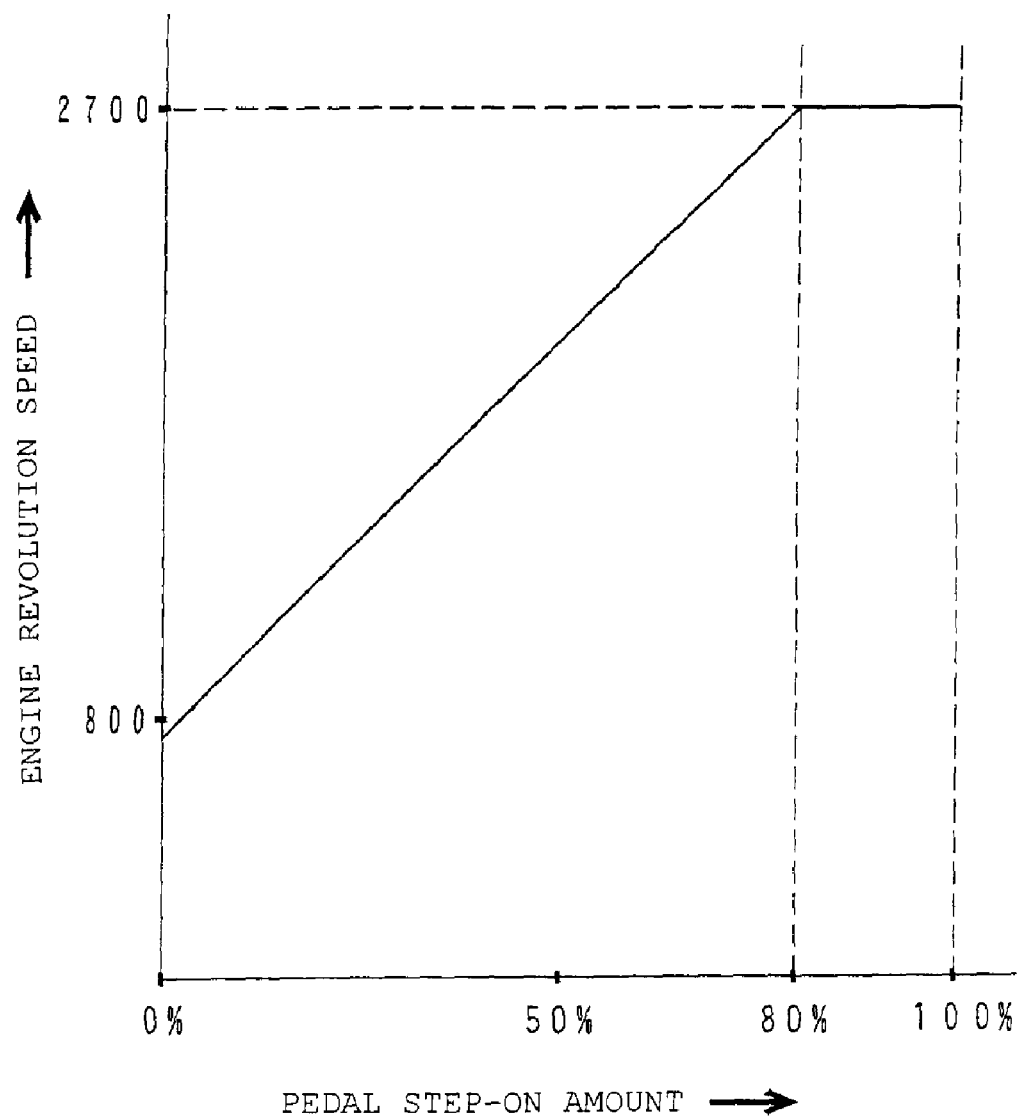
FIG. 31 is an engine revolution speed diagram.

In the embodiment shown in FIG. 31, the diagram of the revolution speed pattern is shown by plotting the pedal step-on amount (5 with respect to the maximum step-on amount) of the forward and reverse drive pedals 232, 233 against the abscissa and plotting the revolution speed of the engine 5 against the ordinate. The revolution speed pattern differs between a region above and a region below the position in which the pedal step-on amount is about 80%. Thus, within a range of the pedal step-on amount from 0% to about 80%, the revolution speed of the engine 5 increases linearly and proportionally from the low-speed idle revolution speed (for example about 750 rpm) to a high-speed idle revolution speed (for example, about 2700 rpm). In positions in which the pedal step-on amount is from about 80% to 100%, the revolution speed of the engine 5 is maintained at an almost constant revolution speed by the high-speed idle revolution speed (for example, about 2700 rpm). When the revolution speed of the engine 5 is the high-speed idle revolution speed, the output torque of the engine 5 is almost maximum.

The accelerator interlocking speed change ratio control of the ravel body will be explained below with reference to the diagram illustrating the relationship between the step-on amount of the speed change pedals 232, 233 and the revolution speed of the engine 5 shown in FIG. 31 and the flowchart of the accelerator interlocking speed change ratio control shown in FIG. 32. As described above, the oil discharge amount of the hydraulic pump unit 500 of the hydraulic stepless transmission 29 is controlled proportionally to the step-on amount of the forward drive pedal 232 (or reverse drive pedal 233). In this case, the step-on amount of the speed change pedals 232, 233 is auto-monitored and the revolution speed of the engine 5 is automatically controlled according to the variation of the step-on amount to trace the target line of the revolution speed that was set. The vehicle speed (revolution speed of the main transmission output shaft 36) and the revolution speed of the engine 5 can be thereby changed and regulated in a stepless manner.

In the accelerator interlocking speed change ratio control of the present embodiment, similarly to the above-described speed change ratio adaptive control, the engine is started (S1), the speed change ratio is set with the speed change ratio setting dial (S2), the step-on amount of the forward drive pedal 232 (reverse drive pedal 233) is read (S3), the target speed change ratio is calculated (S4), and the revolution speed of engine, revolution speed of main transmission output unit, and revolution speed corresponding to the vehicle speed are read (S5). Then, it is judged whether the output from the sub-transmission gear mechanism 30 is a high speed or a low speed (S101).

In such travel operation, when the output from the sub-transmission gear mechanism 30 is a low speed (S101: no), it is judged whether the present speed change ratio value is almost equal to the target speed change ratio value (S6). When the present speed change ratio value is almost equal to the target speed change ratio value (S6: yes), the revolution speed of the main transmission output shaft 36 is maintained (S8). On the other hand, when the present speed change ratio value is not almost equal to the target speed change ratio value (S6: no), the above-described speed change ratio adaptive control is executed, that is, the revolution speed of the main transmission output shaft 36 is increased or decreased (S7).

On the other hand, in the case where the output from the sub-transmission gear mechanism 30 is a high speed (S101: yes) when the revolution speed of the engine, revolution speed of the main transmission output unit, and vehicle speed are read in step S5, it is judged whether the throttle lever 206 is in a throttle lever automatic ON position, which is an automatic control position (S102). When the throttle lever is in the throttle lever automatic ON position (S102: yes), the operation of the engine revolution speed adaptive control is executed (S103). Then, it is judged whether the present speed change ratio value is almost equal to the target speed change ratio value (S6) and the above-described speed change ratio adaptive control (S7) is executed.

With the engine revolution speed adaptive control of the present embodiment, when the output from the sub-transmission gear mechanism 30 is a high speed (S101: yes), the engine revolution speed command signal from the travel controller 210 is outputted by CAN communication to the electronic governor controller 213 and the engine governor 214 is automatically controlled by the operation of revolution speed control of the electronic governor controller 213.

For example, in a region where the step-on amount of the forward or reverse drive pedals 233, 233 is 0 to about 80%, the revolution speed of the engine 5 is increased or decreased by the revolution speed control of the electronic governor controller 213 proportionally to the step-on amount of the forward or reverse drive pedals 233, 233. In this case, the revolution speed of the engine 5 is changed by the revolution speed control of the electronic governor controller 213 to become almost equal to the target revolution speed on the revolution speed pattern above the low-speed idle revolution speed (for example, about 750 rpm) and below the high-speed idle revolution speed (for example, about 2700 rpm).

If the engine revolution speed adaptive control is thus executed, when the operator manipulates the speed change pedal (forward drive pedal 232 or reverse drive pedal 233), the actual value of the revolution speed of the engine 5 can be automatically controlled to come automatically close to the value of the target revolution speed when the value of the revolution speed of the engine shifts from the value of the target revolution speed due to changes in environment and variations of travel load of the work vehicle. Therefore, the engine revolution speed adaptive control identical to the accelerator operation of a usual automobile and a speed change ratio adaptive control identical to the stepless transmission operation of a usual automobile are executed continuously at almost the same time. As a result, the travel operation of the work vehicle can be brought close to the travel operation in an automobile equipped with a stepless transmission and greatly simplified, and when the sub-transmission gear mechanism 30 is switched to a high speed and the vehicle is moved in a high-speed mode, the engine 5 can be operated at a low level of fuel consumption and noise.

On the other hand, in the region where the step-on amount of the forward movement or reverse drive pedal 233, 233 is about 80% or more, the engine governor 214 is automatically controlled by the operation of the electronic governor controller 213 that maintains a constant speed change ratio, and the revolution speed of the engine 5 is maintained at an almost constant revolution speed at a high-speed idle revolution speed (about 2700 rpm, regardless of whether the output load of the engine 5 increases or decreases. If the revolution speed adaptive control is thus executed, when the travel load is high, e.g., on slopes, or when the operation has to be adapted to a high-speed travel close to a maximum speed, the output torque of the engine 5 is held almost at a maximum. In this case, the high-load travel or high-speed travel can be brought close to the travel operation in a conventional usual work vehicle such as a tractor or wheel loader, and engine troubles caused by overloading can be prevented even in work vehicles equipped with an engine with a horsepower less than that of the usual automobile engines.

Figure 32:
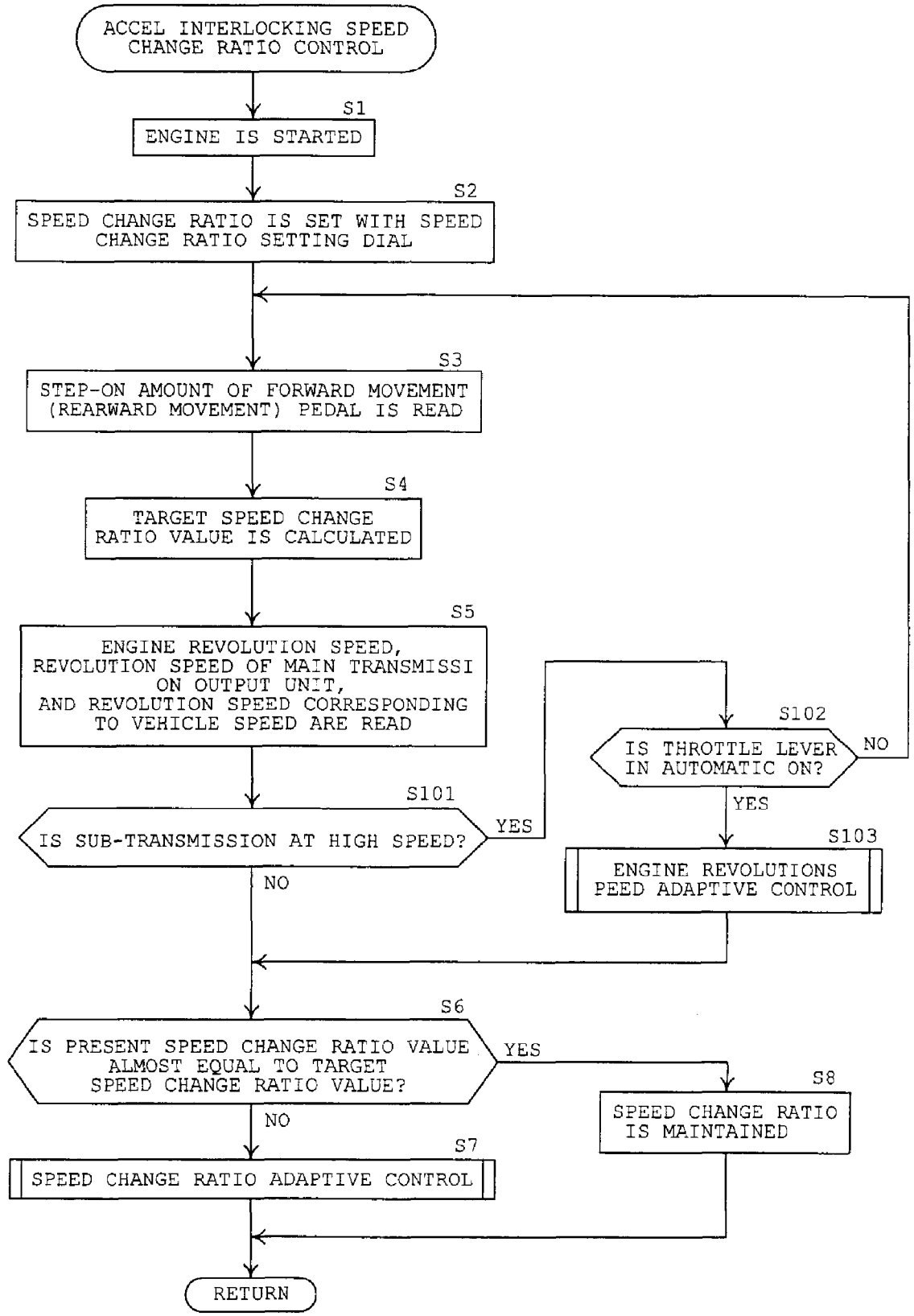
FIG. 32 is a flowchart of accelerator interlocking speed change ratio control.

As is clear from FIG. 23 and FIG. 32, a work vehicle comprising the hydraulic stepless transmission 29 for transmitting power from the engine 5 carried on a traveling body, the sub-transmission mechanism 30 that transmits the transmission drive output from the hydraulic stepless transmission 29, the forward drive pedal 232 and reverse drive pedal 233 that are speed change pedals for changing the speed change ratio of the hydraulic stepless transmission 29, the speed change potentiometer 220 that is a speed change sensor for detecting the step-on amount of the speed change pedals 232, 233, and the transmission output unit rotation sensor 116 that detects the transmission drive output revolution speed of the hydraulic stepless transmission 29 is further equipped with the electronic governor controller 213 that is an engine control means for maintaining the revolution speed of the engine 5 at a revolution speed that was set by the throttle lever 206 and the travel controller 210 that is a travel control means for controlling the revolution speed of the engine 5 and the speed change ratio of the hydraulic stepless transmission 29 based on the step-on amount of the speed change pedals 232, 233. Therefore, in the tractor 1 or wheel loader, the operator can change the direction of the work vehicle 1 by stepping on the speed change pedals 232, 233, while holding the steering handle 9 with both hands, and the operations of accelerating the vehicle when it is started and decelerating when it is stopped are brought close to the travel operation in an automobile equipped with a stepless transmission and can be performed in a very easy manner. Furthermore, maneuverability can be improved and fatigue in long-term operation can be reduced.

As is clear from FIG. 23 and FIG. 32, when the sub-transmission mechanism 30 is switched to a high speed, the travel control means 221 controls the revolution speed of the engine 5 based on the step-on amount of the speed change pedals 232, 233. Therefore, in a low-load work, e.g., when the work vehicle travels on the road, maneuverability can be improved. On the other hand, in the case of a high-load work, such as work in the field, when the sub-transmission mechanism 30 is switched to a low speed, the revolution speed of the engine 5 can be maintained at an almost constant level and engine trouble can be prevented.

As is clear from FIG. 23 and FIG. 32, when the throttle lever 206 that sets the revolution speed of the engine 5 is in an automatic control position, the travel control means 210 controls the revolution speed of the engine 5 based on the step-on amount of the speed change pedal 232, 233. Therefore, the ON/OFF switching of the revolution speed control of the engine 5 can be performed very easily according to the travel conditions such as travel in the field where slipping is highly probable and travel on an asphalt road where slipping can hardly occur. Furthermore, maneuverability can be improved and fatigue in long-term operation can be reduced.

As is clear from FIG. 23, FIG. 31, and FIG. 32, when the speed change pedals 232, 233 are not stepped on, the travel control means 210 maintains the revolution speed of the engine 5 at a constant revolution speed level of a low speed, but when the change pedals 232, 233 are stepped on, the travel control means controls the revolution speed of the engine 5 to maintain it at a constant revolution speed level of a high speed. Therefore, noise and fuel consumption of the engine 5 in an idling mode can be reduced and engine troubles during high-speed (high-load) work can be prevented.

As is clear from FIG. 23, FIG. 24, and FIG. 25, the travel control means 210 controls the output revolution speed of the hydraulic stepless transmission 29 along the speed change ratio pattern that was set in advance by the speed change ratio setting dial 221, which is a speed change ratio setting device, according to the step-on amount of the speed change pedals 232, 233. Therefore, after the operator has once set the speed change ratio pattern of the speed change ratio with the speed change ratio setting device 221, when the actual value of speed change ratio shifts from the target value due to changes in environment or fluctuations of the travel load of the work vehicle 1, the operator can automatically control the speed change ratio to bring it automatically close to the value of the target speed change ratio by manipulating the speed change pedals 232, 233.

The travel stop control of the vehicle body will be explained below with reference to the flowchart shown in FIG. 26. When the tractor 1 of the present embodiment is started, first, the operator turns the key switch 211 to the ON position, whereby the power source for the travel controller 210 is turned on and the electric system is actuated. The operator then runs the key switch (key SW) 211 to the actuation position of a starter 212 (S11) and starts the engine 5 (S12), while stepping on the brake pedal 230. Then, if the operator returns the key switch 211 to the ON position (S13: yes), the swash plate angle of the hydraulic pump unit 500 is changed, for example, to about −11 degree and moved to a speed change ratio 0 (S14). In this state, the work oil from the hydraulic pump unit 500 is supplied to the hydraulic motor unit 501, the relative rotation direction of the hydraulic motor unit 501 becomes opposite that of the input shaft 27 (hydraulic pump unit 500), the main transmission output gear 37 linked to the hydraulic pump unit 500 stops absolutely, and the revolution speed of the main transmission output unit becomes almost zero, regardless of the output revolution speed of the engine 5.

The travel controller 210 then judges as to whether a T1 interval has elapsed from the point of time in which a transition was made to a speed change ratio 0 (S15), and if the T1 interval has not elapsed (S15: no), the travel controller sets both the forward drive clutch electromagnetic valve 46 and the reverse drive clutch electromagnetic valve 48 to OFF and disconnects the drive power to the travel unit (S16). Further, the auto brake electromagnetic valve 67 of the brake cylinder 68 of the rear wheels 4 is then set to ON and an auto brake actuation, that is, braking, is executed (S17). As a result, the tractor 1 stops (S18). Therefore, when the operator starts the engine 5, even if the operator has erroneously set the speed change ratio with the speed change ratio setting dial 221 or stepped on the speed change pedal (forward drive pedal 232 and reverse drive pedal 233) before starting the engine, the tractor is not moved. As a result, safety is improved.

Further, it is judged whether a T2 time has elapsed since the travel stop of step S18 (S19), and if the T2 interval has not elapsed (S19: yes), a state is assumed in which the swash plate angle of the hydraulic pump unit 500 is shifted to about 0 degree and held at the speed change ratio 1 (S20). In this state, the hydraulic oil from the hydraulic pump unit 500 is not supplied to the hydraulic motor unit 501, the oil leak caused by unnecessary circulation of the work oil of the hydraulic stepless transmission 29 is decreased, and unnecessary fuel consumption by the engine 5 is eliminated. In other words, in a state in which the operator does not set the speed change ratio with the speed change ratio setting dial 221 serving for a work and does not execute an operation, e.g., of stepping on the speed change pedals 232, 233 to start the travel after the T2 time has elapsed, no load is applied to the engine 5 and unnecessary fuel consumption can be avoided.

If the time T1 has elapsed (S15: yes) in step S15, the travel work such as the above-described speed change ratio adaptive control is executed (S21). It is judged whether the speed change pedals 232, 233 are stepped on during this travel work (S22). In the case where the speed change pedals 232, 233 were not stepped on (S22: no), the engine revolution speed is read from the engine rotation sensor 215, the revolution speed of the main transmission output unit is read from the main transmission output unit rotation sensor 116, and the vehicle speed is read from the vehicle speed sensor 117 (S23), and if the vehicle speed is equal to or less than the predetermined very small speed V1 (for example, about 0.1 km/h) (S24: yes), the operator is assumed to be intending to stop the travel and a transition is made to the above-described step S16. As a result, the vehicle can be safely stopped without the operator stepping on the brake pedal 230. Since the T2 time elapses thereafter, the oil leak caused by unnecessary circulation of the work oil of the hydraulic stepless transmission is prevented and fuel consumption can be reduced.

When the vehicle speed is higher than the predetermined very small speed V1 (S24: no), the operator is assumed to intend to continue the travel work, and the travel work such as speed change ratio adaptive control of step S21 is executed.

Further, when the travel work or agricultural work becomes abnormal during operation of the engine 5 due, e.g., to a failure of the electric system, if the operator pushes the forced actuation button 226 (see FIG. 23), the auto brake is actuated, the forced actuation switch 227 is turned off, the forward drive clutch electromagnetic valve 46 and reverse drive clutch electromagnetic valve 48 are turned off, regardless of the output of the ravel controller 210, the transmission of power to the travel system is urgently interrupted, and safety can be ensured.

The forward-reverse drive switching control of the traveling body will be explained below with reference to the flowchart shown in FIG. 27. First, the engine 5 is started (S31), and if the operator then selects and determines the desired speed change ratio pattern according to the work type or the like (S32) with the speed change ratio setting dial 221, the predetermined speed change ratio pattern that was stored in the RAM (memory enabling the writing and reading of data at all times) of the travel controller 210 is read out. At this time, it is judged whether the left and right brakes 65 have been actuated, the left and right rear wheels 4 have been braked, and the traveling body 2 has stopped (S33).

When the left and right brakes 65 have been actuated and the left and right rear wheels 4 have been braked (S33: yes), a transition is made to a start control mode by the travel stop control shown in FIG. 26. In this mode, the traveling body 2 starts moving forward (or rearward) from the stopped state. When the operator steps on the forward drive pedal 232 (reverse drive pedal 233) to move the tractor 1 forward (rearward), the pedal step-on amount is read from the forward movement potentiometer 219 (rearward movement potentiometer 220) into the travel controller 210 (S34). When the traveling body is stopped by the travel stop control shown in FIG. 26 and the swash plate angle of the hydraulic pump unit 500 is shifted to about 0 degree and held at the speed change ratio 1 (S35: yes), the swash plate angle of the hydraulic pump unit 500 is shifted to about −11 degree and transferred to the speed change ratio 0 (S36).

When the swash plate angle of the hydraulic pump unit 500 is at the speed change ratio 0 (S37: yes), that is, when the main transmission output gear 37 is in an absolutely stopped state, the forward drive clutch electromagnetic valve 46 (reverse drive clutch electromagnetic valve 48) is actuated, the forward drive clutch 40 (reverse drive clutch 42) is engaged (S38), braking of the rear wheels 4 with the left-right brakes 65 is released (S39), and the above-described speed change ratio adaptive control shown in FIG. 25 is performed (S46). The traveling body moves forward (rearward) from the stopped state at a speed calculated from the step-on amount of the forward drive pedal 232 (or reverse drive pedal 233) and the set value of the speed change ratio setting dial 221. The vehicle can be started smoothly by stepping on the forward drive pedal 232 (or reverse drive pedal 233).

On the other hand, when at least one of the left and right brakes 65 is in a disabled state and at least one of the left and right rear wheels 4 is not braked (S33: no), the traveling body is judged to move forward (or rearward) by the speed change ratio adaptive control shown in FIG. 25 and a reciprocating travel control mode is assumed in which the traveling body is moved rearward (or forward) from the state in which it was moved forward (or rearward). At this time, the revolution speed of the engine is read from the engine rotation sensor 215, the revolution speed of the main transmission output unit is read from the main transmission output unit rotation sensor 116, and the vehicle speed is read from the vehicle speed sensor 117 (S40). When the traveling body travels forward (or rearward) (S41: yes), it is judged whether the reverse drive pedal 233 (or forward drive pedal 232) on the side opposite that of the travel direction is stepped on (S42).

In the case where the reverse drive pedal 233 (or forward drive pedal 232) on the side opposite that of the travel direction was stepped on (S42: yes), the operation of stepping on the forward drive pedal 232 (or reverse drive pedal 233) is stopped, and if the vehicle speed decreases to the predetermined very small speed V1 (for example, about 0.1 km/h) or less (S43: yes), the forward drive clutch electromagnetic valve 46 (reverse drive clutch electromagnetic valve 48) is switched off and the forward drive clutch 40 (reverse drive clutch 42) is disengaged (S44). Almost at the same time, the reverse drive clutch electromagnetic valve 48 (forward drive clutch electromagnetic valve 46) is switched off, the reverse drive clutch 42 (forward drive clutch 40) is engaged (S45), and the above-described speed change ratio adaptive control shown in FIG. 25 is performed (S46). The traveling body makes a transition from the forward (rearward) travel to the rearward (forward) travel via a temporary stop state at a speed calculated from the step-on amount of the forward drive pedal 232 (or reverse drive pedal 233) and the set value of the speed change ratio setting dial 221. The travel direction of the traveling body 2 can be alternately switched between forward travel and rearward travel and the traveling body 2 can be smoothly moved in a reciprocating manner by stepping alternately on the forward drive pedal 232 and reverse drive pedal 233.

As is clear from FIG. 23 and FIG. 27, a work vehicle comprising the mission case 17 installed on the tractor 1 equipped with the front and rear travel wheels 3, 4, the hydraulic stepless transmission 29 comprising the input shaft 27, hydraulic pump 500, hydraulic motor 501, and output shaft 36 that transmit power from the engine 5, the forward drive pedal 232 and reverse drive pedal 233 that are speed change pedals for changing the speed change ratio of the hydraulic stepless transmission 29, the forward drive clutch 40 and reverse drive clutch 42 that transmit the transmission drive output from the hydraulic stepless transmission 29 to the front and rear travel wheels 3, 4, and the brake 65 for braking the travel wheels 3, 4 and configured so that the front and rear travel wheels 3, 4 are driven via the forward movement or reverse drive clutch 40, 42 and the vehicle speed is changed according to the step-on amount of the speed change pedals 232, 233, is further equipped with the forward drive and reverse drive potentiometers 219, 220 that are speed change sensors for detecting the step-on amount of the speed change pedals 232, 233, the main transmission hydraulic cylinder 556 that is an actuator for regulating the swash plate angle of the hydraulic pump 500 based on the detection values of the speed change potentiometers 219, 220, the transmission output unit rotation sensor 116 that detects the revolution speed of the output shaft 36, and the control means 210 that performs control such that in a state where the speed change pedals 232, 233 are not stepped on, the brake 65 is applied to the travel wheels 3, 4 and both the forward drive clutch 40 and the reverse drive clutch 42 are disengaged.

Further, when the transmission drive output detected by the transmission output unit rotation sensor 116 is equal to or less than the forward-reverse drive switching speed V1, the control is so performed as to engage any one of the forward drive clutch 40 and the reverse drive clutch 42 correspondingly to the speed change pedals 232 or 233 that was stepped on. When the engagement of the forward drive clutch 40 or the reverse drive clutch 42 is confirmed, the brake 65 of the travel wheels 3, 4, is released. Therefore, various works of the tractor 1 or wheel loader that require frequent operations of start, stop, and switching between the forward drive and reverse drive that are repeated alternately can be performed very easily and fatigue in long-term operation can be reduced.

Further, reverse travel in the process of switching between forward drive and reverse drive can be prevented. Because the forward movement and reverse drive clutches 40, 42 are disposed on the transmission downstream side of the output shaft 36 in the hydraulic stepless transmission 29, a main clutch that is disposed between the engine 5 and hydraulic stepless transmission 29 in the conventional configurations can be omitted and the structure can be simplified. A pair of left and right travel crawlers (not shown in the figures) may be provided instead of left-right front-rear wheels 3, 4 as travel mechanisms, or a pair of left and right travel crawlers may be provided instead of the left and right rear wheels 4.

Further, the controller comprises the speed change ratio setting dial 221 that is a speed change ratio setting device for setting the speed change ratio pattern of the hydraulic stepless transmission 29 and the pattern storage means 210 for storing a plurality of speed change ratio patterns and controls the output revolution speed of the hydraulic stepless transmission 29 along the speed change ratio pattern that was present in advance by the speed change ratio setting device 221 according to the step-on amount of the speed change pedals 232, 233. Therefore, after the operator has once set the speed change ratio pattern of the speed change ratio with the speed change ratio setting device 221, the operator can automatically control the speed change ratio to bring it automatically close to the value of the target speed change ratio when the actual value of speed change ratio has shifted from the target value due to changes in environment or fluctuations of the travel or work load of the tractor 1, which is the work vehicle, by manipulating the speed change pedals 232, 233, the travel operation of the work vehicle 1 can be brought close to the travel operation of an automobile equipped with a stepless transmission mechanism and greatly simplified, and the fatigue in long-term operation can be reduced.

Further, because the speed change pedal comprises the forward drive pedal 232 and the reverse drive pedal 233, and control is so performed that when the reverse drive pedal 233 is stepped on when the work vehicle moves forward, the forward drive clutch 40 is disengaged when the vehicle speed becomes below a fixed level, and the reverse drive clutch 42 is engaged almost at the same time, for example, in a reciprocating travel work, the ultra-low speed output (low-efficiency output region) of the hydraulic stepless transmission 29 can be cut off, and the movement can be switched from forward movement to rearward movement before the hydraulic stepless transmission 29 produces a low-efficiency output. The travel acceleration performance can be prevented from decreasing in switching from forward movement to rearward movement, and the appropriate travel maneuverability can be maintained.

Further, because the speed change pedal comprises the forward drive pedal 232 and the reverse drive pedal 233, and control is so performed that when the forward drive pedal 232 is stepped on when the work vehicle moves rearward, the reverse drive clutch 42 is disengaged when the vehicle speed becomes below a fixed level, and the forward drive clutch 40 is engaged almost at the same time, for example, in a reciprocating travel work, the ultra-low speed output (low-efficiency output region) of the hydraulic stepless transmission 29 can be cut off, and the movement can be switched from forward movement to rearward movement before the hydraulic stepless transmission 29 produces a low-efficiency output. The travel acceleration performance can be prevented from decreasing in switching from forward movement to rearward movement, and the appropriate travel maneuverability can be maintained.

The forward drive pedal 232 and reverse drive pedal 233 may be formed as one pedal (or lever) with the step-on direction of the pedal being different for the forward drive and reverse drive. In this case, the speed change output of the forward drive and reverse drive of one pedal (or lever) can be switched with a switch or the like, the speed change of the forward drive and reverse drive can be manipulated with the same pedal (or lever). Further, the forward drive and reverse drive pedals 232, 233 may be formed as forward drive and reverse drive levers or as a combination of a pedal and a lever.

The sub-transmission high-speed switching control of the traveling body will be described below with reference to the flowchart shown in FIG. 28. First, when the high-speed—low-speed toggle switch 222 is set to a sub-transmission high-speed switch ON and the sub-transmission is switched from a low speed to a high speed (S51: yes) in the course of engine rotation process in which the engine 5 operates (S50: yes), the revolution speed of the main transmission output unit is read from the main transmission output unit rotation sensor 116 and the vehicle speed is read from the vehicle speed sensor 117 (S53), the forward drive clutch 40 (or reverse drive clutch 42) is disengaged (S54), and it is judged whether the vehicle speed is above the predetermined speed V1 (S55).

Then, in a state where the vehicle speed is not more than the predetermined speed V1 (for example, about 0.1 km/h) (S55: no) and the travel work can be continued (the vehicle speed is maintained at a level above the predetermined speed V1), the high-speed clutch electromagnetic valve 666 is switched on (S56), the sub-transmission hydraulic cylinder 55 is actuated to a high-speed side, the low-speed clutch 56 for sub-transmission is disengaged, and the high-speed clutch 57 continues to be engaged. Almost at the same time, the proportional control electromagnetic valve 203 is actuated, and the swash plate angle of the hydraulic pump unit 500 is changed in the speed change ratio decrease direction (S57).

Then, it is judged whether the revolution speed of the main transmission output unit (revolution speed of the main transmission output shaft 36) that is detected by the main transmission output unit rotation sensor 116 and the revolution speed of the sub-transmission output unit (revolution speed of the sub-transmission shaft 50) that is detected by the vehicle speed sensor 117 almost match each other (S58). Where the revolution speed of the main transmission output shaft 36 and the revolution speed of the sub-transmission shaft 50 almost match each other (S58: yes), the forward drive clutch 40 (reverse drive clutch 42) that was engaged immediately before the high-speed—low-speed toggle switch 222 was switched from a low speed side to a high speed side is engaged again (S59) and the above-described speed change ratio adaptive control shown in FIG. 20 is performed (S60). Because the forward drive clutch 40 (reverse drive clutch 42) is engaged again after the revolution speed of the main transmission output shaft 36 and the revolution speed of the sub-transmission shaft 50 were almost matched, when the forward drive clutch 40 (reverse drive clutch 42) is engaged again, the vehicle speed can be prevented from changing abruptly due to the difference in the revolution speed between the main transmission output shaft 36 and sub-transmission shaft 50.

On the other hand, when it is judged whether the vehicle speed detected by the vehicle speed sensor 117 is above the predetermined speed V1 (S55) and the vehicle speed is found to be below the predetermined speed V1 (for example, about 0.1 km/h) (S55: yes), the left and right brakes 65 are engaged (S61) and the reverse movement, e.g., in uphill or downhill movement is prevented. Almost at the same time, the high-speed clutch electromagnetic valve 666 is turned on and the high-speed clutch 57 is engaged (S62). Then, the forward drive clutch 40 (reverse drive clutch 42) that was engaged immediately before the high-speed—low-speed toggle switch 222 was switched from a low speed side to a high speed side is engaged again (S63), the left and right brakes 65 are disengaged, braking of the left and right rear wheels 4 is released (S64), and the above-described speed change ratio adaptive control shown in FIG. 20 is performed (S60).

As is clear from FIG. 23 and FIG. 28, a work vehicle comprising the mission case 17 installed on the tractor 1 equipped with the front and rear travel wheels 3, 4, the hydraulic stepless transmission 29 comprising the input shaft 27, hydraulic pump 500, hydraulic motor 501, and output shaft 36 that transmit power from the engine 5, the forward drive pedal 232 and reverse drive pedal 233 that are speed change pedals for changing the speed change ratio of the hydraulic stepless transmission 29, the forward drive clutch 40 and reverse drive clutch 42 that transmit the transmission drive output from the hydraulic stepless transmission 29 to the front and rear travel wheels 3, 4, the sub-transmission gear mechanism 30 for multistage transmission of the transmission drive output from the hydraulic stepless transmission 29, and the brake 65 for braking the travel wheels 3, 4 and configured so that the vehicle speed is changed according to the step-on amount of the speed change pedals 232, 233 is further equipped with the forward drive and reverse drive potentiometers 219, 220 that are the speed change sensors for detecting the step-on amount of the speed change pedals 232, 233, the main transmission hydraulic cylinder 556 that is an actuator for regulating the swash plate angle of the hydraulic pump 500 based on the detection values of the speed change potentiometers 219, 220, the transmission output unit rotation sensor 116 that detects the revolution speed of the output shaft 36, the sub-transmission hydraulic cylinder 55 that is the sub-transmission switching means for switching the sub-transmission mechanism 30, and the travel controller 210 that is the control means, wherein the control means 210 performs control such that when the high-speed-mode operation of the sub-transmission hydraulic cylinder 55 is confirmed, both the forward drive clutch 40 and reverse drive clutch 42 are disengaged and the sub-transmission mechanism 30 is switched to the high speed side, performs control such that the transmission drive output from the hydraulic stepless transmission 29 is reduced at almost the same time as the sub-transmission mechanism 30 is switched to the high-speed side, and performs control such that when the revolution speeds at the input side and output side of the forward drive clutch 40 and reverse drive clutch 42 almost match each other, either the forward drive clutch 40 or the reverse drive clutch 42 that was engaged when the sub-transmission hydraulic cylinder 55 was operated in the high-speed mode is engaged again.

Therefore, for example, operations can be performed to switch the transmission output of the sub-transmission mechanism 30 from a low speed to a high speed, without stopping the traveling body 2 or without setting the transmission drive output of the hydraulic stepless transmission 29 to neutral (almost zero rotation), the work of the tractor 1 or wheel loader can be greatly simplified, the maneuverability can be improved, and fatigue in long-term operation can be decreased. Another demonstrated effect is that the reverse travel during sub-transmission switching operation can be prevented. For example, because the forward and reverse drive clutches 40, 42 and the sub-transmission mechanism 30 are disposed on the transmission downstream side of the output shaft 36 of the hydraulic stepless transmission 29, a main clutch that is disposed between the engine 5 and hydraulic stepless transmission 29 in the conventional configurations can be omitted and the structure can be simplified.

Further, the control is performed to apply the brake 65 to the travel wheels 4 when the vehicle speed becomes below a fixed level, before any one clutch of the forward drive clutch 40 and reverse drive clutch 42 is engaged again when both the forward drive clutch 40 and the reverse drive clutch 42 were disengaged upon confirming the high-speed-mode operation of the sub-transmission switching means 55. Therefore, even when both the forward drive clutch 40 and the reverse drive clutch 42 are disengaged by the high-speed-mode operation of the sub-transmission switching means 55, the reverse travel in which the vehicle moves in the direction opposite to the travel direction before the forward drive clutch 40 or reverse drive clutch 42 is disengaged can be prevented and the travel sub-transmission can be changed from a low speed to a high speed, while preventing the reverse movement of the traveling body, for example, during uphill or downhill movement.

The sub-transmission low-speed switching control of the traveling body will be described below with reference to the flowchart shown in FIG. 29. First, where the high-speed—low-speed toggle switch 222 is not set to a sub-transmission low-speed switch ON (S71: no) when the engine 5 revolves and the high-speed clutch 57 of the sub-transmission gear mechanism 30 is engaged (S70: yes), the vehicle travels at a sub-transmission highs peed (S72). On the other hand, by setting the high-speed—low-speed toggle switch 222 to a sub-transmission low-speed switch ON and thereby switching the sub-transmission from high-speed mode to the low-speed mode (S71: yes), the proportional control electromagnetic valve 203 is controlled so that when the swash plate angle of the hydraulic pump unit 500 is equal to or higher than a constant speed change ratio (C1=0.7) (S73: yes), the swash plate angle of the hydraulic pump unit 500 becomes equal to or lower than the constant speed change ratio (C1=0.7) and the main transmission output from the hydraulic stepless transmission 29 is reduced to below the constant speed change ratio (C1=0.7) (S74).

Thus, in the case where the swash plate angle of the hydraulic pump unit 500 is equal to or higher than the constant speed change ratio (C1=0.7) when the sub-transmission is in a high-speed mode, the swash plate angle of the hydraulic pump unit 500 is changed to below the constant speed change ratio (C1=0.7) so that the sub-transmission assumes the speed equal to or lower than the highest speed (the swash plate angle of the hydraulic pump unit 500 is the speed change ratio 2) at the time the sub-transmission is in a low-speed mode. Thus, the travel speed at the time the sub-transmission is in a high-speed mode is reduced so that the sub-transmission becomes lower than the highest speed in a low-speed mode, four front and rear wheels 3, 4 are driven below the highest speed of the low-speed mode of sub-transmission before the sub-transmission is switched from a high speed to a low speed, and an abrupt increase in the output load of the hydraulic stepless transmission 29 is prevented.

The travel speed at the time the swash plate angle of the hydraulic pump unit 500 in a high-speed mode of sub-transmission is the speed change ratio C1=0.7 and the travel speed at the time the swash plate angle of the hydraulic pump unit 500 at the highest speed of sub-transmission in a low-speed mode is the speed change ratio 2 are almost identical travel speeds.

As described above, when the main transmission output from the hydraulic stepless transmission 29 is decreased to below the constant speed change ratio C1=0.7) (S74), the revolution speed of the main transmission output unit from the main transmission output unit rotation sensor 116 and the vehicle speed from the vehicle speed sensor 117 are read out (S75), the forward drive clutch 40 (reverse drive clutch 42) is disengaged (S76), and it is judged whether the vehicle speed is above the predetermined speed V1 (S77).

Then, in a state where the vehicle speed is not more than the predetermined speed V1 (for example, about 0.1 km/h) (S77: no) and the travel work can be continued (the vehicle speed is maintained at a level above the predetermined speed V1), the high-speed clutch electromagnetic valve 666 is switched off (S78), the sub-transmission hydraulic cylinder 55 is actuated to a low-speed side, the high-speed clutch 57 for sub-transmission is disengaged, and the low-speed clutch 56 continues to be engaged. Almost at the same time, the proportional control electromagnetic valve 203 is actuated, and the swash plate angle of the hydraulic pump unit 500 is changed in the speed change ratio increase direction (S79).

Then, it is judged whether the revolution speed of the main transmission output unit (revolution speed of the main transmission output shaft 36) that is detected by the main transmission output unit rotation sensor 116 and the revolution speed of the sub-transmission output unit (revolution speed of the sub-transmission shaft 50) that is detected by the vehicle speed sensor 117 almost match each other (S80). Where the revolution speed of the main transmission output shaft 36 and the revolution speed of the sub-transmission shaft 50 almost match each other (S80: yes), the forward drive clutch 40 (reverse drive clutch 42) that was engaged immediately before the high-speed—low-speed toggle switch 222 was switched from a low speed side to a high speed side is engaged again (S81) and the above-described speed change ratio adaptive control shown in FIG. 20 is performed (S82). Because the forward drive clutch 40 (reverse drive clutch 42) is engaged again after the revolution speed of the main transmission output shaft 36 and the revolution speed of the sub-transmission shaft 50 were almost matched, when the forward drive clutch 40 (reverse drive clutch 42) is engaged again, the vehicle speed can be prevented from changing abruptly due to the difference in the revolution speed between the main transmission output shaft 36 and sub-transmission shaft 50.

On the other hand, when it is judged whether the vehicle speed detected by the vehicle speed sensor 117 is above the predetermined speed V1 (S77) and the vehicle speed is found to be below the predetermined speed V1 (for example, about 0.1 km/h) (S77: yes), the left and right brakes 65 are engaged (S83) and the reverse movement, e.g., in uphill or downhill movement is prevented. Almost at the same time, the high-speed clutch electromagnetic valve 666 is turned off and the low-speed clutch 56 continues to be engaged (S84). Then, the forward drive clutch 40 (reverse drive clutch 42) that was engaged immediately before the high-speed—low-speed toggle switch 222 was switched from a high speed side to a low speed side is engaged again (S85), the left and right brakes 65 are disengaged, braking of the left and right rear wheels 4 is released (S86), and the above-described speed change ratio adaptive control shown in FIG. 20 is performed (S82).

As is clear from FIG. 23 and FIG. 29, there are provided the speed change sensors 219, 220 that detect the step-on amount of the speed change pedals 232, 233, the actuator 556 that regulates the swash plate angle of the hydraulic pump 500 based on the detection values of the speed change sensors 219, 220, the transmission output unit rotation sensor 116 that detects the revolution speed of the output shaft 36, the sub-transmission hydraulic cylinder 55 that switches the sub-transmission mechanism 30, and the control means 210, and the control means 210 performs control such that when the low-speed-mode operation of the sub-transmission hydraulic cylinder 55 is confirmed, the speed change ratio of the hydraulic stepless transmission 29 is decreased to below a fixed level, and the forward drive clutch 40 or reverse drive clutch 42 that is engaged is disengaged, performs control such that the transmission drive output from the hydraulic stepless transmission 29 is increased at almost the same time as the forward drive clutch 40 or reverse drive clutch 42 that is engaged is disengaged, and performs control such that when the revolution speeds at the input side and output side of the forward drive clutch 40 or reverse drive clutch 42 almost match each other, either the forward drive clutch 40 or the reverse drive clutch 42 that was engaged immediately before the sub-transmission hydraulic cylinder 55 was operated in the high-speed mode is engaged again.

Therefore, for example, operations can be performed to switch the transmission output of the sub-transmission mechanism 30 from a high speed to a low speed, without stopping the traveling body 2 or without setting the transmission drive output of the hydraulic stepless transmission 29 to neutral (almost zero rotation), a transition from a sub-transmission high-speed travel to a sub-transmission low-speed travel can be carried out with but a small shock, the work of the tractor 1 or wheel loader can be greatly simplified, the maneuverability can be improved, and fatigue in long-term operation can be decreased. Another demonstrated effect is that the reverse travel during sub-transmission switching operation can be prevented. For example, because the forward and reverse drive clutches 40, 42 and the sub-transmission mechanism 30 are disposed on the transmission downstream side of the output shaft 36 of the hydraulic stepless transmission 29, a main clutch that is disposed between the engine 5 and hydraulic stepless transmission 29 in the conventional configurations can be omitted and the structure can be simplified.

Further, the control is performed to apply the brake 65 to the travel wheels 3, 4 when the vehicle speed becomes below a fixed level, before any one clutch of the forward drive clutch 40 and reverse drive clutch 42 that was engaged immediately before the sub-transmission switching means 55 was operated in a low-speed mode is engaged again when the forward drive clutch 40 or the reverse drive clutch 42 was disengaged upon confirming the low-speed-mode operation of the sub-transmission switching means 55. Therefore, even when both the forward drive clutch 40 and the reverse drive clutch 42 are disengaged by the low-speed-mode operation of the sub-transmission switching means 55, the reverse travel in which the vehicle moves in the direction opposite to the travel direction immediately before the forward drive clutch 40 or reverse drive clutch 42 is disengaged can be prevented and the travel sub-transmission can be changed from a low speed to a high speed, while preventing the reverse movement of the traveling body 2, for example, during uphill or downhill movement.

The spin turn control of the traveling body will be explained below with reference to the flowchart shown in FIG. 30. First when the engine 5 operates and the auto brake switch 245 and low-speed mode switch 247 are switched on (S90: yes), the four-wheel drive hydraulic electromagnetic valve 80 is energized and the four-wheel drive hydraulic clutch 74 is engaged in the same manner as when the four-wheel drive mode switch 246 is switched on, and the vehicle travels in the four-wheel drive ON mode (front wheel double-speed drive is OFF, left and right brakes are OFF) in which all the left and right front wheels 3 and rear wheels 4 are driven (S91). For example, the truck 1 is operated to move back and forth between opposing sides of the field and a reciprocating travel work such as plowing is performed. When the operator manipulates the steering handle 9 and changes the direction of the tractor 1 at the sides of the field, if the steering handle 9 is turned to the left through an angle above the set limit angle, the left steering sensor 218 is turned on (S92: yes). On the other hand, if the steering handle 9 is turned to the right through an angle above the set limit angle, the right steering sensor 219 is turned ON (S95: yes).

In the case where the left steering sensor 218 is turned on (S92: yes), when the sub-transmission is at a low speed (the low-speed clutch 56 of the sub-transmission gear mechanism 30 is engaged) (S93: yes), the four-wheel drive hydraulic electromagnetic valve 80 is turned off, the four-wheel drive hydraulic clutch 74 is disengaged, and the four-wheel drive is set OFF (S94). Further, the double-speed hydraulic electromagnetic valve 82 is energized, the double-speed hydraulic clutch 76 is engaged, and the front-wheel double-speed drive is set ON (S94). Further, the left brake electromagnetic valve 67a is energized, the left brake cylinder 68 is actuated, and the left brake is set ON (S94). Therefore, the front wheels 3 rotate at a speed higher than that when the four-wheel drive is ON, the left rear wheel 4 (with respect to the travel direction) is braked with the left brake 65, the tractor 1 spin turns at a spin turn radius about the left rear wheel 4, makes an about 180-degree turn (spin turn), and can move to the starting position of the reciprocating travel work of the next cycle.

On the other hand, in the case where the right steering sensor 219 is turned on (S95: yes), when the sub-transmission is at a low speed (the low-speed clutch 56 of the sub-transmission gear mechanism 30 is engaged) (S96: yes), the four-wheel drive hydraulic electromagnetic valve 80 is turned off, the four-wheel drive hydraulic clutch 74 is disengaged, and the four-wheel drive is set OFF (S94). Further, the double-speed hydraulic electromagnetic valve 82 is energized, the double-speed hydraulic clutch 76 is engaged, and the front-wheel double-speed drive is set ON (S94). Further, the right brake electromagnetic valve 67b is energized, the right brake cylinder 68 is actuated, and the right brake is set ON (S94). Therefore, the front wheels 3 rotate at a speed higher than that when the four-wheel drive is ON, the right rear wheel 4 (with respect to the travel direction) is braked with the right brake 65, the tractor 1 spin turns at a spin turn radius about the left rear wheel 4, makes an about 180-degree turn (spin turn), and can move to the starting position of the reciprocating travel work of the next cycle.

Further, when the operator manipulates the steering handle 9 to return the steering handle 9 in an angle range below the set limit angle (limit angle for course correction in a straight forward travel) and the two, left and right, steering sensors 218, 219 are OFF (S98: yes), of when the operator engages the high-speed clutch 57 for a high-speed travel even when any one of the left and right steering sensors 218, 219 is ON (S99: yes), the four-wheel drive hydraulic electromagnetic valve 80 is energized, the four-wheel drive hydraulic clutch 74 is engaged, and four-wheel drive is set ON (S100). At this time, the double-speed hydraulic electromagnetic valve 82 and left and left and right brake electromagnetic valves 67a, 67b are turned off, the front-wheel double-speed drive is set OFF, and the left and right brakes are set OFF (S100). Thus, the operator manipulates the steering handle 9 within the straight travel range (below the limit angle for road course) in which the two, left and right, steering sensors 218, 219 are maintained in the OFF state, and performs the plowing operation by moving the tractor almost linearly forward at a speed of any of the low speed or high speed of sub-transmission, while correcting the course of the tractor 1.

Figure 30:
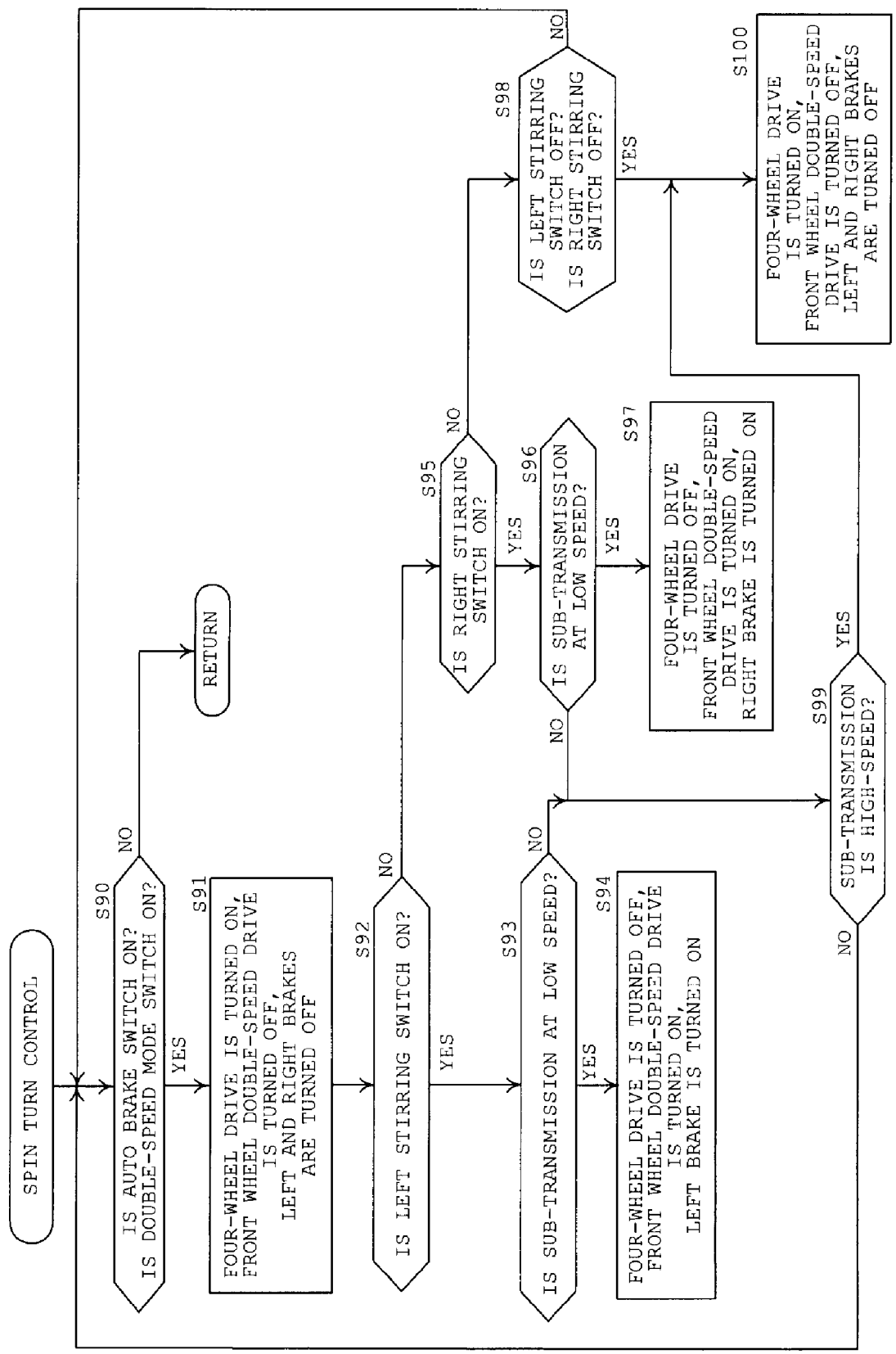
FIG. 30 is a flowchart of spin turn control.

Further, the travel controller 210 is configured to perform with priority the spin turn control shown in FIG. 30 in which the auto brake switch 245 and double-speed mode switch 247 are set ON against the four-wheel drive control in which the four-wheel drive mode switch 246 is turned on and the four-wheel drive is set ON. When the sub-transmission is at a high speed in the case where any one of the left and right steering sensors 218, 219 is turned on, the sub-transmission low-speed switching control shown in FIG. 29 may be executed to switch the sub-transmission to the low-speed side automatically. Even when both the auto brake switch 245 and the double-speed mode switch 247 are ON, when the sub-transmission is at a high speed, the sub-transmission low-speed switching control shown in FIG. 29 may be executed to switch the sub-transmission to the low-speed side automatically.

As is clear from FIG. 23 and FIG. 30, a work vehicle comprising the hydraulic stepless transmission 29 for transmitting power from the engine 5 carried on a traveling body, the sub-transmission gear mechanism 30 that is a sub-transmission mechanism for transmitting the transmission drive output from the hydraulic stepless transmission 29, the four-wheel drive clutch 74 and the double-speed drive clutch 76 that transfer the transmission drive output from the sub-transmission mechanism 30 of the front wheels 3, the left and right brakes 65 for braking the left and right rear wheels 4, and the steering handle 9, is further equipped with the left and right steering sensors 218, 219 that are left and right steering sensors for detecting the steering angle of the steering handle 9, the vehicle speed sensor 117 that detects the vehicle speed, and the travel controller 210 for controlling the four-wheel drive clutch 74, double-speed drive clutch 76, and left and right brakes 65. Therefore, with the tractor 1 or wheel loader, for example, a work in which switching between linear movement and spin turning is repeatedly carried out can be performed in a very easy manner, maneuverability can be improved, and fatigue in long-term operation can be reduced.

As is clear from FIG. 23 and FIG. 30, the control means 210 controls the four-wheel drive clutch 74, double-speed drive clutch 76, and left and right brakes 65 based on the detection results of the left and right steering sensors 128, 219 when the front and rear wheels 3, 4 are driven and moved at a work vehicle speed. Therefore, even the vehicle 1 in which the diameter of front wheels 3 is less than that of the rear wheels 4 can smoothly change the direction of movement (spin turn), transverse slip of the front wheels 3 can be reduced even on a muddy travel surface, the vehicle can change direction at a small spin turn radius less about the rear wheel 4 on the inside of the spin turn, and maneuverability can be improved.

As is clear from FIG. 23 and FIG. 30, the control means 210 conducts the control so that when any one of the left and right steering sensors 218, 219 is turned on in a state where the sub-transmission mechanism 30 was switched to the low-speed side, the four-wheel drive clutch 74 is set OFF, the double-speed drive clutch 76 is set ON, and the brake 65 on the same side as the left or right steering sensor 128, 219 that was turned on is set ON. Therefore, even in a field where the slip easily occurs, the work involving the change of direction can be performed in an easy manner at a small spin turn radius, maneuverability can be improved, and fatigue in long-term operation can be reduced.

As is clear from FIG. 23, etc., because the electronic governor controller 213 is provided that is the engine control means for maintaining the revolution speed of the engine 5 at a set revolution speed, the engine trouble can be prevented and steering of the steering handle 9 (direction change operation) can be performed very easily.

As is clear from FIG. 23, FIG. 24, and FIG. 25, there are provided forward drive pedal 232 and reverse drive pedal 233 that are speed change pedals for changing the speed change ratio of the hydraulic stepless transmission 29, the forward drive clutch 40 and reverse drive clutch 42 that are travel clutches for transmitting the transmission drive output from the hydraulic stepless transmission 29, a speed change potentiometer 220 that is a speed change sensor for detecting the step-on amount of the speed change pedals 232, 233, and the main transmission output unit rotation sensor 116 that detects the transmission drive output revolution speed of the hydraulic stepless transmission 29, and the control unit 210 speed change controls the hydraulic stepless transmission 29. Therefore, the operator can change the direction of the work vehicle 1 by step-on manipulating the speed change pedals 232, 233, while holding the steering handle 9 with both hands, the travel operation of the work vehicle can be brought close to the travel operation of the work vehicle can be brought close to the travel operation of the automobile equipped with a stepless transmission mechanism and greatly simplified, and the fatigue in long-term operation can be decreased.

As follows from FIG. 23, FIG. 24, and FIG. 25, because the output revolution speed of the hydraulic stepless transmission 29 is controlled along the speed change ratio pattern that was set in advance by the speed change ratio setting device 221 according to the step-on amount of the speed change pedals 232, 233, after the operator has once set the speed change ratio pattern of the speed change ratio with the speed change ratio setting dial 221, the operator can automatically control the speed change ratio to bring it automatically close to the value of the target speed change ratio at the time the actual value of the speed change ratio shifts from the value of the target speed change ratio due to changes in environment or fluctuations of travel load of the tractor 1 by manipulating the speed change pedals 232, 233.

As is clear from FIG. 23, FIG. 27, FIG. 28, and FIG. 29, because there are provided there are provided the forward drive clutch 40 and reverse drive clutch 42 that transmit the transmission drive output from the hydraulic stepless transmission 29 to the wheels 3, 4 and the high-speed—low-speed toggle switch 222 that is a switching means for switching the sub-transmission mechanism 30 either to the low-speed side or high-speed side, by performing the ON/OFF control of the forward drive clutch 40 and reverse drive clutch 42 when the switching means 222 is manipulated, the engine trouble can be prevented and the sub-transmission switching operation of the tractor 1 can be greatly simplified.

The start-brake control of the travel body will be explained below with reference to FIG. 33. First, the engine 5 is started (S105), the revolution speed of the engine 5 is detected with the engine rotation sensor 215 and read into the travel controller 210 via the electronic governor controller 213, and it is judged whether the revolution speed of the engine 5 is the set revolution speed (for example, 500 rpm) (S106). The set revolution speed (for example, 500 rpm) is lower than the idling revolution speed (for example, 750 rpm) of the engine when both the forward drive and reverse drive pedals 232, 233 are maintained in neutral when the engine 5 is run continuously.

In the case where the revolution speed of the engine 5 is equal to or less than a low engine revolution speed setting that is lower than the set revolution speed (for example 500 rpm) (S106: yes), when the step-on manipulation of the forward movement or reverse drive pedal 232, 233 is detected with the speed change potentiometer 220 (S107: yes), the above-described speed change adaptive control shown in FIG. 25 is prohibited (S108). At this time, after the operator removes the foot from the forward movement or reverse drive pedal 232, 233 that was stepped on and the forward movement or reverse drive pedal 232, 233 returns to the neutral (initial) position, the forward movement or reverse drive pedal 232, 233 is held in the neutral position and the above-described speed change adaptive control shown in FIG. 25 is allowed after the neutral time (about 5 sec) elapses (S111).

When the speed change adaptive control is thus allowed (S111) or when the revolution speed of the engine 5 is higher than the set revolution speed (for example, 500 rpm) (S106: no), if the forward movement or reverse drive pedal 232, 233 is detected by the speed change potentiometer 220 to be stepped on (S112: yes), the forward movement or reverse drive clutch electromagnetic valves 46, 48 are energized, and the forward movement (rearward movement) clutch-on actuation in which the forward movement or reverse drive clutch 40, 42 is continuously engaged is executed (S113).

Once the continuation time (for example, 1 sec) in which the forward movement or reverse drive clutch 40, 42 is continuously engaged has elapsed (S114: yes), the braking operation of the left and right brakes 65 is released (S115). Once the release time (for example, 2 sec) in which the left and right brakes 65 are released has elapsed (S114: yes), the above-described speed change ratio adaptive control (see FIG. 25) by which the revolution speed of the main transmission output shaft 36 is increased or decreased and the speed change ratio of the hydraulic stepless transmission 29 is controlled to the speed change ratio corresponding to the position of the forward movement or reverse drive pedal 232, 233 is executed (S117).

In a running operation in which the speed change ratio adaptive control is thus executed, even if the vehicle speed of the tractor 1 detected via the vehicle speed sensor 117 is below the vehicle speed (for example, V1=0.1 km/h) at which the travel stop control shown in FIG. 26 is executed, when the travel controller 210 does not turns off the two forward movement and reverse drive clutch electromagnetic valves 46, 48, the operator is notified about it with a buzzer or a lamp, and if the operator switches on the clutch switch 248 (or forced actuation switch 227), an abnormal processing ON actuation prior to all other operations such as the operation of the forward movement or reverse drive pedal 232, 233 and automatic control (S118: yes).

By executing the abnormal processing ON actuation, the travel controller 210 holds the above-described speed change ratio adaptive control in the OFF state (S119) and interrupts the speed change ratio control with the forward movement or reverse drive pedal 232, 233. On the other hand, the left and right brake ON actuation is executed in which the left and right auto brake electromagnetic valves 67a, 67b are energized and the left and right rear wheels are braked with the left and right brakes 65 (S120). Further, the forward (rearward) clutch OFF actuation is actuated in which both the forward movement and the reverse drive clutch electromagnetic valves 46, 48 are held in the OFF state (S121). Then, the speed change ratio control based on the vehicle speed is executed in the travel controller 210 (S122). In this control the proportional control electromagnetic valve 203 is energized, the main transmission hydraulic cylinder 556 is driven, and the pumping discharge amount of the hydraulic pump unit 500 of the hydraulic stepless transmission 29 is controlled based on the actual vehicle speed detected with the vehicle speed sensor 117.

By such execution of the left and right brake ON actuation (S120) and forward (rearward) clutch OFF actuation (S121), the output from the hydraulic stepless transmission 29 is controlled to obtain the speed change ratio corresponding to the actual vehicle speed. More specifically, the speed change ratio (output revolution speed) of the hydraulic stepless transmission 29 is controlled so that the vehicle speed (output revolution speed of the hydraulic stepless transmission 29 that is detected by the main transmission output unit rotation sensor 116) at the time the rear wheels 4 are driven by the output from the hydraulic stepless transmission 29 becomes equal to the actual vehicle speed (revolution speed of rear wheels 4) that is detected by the vehicle speed sensor 117. Therefore, the difference between the output of the hydraulic stepless transmission 29 and actual vehicle speed can be minimized. When returning to the above-described step 113 in which the forward (rearward) clutch ON actuation is executed, the forward movement or reverse drive clutch 40, 42 can be engaged with but a small shock. The forward movement or rearward movement operation o driving the rear wheels 4 via the hydraulic stepless transmission 29 can be smoothly restarted.

In a running operation in which the speed change ratio adaptive control is executed in Step 117, in the case where the operator does not turn on the clutch switch 248 (S118: no), by energizing the left and right brake electromagnetic valves 67a, 67b and executing the left and right brake ON actuation (S213: yes), once the brake time (for example, 24 sec) elapses (S124: yes), the routine returns to the above-described step 121 in which the forward movement (rearward (movement) clutch OFF actuation is executed and the speed change ratio control is executed based on the vehicle speed of step 122.

On the other hand, when the operator removes the foot from the brake pedal 230 and returns the brake pedal 230 to the initial (brake-off) position (S125: yes) before the brake time (for example, 24 sec) elapses during ON actuation of the left and right brakes 65 (S124: no), once the return time (for example, 25 sec) has elapsed (S126; yes), the routine returns to step 112 in which the step-on operation of the forward movement or reverse drive pedal 232, 233 is detected with the speed change potentiometer 220. When the forward movement or reverse drive pedal 232, 233 is stepped on, the above-described speed change ratio adaptive control (see FIG. 25) of step 117 is continuously executed.

Figure 33:
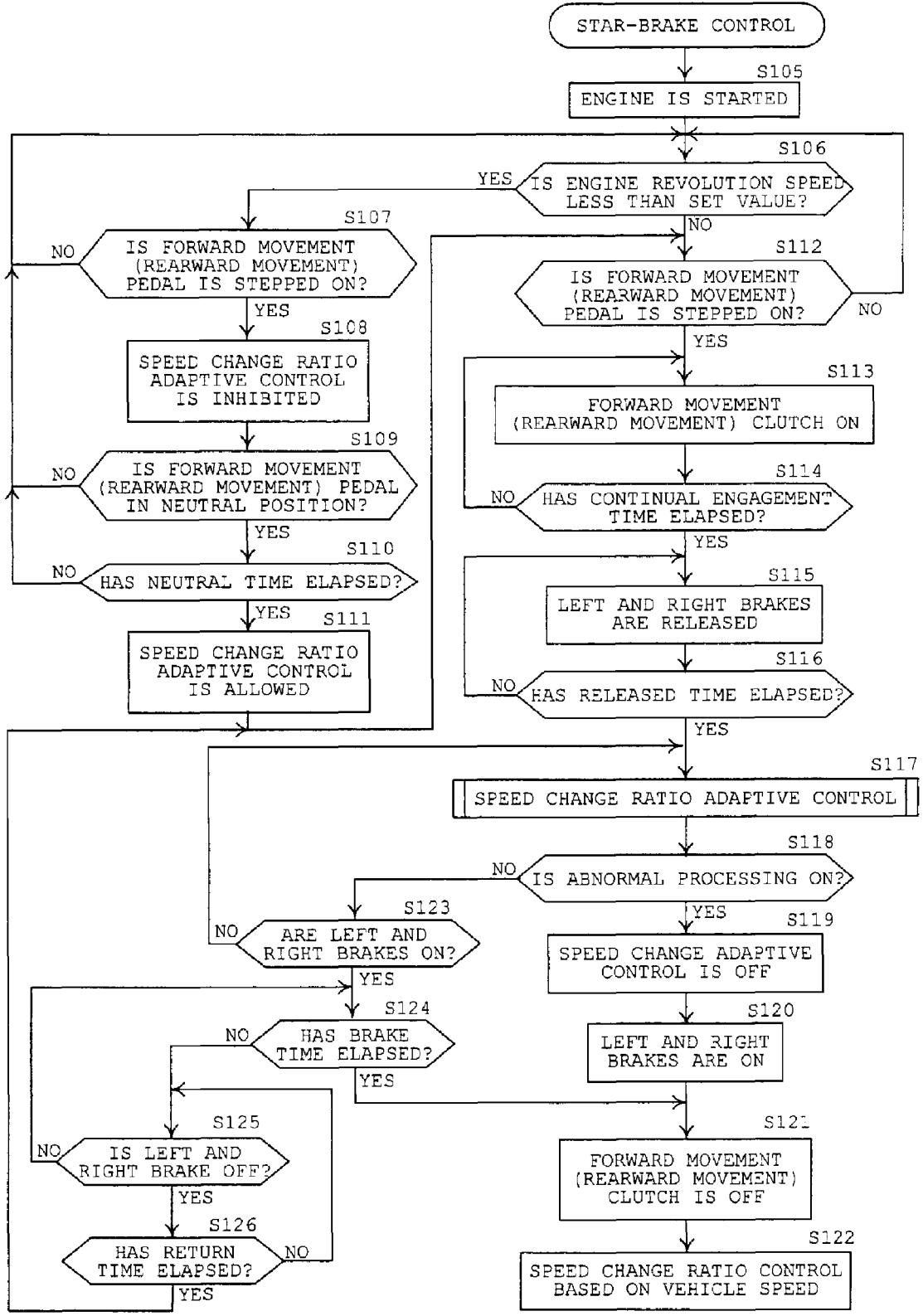
FIG. 33 is a flowchart of start-brake control.

As is clear from FIG. 23 and FIG. 33, a work vehicle comprising the hydraulic stepless transmission 29 for transmitting power from the engine 5 carried on a traveling body, the forward movement hydraulic clutch 40 and rearward movement hydraulic clutch 42 that are clutch mechanisms for transmitting the drive output from the hydraulic stepless transmission 29 to the travel wheels 3, 4, the forward drive pedal 232 and reverse drive pedal 233 that are speed change pedals for changing the speed change ratio of the hydraulic stepless transmission 29, the speed change potentiometer 220 that is a speed change sensor for detecting the step-on amount of the speed change pedals 232, 233, and the transmission output unit rotation sensor 116 that detects the transmission drive output revolution speed of the hydraulic stepless transmission 29 is further equipped with the electronic governor controller 213 that is an engine control means for maintaining the revolution speed of the engine 5 at a revolution speed that was set by the throttle lever 206, the travel controller 210 that is a travel control means for controlling the revolution speed of the engine 5 and the speed change ratio of the hydraulic stepless transmission 29 based on the step-on amount of the speed change pedals 232, 233, and the clutch switch 248 that is a clutch disengagement means for disengaging the clutch mechanisms 40, 42 prior to the automatic control of the travel control means 210. Therefore, in the tractor or wheel loader, the operator can change the direction of the work vehicle 1 by stepping on the speed change pedals 232, 233, while holding the steering handle 9 with both hands, the operations of accelerating the vehicle when it is started and decelerating when it is stopped can be performed in a very easy manner, accidents caused by the troubles in automatic control of the travel control means 210 can be reliably prevented, and the operator can quickly react to changes in environment and operation results.

As is clear from FIG. 33, the clutch mechanism comprises the forward movement hydraulic clutch 40 and rearward movement hydraulic clutch 42 and is configured so that the forward movement hydraulic clutch 40 and rearward movement hydraulic clutch 42 are maintained in the OFF state by the manual operation of the clutch disengagement means 248. Therefore, accidents caused by the troubles in automatic control of the forward movement hydraulic clutch 40 and rearward movement hydraulic clutch 42 can be reliably prevented, and the operator can quickly react to changes in environment and operation results.

As is clear from FIG. 33, the clutch disengagement means 248 is configured so that the operation of disengaging the clutch mechanisms 40, 42 can be executed prior to the operation of automatic control of the engine control means 213 or travel control means 210. Therefore, accidents caused by the troubles in automatic control such as the speed change ratio adaptive control of the travel control means 210 can be reliably prevented, and the operator can quickly react to changes in environment and operation results.

As is clear from FIG. 33, the travel control means 210 performs control such that when the speed change ratio adaptive control is prohibited and the speed change pedals 232, 233 are returned to the neutral state in the case where the operator steps on the speed change pedals 232, 233 when the revolution speed of the engine 5 is less than the set revolution speed, the speed change adaptive control is allowed after the neutral time elapses. Therefore, for example, when the revolution speed of the engine 5 is less than the set revolution speed that is lower than the idling revolution speed, the output of the hydraulic stepless transmission 29 is prevented from fluctuating unstably in automatic control due to insufficient work oil amount in the hydraulic stepless transmission 29. On the other hand, in the low-rpm operation in which the revolution speed of the engine 5 is less than the set revolution speed, the operator recognizes this condition and can operate appropriately the speed change pedals 232, 233 and prevent the engine trouble.

As is clear from FIG. 33, the travel control means 210 performs control such that the control of brakes 65 that brake the travel wheels 3, 4 is executed prior to the speed change ratio adaptive control, but also performs control such that when the operator steps on the brake pedal 230, the clutch mechanisms 40, 42 are forcibly disengaged after the brake time elapses and the output revolution speed of the hydraulic stepless transmission 29 is controlled correspondingly to the actual vehicle speed. Therefore, the operator can interrupt the speed change ratio adaptive control using the speed change pedals 232, 233 by step-on operating the brake pedal 230, and the travel wheels 3, 4 of the tractor 1 can be rapidly braked. On the other hand, when the operator steps on the brake pedal 230, before the tractor 1 stops or before the operator stops operating the brake pedal 230, the output revolution speed of the hydraulic stepless transmission 29 can be smoothly changed according to the actual vehicle speed and the hydraulic stepless transmission 29 can be prevented from operating in an overload state or the like.

As is clear from FIG. 33, the travel control means 210 performs control such that when the brake pedal 230 is returned to the non-brake operation position, while the output revolution speed of the hydraulic stepless transmission 29 is being controlled correspondingly to the actual vehicle speed, the clutch mechanisms 40, 42 are operated in a continuous mode after the return time elapses. Therefore, after the value of the actual speed change ratio of the hydraulic stepless transmission 29 has been brought close to the actual vehicle speed, the travel wheels 3, 4 can be driven by the output from the hydraulic stepless transmission 29, and the operator can bring the braking operation and accelerating operation of the tractor 1 close to the braking operation and accelerating operation in an automobile equipped with a stepless transmission mechanism and perform these operations very easily by operating the brake pedal 230 and speed change pedals 232, 233, and fatigue in long-term operation can be reduced.

As is clear from FIG. 33, the travel control means 210 controls the output revolution speed of the hydraulic stepless transmission 29 along the speed change ratio pattern that was set in advance by the speed change ratio setting dial 221 that is a speed change ratio setting device according to the step-on amount of the speed change pedals 232, 233. Therefore, after the operator has once set the speed change ratio pattern of the speed change ratio with the speed change ratio setting dial 221, the operator can automatically control the speed change ratio to bring it automatically close to the value of the target speed change ratio at the time the actual value of the speed change ratio shifts from the value of the target speed change ratio due to changes in environment or fluctuations of travel load of the work vehicle 1 by operating the speed change pedals 232, 233.

The invention claimed is:

1. A control apparatus for a work vehicle provided with a hydraulic stepless transmission for transmitting power from an engine mounted on a traveling body equipped with travel wheels, a speed change pedal for changing a speed change ratio of the hydraulic stepless transmission, a forward drive clutch and a reverse drive clutch that transmit a transmission drive output from the hydraulic stepless transmission to the travel wheels, and a brake for braking the travel wheels, the control apparatus comprising:

a transmission sensor that detects a step-on amount of the speed change pedal;

a transmission output unit rotation sensor that detects a revolution speed of an output shaft; and a controller;

wherein the control apparatus conducts control so that any one of the forward drive clutch and reverse drive clutch is engaged in response to a step-on actuation of the speed change pedal when a transmission drive output detected by the transmission output unit rotation sensor is no greater than a forward-reverse drive switching speed, and that the brake of the travel wheels is released when the activation of any of the forward drive clutch and reverse drive clutch is confirmed;

wherein the control apparatus further comprises a speed change ratio setting device for setting a speed change ratio pattern of the hydraulic stepless transmission, and a pattern storage for storing a plurality of speed change ratio patterns; and wherein an output revolution speed of the hydraulic stepless transmission is controlled in accordance with a speed change ratio pattern set in advance by the speed change ratio setting device correspondingly to a step-on amount of the speed change pedal.

2. The control apparatus for a work vehicle according to claim 1, wherein the controller performs control such that the brake is actuated to apply a braking force to the travel wheels and both the forward drive clutch and the reverse drive clutch are disengaged when the speed change pedal is not stepped on.

3. The control apparatus for a work vehicle according to claim 1, wherein the speed change pedal comprises a forward drive pedal and a reverse drive pedal, and wherein control is performed so that when the reverse drive pedal is stepped on during forward drive, the forward drive clutch is disengaged and the reverse drive clutch is engaged substantially at the same time, when the vehicle speed is no greater than a fixed level.

4. The control apparatus for a work vehicle according to claim 1, wherein the speed change pedal comprises a forward drive pedal and a reverse drive pedal, and wherein control is performed so that when the forward drive pedal is stepped on during reverse drive, the reverse drive clutch is disengaged and the forward drive clutch is engaged substantially at the same time, when the vehicle speed is no greater than a fixed level.

5. The control apparatus for a work vehicle according to claim 1, further comprising: an engine controller for maintaining a revolution speed of the engine at a revolution speed set by a throttle lever; and a travel controller far controlling the revolution speed of the engine and the speed change ratio of the hydraulic stepless transmission based on the step-on amount of the speed change pedal.

6. The control apparatus for a work vehicle according to claim 5, wherein the travel controller controls the revolution speed of the engine based on the step-on amount of the speed change pedal when a sub-transmission mechanism is switched to a high-speed side.

7. The control apparatus for a work vehicle according to claim 5, wherein the travel controller controls the revolution speed of the engine based on the step-on amount of the speed change pedal when the throttle lever is in an automatic control position.

8. The control apparatus for a work vehicle according to claim 1, wherein the speed change pedal comprises a forward drive pedal and a reverse drive pedal, and wherein the control apparatus further comprises: a transmission link mechanism for transmitting the pedal step-on amount of the forward drive pedal and reverse drive pedal to a speed change sensor; and a neutral position restorer provided in the transmission link mechanism.

9. The control apparatus for a work vehicle according to claim 8, wherein the forward drive pedal and reverse drive pedal are configured so that a step-on force in at least a low-speed operation region of each pedal is determined by the neutral position restorer.

10. The control apparatus for a work vehicle according to claim 8, further comprising a step-on resistance changer linked to at least one pedal from among the forward drive pedal and reverse drive pedal, the control apparatus being configured so that a step-on force in a high-speed operation region of at least one pedal from among the forward drive pedal and reverse drive pedal is determined by the step-on resistance changer.

11. The control apparatus for a work vehicle according to claim 8, further comprising a push-pull operation mechanism for linking the forward drive pedal and reverse drive pedal to the step-on resistance changer.

12. A control apparatus for a work vehicle provided with a hydraulic stepless transmission for transmitting power from an engine mounted on a traveling body equipped with travel wheels, a speed change pedal for changing a speed change ratio of the hydraulic stepless transmission, a forward drive clutch and a reverse drive clutch that transmit a transmission drive output from the hydraulic stepless transmission to the travel wheels, and a brake for braking the travel wheels, the control apparatus comprising:
  a transmission sensor that detects a step-on amount of the speed change pedal;
  a transmission output unit rotation sensor that detects a revolution speed of an output shaft; and a controller;
  wherein the control apparatus conducts control so that any one of the forward drive clutch and reverse drive clutch is engaged in response to a step-on actuation of the speed change pedal when a transmission drive output detected by the transmission output unit rotation sensor is no greater than a forward-reverse drive switching speed, and that the brake of the travel wheels is released when the activation of any of the forward drive clutch and reverse drive clutch is confirmed;
  wherein the speed change pedal comprises a forward drive pedal and a reverse drive pedal; and
  wherein control is performed so that when the reverse drive pedal is stepped on during forward drive, the forward drive clutch is disengaged and the reverse drive clutch is engaged substantially at the same time, when the vehicle speed is no greater than a fixed level.

13. A control apparatus for a work vehicle provided with a hydraulic stepless transmission for transmitting power from an engine mounted on a traveling body equipped with travel wheels, a speed change pedal for changing a speed change ratio of the hydraulic stepless transmission, a forward drive clutch and a reverse drive clutch that transmit a transmission drive output from the hydraulic stepless transmission to the travel wheels, and a brake for braking the travel wheels, the control apparatus comprising:
  a transmission sensor that detects a step-on amount of the speed change pedal;
  a transmission output unit rotation sensor that detects a revolution speed of an output shaft; and a controller;
  wherein the control apparatus conducts control so that any one of the forward drive clutch and reverse drive clutch is engaged in response to a step-on actuation of the speed change pedal when a transmission drive output detected by the transmission output unit rotation sensor is no greater than a forward-reverse drive switching speed, and that the brake of the travel wheels is released when the activation of any of the forward drive clutch and reverse drive clutch is confirmed;
  wherein the speed change pedal comprises a forward drive pedal and a reverse drive pedal; and
  wherein control is performed so that when the forward drive pedal is stepped on during reverse dive, the reverse drive clutch is disengaged and the forward drive clutch is engaged substantially at the same time, when the vehicle speed is no greater than a fixed level.

14. A control apparatus for a work vehicle provided with a hydraulic stepless transmission for transmitting power from an engine mounted on a traveling body equipped with travel wheels, a speed change pedal for changing a speed change ratio of the hydraulic stepless transmission, a forward drive clutch and a reverse drive clutch that transmit a transmission drive output from the hydraulic stepless transmission to the travel wheels, and a brake for braking the travel wheels, the control apparatus comprising:

a transmission sensor that detects a step-on amount of the speed change pedal;

a transmission output unit rotation sensor that detects a revolution speed of an output shaft; and a controller;

wherein the control apparatus conducts control so that any one of the forward drive clutch and reverse drive clutch is engaged in response to a step-on actuation of the speed change pedal when a transmission drive output detected by the transmission output unit rotation sensor is no greater than a forward-reverse drive switching speed, and that the brake of the travel wheels is released when the activation of any of the forward drive clutch and reverse drive clutch is confirmed;

wherein the control apparatus further comprises an engine controller for maintaining a revolution speed of the engine at a revolution speed set by a throttle lever, and a travel controller for controlling the revolution speed of the engine and the speed change ratio of the hydraulic stepless transmission based on the step-on amount of the speed change pedal; and wherein the travel controller controls the revolution speed of the engine based on the step-on amount of the speed change pedal when a sub-transmission mechanism is switched to a high-speed side.

15. A control apparatus for a work vehicle provided with a hydraulic stepless transmission for transmitting power from an engine mounted on a traveling body equipped with travel wheels, a speed change pedal for changing a speed change ratio of the hydraulic stepless transmission, a forward drive clutch and a reverse drive clutch that transmit a transmission drive output from the hydraulic stepless transmission to the travel wheels, and a brake for braking the travel wheels, the control apparatus comprising:

a transmission sensor that detects a step-on amount of the speed change pedal;

a transmission output unit rotation sensor that detects a revolution speed of an output shaft; and a controller;

wherein the control apparatus conducts control so that any one of the forward drive clutch and reverse drive clutch is engaged in response to a step-on actuation of the speed change pedal when a transmission drive output detected by the transmission output unit rotation sensor is no greater than a forward-reverse drive switching speed, and that the brake of the travel wheels is released when the activation of any of the forward drive clutch and reverse drive clutch is confirmed; and wherein the control apparatus further comprises an engine controller for maintaining a revolution speed of the engine at a revolution speed set by a throttle lever, and a travel controller for controlling the revolution speed of the engine and the speed change ratio of the hydraulic stepless transmission based on the step-on amount of the speed change pedal;

wherein the travel controller controls the revolution speed of the engine based on the step-on amount of the speed change pedal when the throttle lever is in an automatic control position.

16. A control apparatus for a work vehicle provided with a hydraulic stepless transmission for transmitting power from an engine mounted on a traveling body equipped with travel wheels, a speed change pedal for changing a speed change ratio of the hydraulic stepless transmission, a forward drive clutch and a reverse drive clutch that transmit a transmission drive output from the hydraulic stepless transmission to the travel wheels, and a brake for braking the travel wheels, the control apparatus comprising:

a transmission sensor that detects a step-on amount of the speed change pedal;

a transmission output unit rotation sensor that detects a revolution speed of an output shaft; and a controller;

wherein the control apparatus conducts control so that any one of the forward drive clutch and reverse drive clutch is engaged in response to a step-on actuation of the speed change pedal when a transmission drive output detected by the transmission output unit rotation sensor is no greater than a forward-reverse drive switching speed, and that the brake of the travel wheels is released when the activation of any of the forward drive clutch and reverse drive clutch is confirmed;

wherein the speed change pedal comprises a forward drive pedal and a reverse drive pedal; and wherein the control apparatus further comprises: a transmission link mechanism for transmitting the pedal step-on amount of the forward drive pedal and reverse drive pedal to a speed change sensor; and a neutral position restorer provided in the transmission link mechanism.

17. The control apparatus for a work vehicle according to claim 16, wherein the forward drive pedal and reverse drive pedal are configured so that a step-on force in at least a low-speed operation region of each pedal is determined by the neutral position restorer.

18. The control apparatus for a work vehicle according to claim 16, further comprising a step-on resistance changer linked to at least one pedal from among the forward drive pedal and reverse drive pedal, the control apparatus being configured so that a step-on force in a high-speed operation region of at least one pedal from among the forward drive pedal and reverse drive pedal is determined by the step-on resistance changer.

19. The control apparatus for a work vehicle according to claim 16, further comprising a push-pull operation mechanism for linking the forward drive pedal and reverse drive pedal to the step-on resistance changer.

* * * * *